US012726235B2

(12) United States Patent
Wang Helmersson et al.

(10) Patent No.: US 12,726,235 B2
(45) Date of Patent: Sep. 1, 2026

(54) FIRST NETWORK NODE, SECOND NETWORK NODE, CENTRAL NETWORK NODE AND METHODS PERFORMED THEREBY FOR HANDLING DATA

(71) Applicant: Telefonaktiebolaget LM Ericsson (publ), Stockholm (SE)

(72) Inventors: Ke Wang Helmersson, Linköping (SE); Pål Frenger, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 122 days.

(21) Appl. No.: 18/696,526

(22) PCT Filed: Sep. 30, 2022

(86) PCT No.: PCT/SE2022/050879
§ 371 (c)(1),
(2) Date: Mar. 28, 2024

(87) PCT Pub. No.: WO2023/055283
PCT Pub. Date: Apr. 6, 2023

(65) Prior Publication Data

US 2024/0405804 A1 Dec. 5, 2024

Related U.S. Application Data

(60) Provisional application No. 63/251,233, filed on Oct. 1, 2021.

(51) Int. Cl.
*H04B 7/024* (2017.01)
*H04B 7/0417* (2017.01)
(Continued)

(52) U.S. Cl.
CPC ........... *H04B 7/024* (2013.01); *H04B 7/0417* (2013.01); *H04B 7/046* (2013.01); *H04B 7/0626* (2013.01)

(58) Field of Classification Search
CPC .... H04B 7/024; H04B 7/0413; H04B 7/0452; H04B 7/0417; H04B 7/046; H04B 7/026;
(Continued)

(56) References Cited

U.S. PATENT DOCUMENTS

2008/0002601 A1* 1/2008 Coronel ................ H04B 7/026 370/315
2012/0300613 A1* 11/2012 Baramov ................ G05B 9/02 370/216

FOREIGN PATENT DOCUMENTS

WO 2021040590 A1 3/2021

OTHER PUBLICATIONS

International Search Report and Written Opinion of the International Searching Authority, PCT/SE2022/050879, mailed Dec. 19, 2022, 13 pages.

(Continued)

*Primary Examiner* — Betsy Deppe
(74) *Attorney, Agent, or Firm* — Sage Patent Group

(57) ABSTRACT

A method by a first network node for handling data. The first network node operates in a communications network. The first network node applies a Kalman filter of a first type to a first aggregation of a first set of measurements ($y_l$) collected via a first plurality of antenna elements, and a first set of filtered data ($\hat{s}_0$) received from a second network node, using a first covariance matrix ($P_0$). The applying of the Kalman filter ($\mathcal{K}$) outputs a second set of filtered data ($\hat{s}$), and a second covariance matrix (P). The first network node then sends, in uplink, the second set of filtered data ($\hat{s}$) and the second covariance matrix (P) to one of: another network node subsequently adjacent to the first network node towards a central network node, and the central network node.

20 Claims, 19 Drawing Sheets

(51) Int. Cl.
*H04B 7/0456* (2017.01)
*H04B 7/06* (2006.01)

(58) Field of Classification Search
CPC ...... H04B 7/15; H04B 7/0842; H04B 7/0848; H04B 7/24; H04B 7/26; H04W 88/08; H04W 88/12; H04W 88/04; H04W 88/10
See application file for complete search history.

(56) References Cited

OTHER PUBLICATIONS

Hu, Qiang et al., "Training Design for Channel Estimation in Uplink Cloud Radio Access Networks," IEEE Transactions on Signal Processing, vol. 64, No. 13, Jul. 1, 2016, 14 pages.
Wild, Thorsten et al., "Multi-Stage Channel Estimation across Multiple Cells in Uplink Joint Reception," IEEE 63rd Vehicular Technology Conference, Jun. 2, 2013, 6 pages.
Björnson, Emil et al., "Making Cell-Free Massive MIMO Competitive With MMSE Processing and Centralized Implementation," IEEE Transactions on Wireless Communications, Sep. 20, 2019, 14 pages.
Wang Helmersson, Ke et al., "Uplink D-MIMO with Decentralized Subset Combining," ICC 2022—IEEE International Conference on Communications, Seoul, Republic of South Korea, 2022, 6 pages.
Wang Helmersson, Ke et al., "Optimal Uplink D-MIMO Processing Using Kalman Filtering," GLOBECOM 2022—2022 IEEE Global Communications Conference, Rio de Janeiro, Brazil, 2022, 6 pages.

* cited by examiner a)

b) Simplified notation

KF type 2:
Sub-set combining update

KF type 1:
Antenna signal update a)

b)

Simplified notation

LQR for KF type 2: Sub-set signal split

LQR for KF type 1: Antenna signal split

FIRST NETWORK NODE, SECOND NETWORK NODE, CENTRAL NETWORK NODE AND METHODS PERFORMED THEREBY FOR HANDLING DATA

CROSS REFERENCE TO RELATED APPLICATIONS

This application is a 35 U.S.C. § 371 national stage application of PCT International Application No. PCT/SE2022/050879 filed on Sep. 30, 2022, which in turn claims domestic priority to U.S. Provisional Patent Application No. 63/251,233, filed on Oct. 1, 2021, the disclosures and content of which are incorporated by reference herein in their entirety.

TECHNICAL FIELD

The present disclosure relates generally to a first network node, and methods performed thereby, for handling data. The present disclosure also relates generally to a second network node and methods performed thereby for handling the data. The present disclosure further relates generally to a central network node and methods performed thereby for handling the data.

BACKGROUND

Wireless devices within a wireless communications network may be e.g., User Equipments (UE), stations (STAs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g., between two wireless devices, between a wireless device and a regular telephone and/or between a wireless device and a server via a Radio Access Network (RAN) and possibly one or more core networks, comprised within the wireless communications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The wireless communications network covers a geographical area which may be divided into cell areas, each cell area being served by a network node, which may be an access node such as a radio network node, radio node or a base station, e.g., a Radio Base Station (RBS), which sometimes may be referred to as e.g., gNB, evolved Node B ("eNB"), "eNodeB", "NodeB", "B node", Transmission Point (TP), or BTS (Base Transceiver Station), depending on the technology and terminology used. The base stations may be of different classes such as e.g., Wide Area Base Stations, Medium Range Base Stations, Local Area Base Stations, Home Base Stations, pico base stations, etc. . . . , based on transmission power and thereby also cell size. A cell may be understood as the geographical area where radio coverage is provided by the base station or radio node at a base station site, or radio node site, respectively. One base station, situated on the base station site, may serve one or several cells. Further, each base station may support one or several communication technologies. The base stations communicate over the air interface operating on radio frequencies with the terminals within range of the base stations. The wireless communications network may also comprise network nodes which may serve receiving nodes, such as wireless devices, with serving beams. In 3rd Generation Partnership Project (3GPP) Long Term Evolution (LTE), base stations, which may be referred to as eNodeBs or even eNBs, may be directly connected to one or more core networks. In the context of this disclosure, the expression Downlink (DL) may be used for the transmission path from the base station to the wireless device. The expression Uplink (UL) may be used for the transmission path in the opposite direction i.e., from the wireless device to the base station.

NR

The standardization organization 3rd Generation Partnership Project (3GPP) is currently in the process of specifying a New Radio Interface called New Radio (NR) or 5G-Universal Terrestrial Radio Access (UTRA), as well as a Fifth Generation (5G) Packet Core Network, which may be referred to as Next Generation (NG) Core Network, abbreviated as NG-CN, NGC or 5G CN.

In the current concept, gNB denotes an NR BS, where one NR BS may correspond to one or more transmission and/or reception points.

One of the main goals of NR is to provide more capacity for operators to serve ever increasing traffic demands and variety of applications. Because of this, NR may be able to operate on high frequencies, such as frequencies over 6 GHZ, until 60 or even 100 GHz.

Operation in higher frequencies makes it possible to use smaller antenna elements, which enables antenna arrays with many antenna elements. Such antenna arrays facilitate beamforming, where multiple antenna elements may be used to form narrow beams and thereby compensate for the challenging propagation properties.

Distributed Multiple Input Multiple Output (D-MIMO) Network

A D-MIMO network may comprise L geographically distributed Access Points (APs), each equipped with N antenna elements. The total number of antennas in the network may be N×L. The APs may be connected via fronthaul links to Central Processing Units (CPUs), which may facilitate the coordination among APs. The APs may be cooperating to serve K User Equipments (UEs) in the coverage area jointly, by coherent transmission in the downlink and reception in the uplink, see FIG. 1.

FIG. 1 is a schematic diagram representing a non-limiting example of uplink transmission from UE and receiving at APs.

In the uplink, as shown in FIG. 1, each AP may receive two types of signals from UEs, the pilot signals for channel estimation and data signals for data transfer. When the UEs transmit their pilot signals, the received pilot signal $Z_l \in \mathbb{C}^{N \times \tau_p}$ at AP l may be:

$$Z_l = \sum_{k=1}^{K} \sqrt{p_k}\, h_{lk} \phi_{t_k}^T + N_l$$

where $p_k \geq 0$ may be understood to be the transmit power of UE k, $N_l \in \mathbb{C}^{N \times \tau_p}$ may be understood to be the receiver noise with independent $\mathcal{N}_{\mathbb{C}}(0,\sigma^2)$ entries, and $\sigma^2$ may be understood to be the noise power. The channel between UE k and AP l is denoted by $h_{lk} \in \mathbb{C}^N$. The elements of the channel vector may be modelled by complex Gaussian distribution, $h_{lk}\sim\mathcal{N}_{\mathbb{C}}(0,R_{lk})$ where $R_{lk}\in\mathbb{C}^{N\times N}$ may be understood to be the spatial correlation matrix. It may be assumed that the D-MIMO network has $\tau_P$ mutually orthogonal pilot signals $\phi_1, \ldots, \phi\tau_P$ with $\|\phi_i\|^2=\tau_P$ which may be used for channel estimation. The pilots may be assigned to the UEs in a deterministic but arbitrary way. In a network with $K>\tau_P$ several users may be assigned to the same pilot. The index of the pilot assigned to UE k may be denoted as $t_k\in\{1, \ldots, \tau_P\}$ and $\mathcal{P}_k\subset\{1, \ldots, K\}$ the subset of UEs that use the same pilot as UE k. The interference generated by the pilot sharing UEs may cause the so-called pilot contamination which may degrade the system performance. To estimate the channel, the AP may correlate the received signal with the associated normalized pilot signal $\phi t_k/\sqrt{\tau_p}$ to obtain:

$$z_{lt_k}\triangleq\frac{1}{\sqrt{\tau_p}}Z_l\phi_{t_k}^*.$$

The channel $h_{lk}$ may be estimated using:

$$\hat{h}_{lk}=\sqrt{p_k\tau_p}\,R_{lk}\psi_{lt_k}^{-1}z_{lt_k}$$

Where:

$$\psi_{lt_k}=\mathbb{E}\{z_{lt_k}z_{lt_k}^H\}=\sum_{i\in\mathcal{P}_k}\tau_P p_i R_{li}+I_N$$

may be understood to be the correlation matrix of the received signal. The estimate $\hat{h}_{lk}$ and estimation error $\tilde{h}_{lk}=h_{lk}-\hat{h}_{lk}$ may be understood to be independent vectors distributed as $$\hat{h}_{lk}\sim\mathcal{N}_{\mathbb{C}}(0,\ p_k\tau_P R_{lk}\Psi_{lt_k}^{-1}R_{lk})$$

and $\tilde{h}_{lk}\sim\mathcal{N}_{\mathbb{C}}(0,C_{lk})$ with the covariance matrix:

$$C_{lk}=\mathbb{E}\{\tilde{h}_{lk}\tilde{h}_{lk}^H\}=R_{lk}-p_k\tau_p R_{lk}\psi_{lt_k}^{-1}R_{lk}.$$

During the uplink data transmission, all APs may receive a superposition of the signals sent from all UEs. The received signal $y_l\in\mathbb{C}^N$ at AP l may be written as:

$$y_l=\sum_{k=1}^{K}h_{lk}s_k+n_l$$

where $s_k\sim\mathcal{N}_{\mathbb{C}}(0,p_k)$ may be understood to be the signal transmitted by UE k with a power $p_k=\mathbb{E}\{|s_k|f\}$ during the uplink data transmission. The independent receiver noise may be understood to be $n_l\sim\mathcal{N}_{\mathbb{C}}(0_N,\sigma^2 I_N)$. The performance metrics may be understood to be the achievable Spectral Efficiency (SE) [bit/s/Hz] based on the Shannon formula, which is the same as it was used in [2]. The existing solutions for combining and aggregating signals from different access points in the uplink of a distributed MIMO (D-MIMO) network are described below, in the Sections entitled "Level 4: fully centralized combining" and "Level 1-3: Local processing and centralized combining".

Level 4: Fully Centralized Combining

Level 4 is a method with fully centralized processing and combining. It requires that all APs, L, that are connected to a Central Processing Unit (CPU) of a D-MIMO network send all received pilot signals $\{z_{lt}: l=1, \ldots, L, t=1, \ldots, \tau_P\}$ and received data signals $\{y_l: l=1, \ldots, L\}$ to the CPU. For each UE, the CPU estimates the channel $\{\hat{h}_{lk}: l=1, \ldots, L, k=1, \ldots, K\}$ using received pilot signals and channel statistics obtained from APs. Then the CPU selects combining vector $v_k\in\mathbb{C}^{LN}$ for UE k based on the collective channel estimate:

$$\hat{h}_k\triangleq\begin{bmatrix}\hat{h}'_{1k}\\ \vdots\\ \hat{h}_{Lk}\end{bmatrix}$$

and $$y=\begin{bmatrix}y_1\\ \vdots\\ y_L\end{bmatrix}.$$

The Minimum Mean-Square Error (MMSE) combining vector for UE k that maximizes the instantaneous Signal to noise and interference ratio (SINR) and minimizes the $$MSE_k=\mathbb{E}\{|s_k-v_k^H y|^2|\{\hat{h}_k\}\}$$

is given by:

$$v_k=p_k\left(\sum_{i=1}^{K}p_i\left(\hat{h}_i\hat{h}_i^H+C_i\right)+\sigma^2 I_{LN}\right)^{-1}\hat{h}_k$$

The maximum value of SINR is:

$$\mathrm{SINR}_k^{(4)}=p_k\hat{h}_k^H\left(\sum_{i=1,i\neq k}^{K}p_i\hat{h}_i\hat{h}_i^H+\sum_{i=1}^{K}p_iC_i+\sigma^2 I_{LN}\right)^{-1}\hat{h}_k$$

At level 4, an achievable Spectral efficiency (SE) of UE k is shown to be:

$$SE_k^{(4)}=\left(1-\frac{\tau_P}{\tau_c}\right)\mathbb{E}\left\{\log_2\left(1+\mathrm{SINR}_k^{(4)}\right)\right\}$$

The level 4 provides the highest SE, however the computational complexity is extremely high since it requires first, the computation of an LN×LN matrix inverse and then, a matrix-vector multiplication.

Level 1-3: Local Processing and Centralized Combining

Level 1-3 are the methods based on local processing and centralized combining. Instead of sending the N-dimensional vector $\{y_l: l=1, \ldots, L\}$ and channel estimates to the CPU, each AP preprocesses its signal by computing the local estimates of the data that are then passed to the CPU for final combining. The local estimate for UE k at AP l is $$\breve{s}_{kl} = v_{lk}^H y_l$$

where the local MMSE combining vector:

$$v_{lk} = p_k \left( \sum_{i=1}^{K} p_i \left( \hat{h}_{li} \hat{h}_{li}^H + C_{li} \right) + \sigma^2 I_N \right)^{-1} \hat{h}_{lk}$$

The maximum value of SINR with the local MMSE combining $v_{lk}$ is given by:

$$\text{SINR}_{kl}^{(1)} = p_k \hat{h}_{lk}^H \left( \sum_{i=1, i \neq k}^{K} p_i \hat{h}_{li} \hat{h}_{li}^H + \sum_{i=1}^{K} p_i C_{li} + \sigma^2 I_N \right)^{-1} \hat{h}_{lk}$$

Different from level 4, AP l uses only its own local channel estimates $\{\hat{h}_{lk}: k=1, \ldots, K\}$ for the design of $v_{lk}$. The local estimates $\{\breve{s}_{kl}: l=1, \ldots, L\}$ are then sent to the CPU where they are combined in three different ways:

Level 1

$$\hat{s}_k = \underset{\breve{s}_{kl}}{\text{argmax}} \text{SINR}_{kl}^{(1)},$$

$$l = 1, \ldots, L.$$

Level 2

$$\hat{s}_k = \frac{1}{L} \sum_{l=1}^{L} \breve{s}_{kl}.$$

Level 3

$$\hat{s}_k = \sum_{l=1}^{L} a_{lk}^* \breve{s}_{kl}.$$

The weighting coefficients $a_{lk}$ at level 3 can be obtained based on the channel statistics, see [2] for more details.

Existing methods for combining and aggregating signals from different access points in a distributed MIMO (D-MIMO) network may be unscalable, computationally complex, and/or have low performance.

SUMMARY

As part of the development of embodiments herein, one or more challenges with the existing technology for combining and aggregating signals from different access points in the uplink of a D-MIMO network will first be identified and discussed.

Different levels of receiver processing and combining methods were proposed in [1]. Previous methods developed for D-MIMO and radio stripes for processing and combining use the minimum mean-square error (MMSE) to calculate the combining weights and estimate the received signals from each UE. There were also other methods, such as maximum-ratio combining (MRC), sequential MMSE (seq-MMSE) and zero-forcing (ZF) to cancel the interference, which are out-performed by MMSE combining. The different implementation for MMSE combining may be categorized as follows:

A first category may be considered to be the fully centralized processing and combining method which is called level 4 implementation. This method requires that all APs send all received signals, that is, pilot and data signals, over the fronthaul to a central processing unit (CPU) to combine the signals coherently. The first problem is that this requires a huge fronthaul capacity that grows with the number of APs in the network and the number of UEs that these APs serve. The second problem is that MMSE combining requires to calculate the inverse of covariance matrices, and the computational complexity grows with the number of APs and the number of antenna elements of each AP.

A second category may be considered to be the distributed local processing and centralized combining methods which may be called level 1-3 implementations. In these methods, instead of sending signals to the CPU, each AP pre-processes its signals by computing the local estimates of the data signal based on the locally available information. The estimated signals then pass to the CPU for calculating the combining weights for each UE. The performance with level 1-3 is below 40% of the achievable performance by level 4 implementation. There is also time a delay problem as the combining weights are calculated at the CPU, which requires to collect all estimated signals from APs.

A third category may be considered to be the distributed local processing and sequentially receive combining method which is called seq-MMSE. The estimated signal from one AP which is called soft estimate of AP is sequentially passed to the next AP, where its received signals jointly are processed with the soft estimate from previous AP. There are two problems with the method. Firstly, it is restricted by sequentially combining, which serves a serial connected radio stripe, but no other constellation in a D-MIMO network; Secondly, the joint process does not take the covariance matrix into account, hence the new soft estimate does not minimize the estimation error, the performance is about 50% lower than the fully centralized level 4 implementation.

All solutions have disadvantages: level 4 because of its huge, unscalable fronthaul capacity requirements and computational complexity to invert the covariance matrices. Level 1-3 because of low performance and time delay. Seq-MMSE because of the limitation with sequential processing and low performance.

According to the foregoing, it is an object of embodiments herein to improve the handling of data in a communications network.

According to a first aspect of embodiments herein, the object is achieved by a computer-implemented method, performed by a first network node. The method is for handling data. The first network node operates in the communications network. The first network node applies a Kalman filter (KF) of a first type. The applying of the Kalman filter of the first type is to a first aggregation of: a) a first set of measurements $y_l$ collected via a first plurality of antenna elements managed by the first network node, and b) a first set of filtered data $\hat{s}_0$. The first set of filtered data have been received from a second network node. The applying of the Kalman filter of the first type is using the first covariance matrix $P_0$. The applying of the Kalman filter $\mathcal{K}$ of the first type outputs a second set of filtered data $\hat{s}$, and a second covariance matrix P. The first network node also sends, in an uplink direction, the second set of filtered data $\hat{s}$ and the second covariance matrix P. The sending in is to one of: another network node subsequently adjacent to the first network node towards the central network node, and the central network node.

According to a second aspect of embodiments herein, the object is achieved by a computer-implemented method, performed by a second network node. The method is for handling data. The second network node operates in the communications network. The second network node applies a Kalman filter of a second type to two respective third sets of filtered data $\hat{s}(\mathcal{L}_1)$, $\hat{s}(\mathcal{L}_2)$ respectively received from each of two third network nodes operating in the communications network. The applying is performed using respective third covariance matrices $P(\mathcal{L}_1)$, $P(\mathcal{L}_2)$. The applying of the Kalman filter of the second type outputs the first set of filtered data $\hat{s}(\mathcal{L}_1 \cup \mathcal{L}_2)$, and the first covariance matrix $P(\mathcal{L}_1 \cup \mathcal{L}_2)$. The second network node then provides, in an uplink direction, the first set of filtered data $\hat{s}(\mathcal{L}_1 \cup \mathcal{L}_2)$ and the first covariance matrix $P(\mathcal{L}_1 \cup \mathcal{L}_2)$ to one of: a) the second network node for further processing, b) the first network node, and c) the central network node.

According to a third aspect of embodiments herein, the object is achieved by a computer-implemented method, performed by a central network node. The method is for handling data. The network node operates in the communications network. The central network node receives, from the first network node operating in the communications network, the second set of filtered data $\hat{s}$ and the second covariance matrix P. The second set of filtered data $\hat{s}$ and the second covariance matrix P have been obtained by having applied the Kalman filter of the first type to the first aggregation of the first set of measurements $y_1$ collected via the first plurality of antenna elements managed by first network node and the first set of filtered data $\hat{s}_0$ received from the second network node. The central network node detects one or more first radio signals $s_K$ based on the second set of filtered data $\hat{s}$ and the second covariance matrix P.

According to a fourth aspect of embodiments herein, the object is achieved by the first network node, for handling data. The first network node is configured to operate in the communications network. The first network node is configured to apply the Kalman filter of the first type to the first aggregation of the first set of measurements $y_l$ configured to be collected via the first plurality of antenna elements configured to be managed by the first network node, and the first set of filtered data $\hat{s}_0$ configured to be received from the second network node, using the first covariance matrix $P_0$. The applying of the Kalman filter $\mathcal{K}$ of the first type is configured to output the second set of filtered data $\hat{s}$, and the second covariance matrix P. The first network node is also configured send, in the uplink direction, the second set of filtered data $\hat{s}$ and the second covariance matrix P to one of: the another network node subsequently adjacent to the first network node towards the central network node, and the central network node.

According to a fifth aspect of embodiments herein, the object is achieved by the second network node, for handling data. The second network node is configured to operate in the communications network. The second network node is further configured to apply the Kalman filter of the second type to two respective third sets of filtered data $\hat{s}(\mathcal{L}_1)$, $\hat{s}(\mathcal{L}_2)$ configured to be respectively received from each of the two third network nodes configured to be operating in the communications network. The applying is configured to be performed using the respective third covariance matrices $P(\mathcal{L}_1)$, $P(\mathcal{L}_2)$. The applying of the Kalman filter of the second type is configured to output the first set of filtered data $\hat{s}(\mathcal{L}_1 \cup \mathcal{L}_2)$, and the first covariance matrix $P(\mathcal{L}_1 \cup \mathcal{L}_2)$. The second network node 112 is also configured to provide, in the uplink direction, the first set of filtered data $\hat{s}(\mathcal{L}_1 \cup \mathcal{L}_2)$ and the first covariance matrix $P(\mathcal{L}_1 \cup \mathcal{L}_2)$ to one of: a) the second network node for further processing, b) the first network node, and c) the central network node.

According to a sixth aspect of embodiments herein, the object is achieved by the central network node, for handling data. The central network node is configured to operate in the communications network. The central network node is further configured to receive, from the first network node configured to operate in the communications network, the second set of filtered data $\hat{s}$ and the second covariance matrix P. The second set of filtered data $\hat{s}$ and the second covariance matrix P are configured to have been obtained by having applied the Kalman filter of the first type to the first aggregation of the first set of measurements $y_l$ collected via the first plurality of antenna elements configured to be managed by the first network node and the first set of filtered data $\hat{s}_0$ configured to be received from the second network node. The central network node is configured to detect the one or more first radio signals $s_K$ based on the second set of filtered data $\hat{s}$ and the second covariance matrix P.

By the first network node applying the Kalman filter of the first type to the first aggregation of the first set of measurements $y_l$, and the first set of filtered data $\hat{s}_0$, the first network node may be enabled to further process the measurements of the one or more first radio signals. The received signal from the antennas may be understood to be a sum of signals transmitted by many wireless devices. To be able to find the signal that each individual wireless device may have transmitted, the Kalman Filter may be used to provide the optimal estimate by minimizing the estimation error, that is, the minimum mean square error. The more measurements, the better estimation of the signals that wireless devices have transmitted that may be obtained.

By the first network node then sending the second set of filtered data $\hat{s}$ and the second covariance matrix P, the first network node may enable that signals from different network nodes, e.g., access points, such as the first network node, the second network node and the another network node in the uplink may be combined and aggregated. The estimation of the signals that the devices may have transmitted may then be enabled to be updated based on both the measurements and covariance of the estimation in order to optimize the estimation of the signals that wireless devices have transmitted, that is, in terms of mean square errors of the signals and the estimated signals.

By the second network node applying the Kalman filter of the second type to the two respective third sets of filtered data $\hat{s}(\mathcal{L}_1)$, $\hat{s}(\mathcal{L}_2)$ respectively received from each of the two third network nodes operating in the communications network, the second network node may enable to output the first set of filtered data $\hat{s}(\mathcal{L}_1 \cup \mathcal{L}_2)$, and the first covariance matrix $P(\mathcal{L}_1 \cup \mathcal{L}_2)$. The second network node may then be enabled to provide, in the uplink direction, the first set of filtered data $\hat{s}(\mathcal{L}_1 \cup \mathcal{L}_2)$ and the first covariance matrix $P(\mathcal{L}_1 \cup \mathcal{L}_2)$ to the first network node, or directly to the central network node, or further process it itself. The application of the second Kalman filter stage may enable that signal estimates and covariance estimates from different sub-sets of network nodes, e.g., APs, may be combined and aggregated in a very scalable trade-off between complexity and performance.

The Kalman Filter may be applied both in centralized and decentralized processing and combining. When applied to the decentralized processing and combining, the Kalman Filter may be understood to provide the flexibility to aggregate the estimates in different topologies, e.g. star, serial parallel or grid. The performance upper bound may be approached by incrementing the sub-set size stepwise.

Applying the Kalman Filter, both of the first type and of the second type, to an update of an estimate or a new estimate of the signals that wireless devices may have transmitted may enable to achieve the advantage of scalability since the same implementation, the Kalman filter formula, may be used to aggregate more and more network nodes. The more network nodes, the better performance, since each added network node may provide new information, either the measurement received at the network node, or the estimate of signal received from other network nodes. The more information, the better estimate that may be achieved.

By the central network node receiving, from the first network node, the second set of filtered data $\hat{s}$ and the second covariance matrix P, the central network node may then be enabled to detect the one or more first radio signals $s_K$ based on the second set of filtered data $\hat{s}$ and the second covariance matrix P in a way that signal estimates and covariance estimates from different sub-sets of network nodes, e.g., APs, may be combined and aggregated in a very scalable trade-off between complexity and performance.

BRIEF DESCRIPTION OF THE DRAWINGS

Examples of embodiments herein are described in more detail with reference to the accompanying drawings, and according to the following description.

DETAILED DESCRIPTION

Certain aspects of the present disclosure and their embodiments may provide solutions to these challenge or other challenges. There are, proposed herein, various embodiments which address one or more of the issues disclosed herein.

As a summarized overview, embodiments herein may be understood to relate to optimal D-MIMO processing using Kalman Filtering. Particularly, embodiments herein may be understood to relate to enabling the Kalman filter to calculate the combining vector that may minimize an estimation error at each step of incrementation when aggregating APs in a D-MIMO network.

A first type of Kalman filter may be used for updating the signal estimation with information from a local antenna panel in each AP, and a second type of Kalman filter may be used to combine signal estimates from different sub-sets of APs.

As a general overview, embodiments herein may be understood to also relate to methods wherein two stages of Kalman filters may be used for combining and aggregating signals from different access points in the uplink of a D-MIMO network.

In the first Kalman filter stage, signals from a local antenna panel may be used to produce an update of a signal estimate and a covariance estimate.

In the second Kalman filter stage, signal estimates and covariance estimates from different sub-sets of APs may be combined.

The square-root implementation of the Kalman filter may be used, which may provide a numerically sound and very computationally efficient implementation of inverting the covariance matrix.

The Kalman filter implementation may further be used as the precoding for the downlink transmission.

Some of the embodiments contemplated will now be described more fully hereinafter with reference to the accompanying drawings, in which examples are shown. In this section, the embodiments herein will be illustrated in more detail by a number of exemplary embodiments. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art. It should be noted that the exemplary embodiments herein are not mutually exclusive. Components from one embodiment may be tacitly assumed to be present in another embodiment and it will be obvious to a person skilled in the art how those components may be used in the other exemplary embodiments.

Note that although terminology from LTE/5G has been used in this disclosure to exemplify the embodiments herein, this should not be seen as limiting the scope of the embodiments herein to only the aforementioned system. Other wireless systems with similar features, may also benefit from exploiting the ideas covered within this disclosure.

Figure 2A:
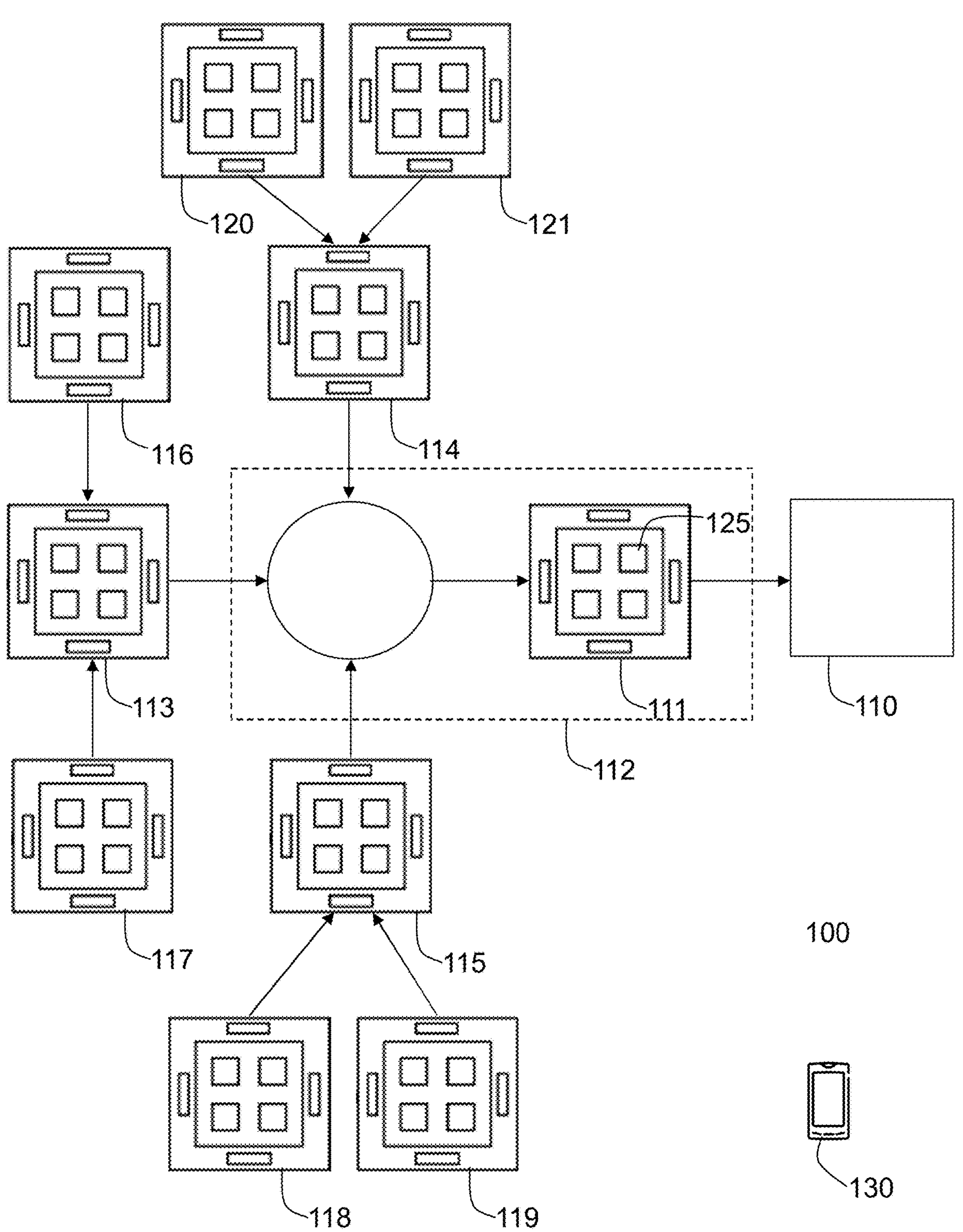
FIGS. 2*a*-2*c* are schematic diagrams illustrating three respective non-limiting examples of a communications network, according to embodiments herein.
Figure 2B:
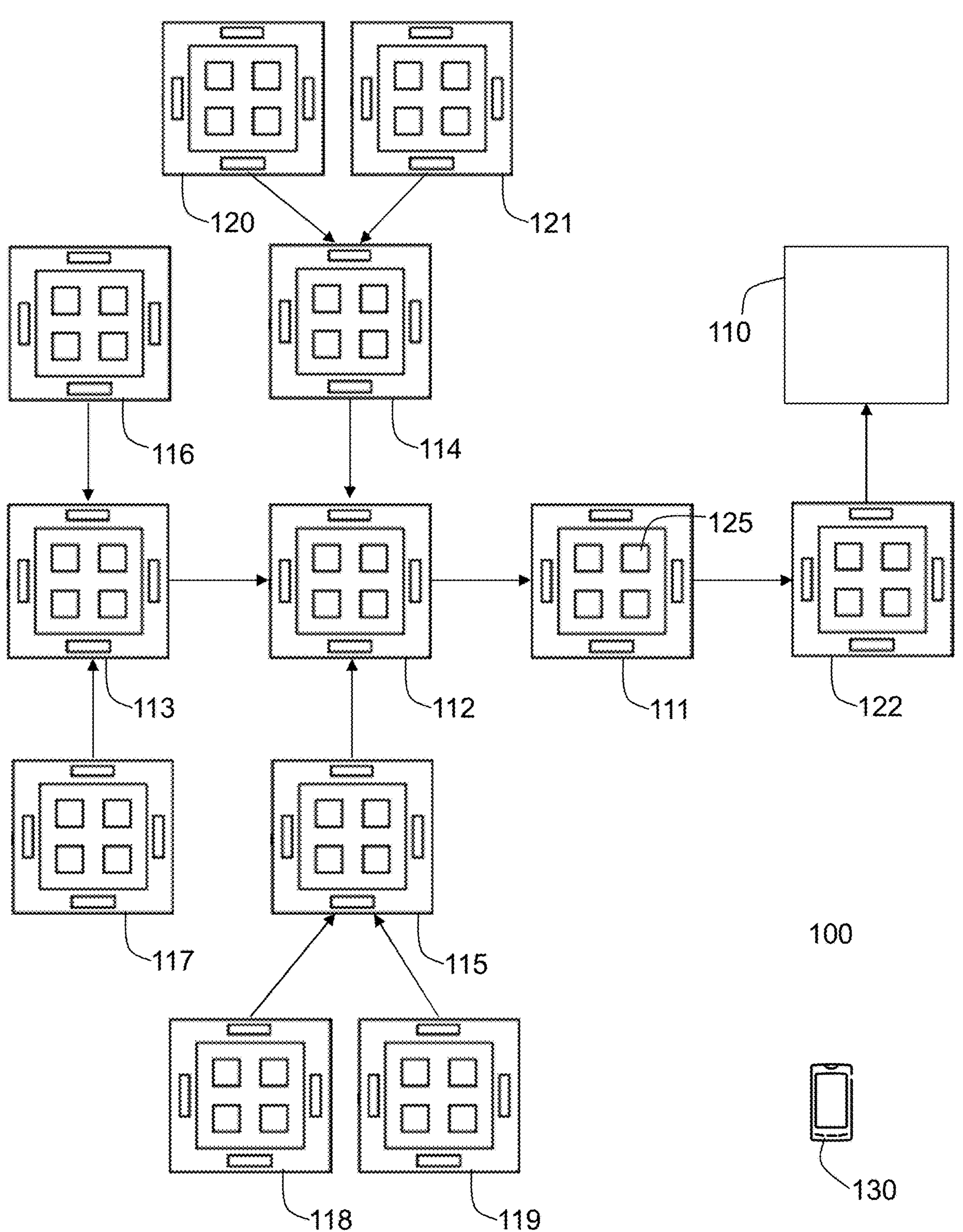
Figure 2C:
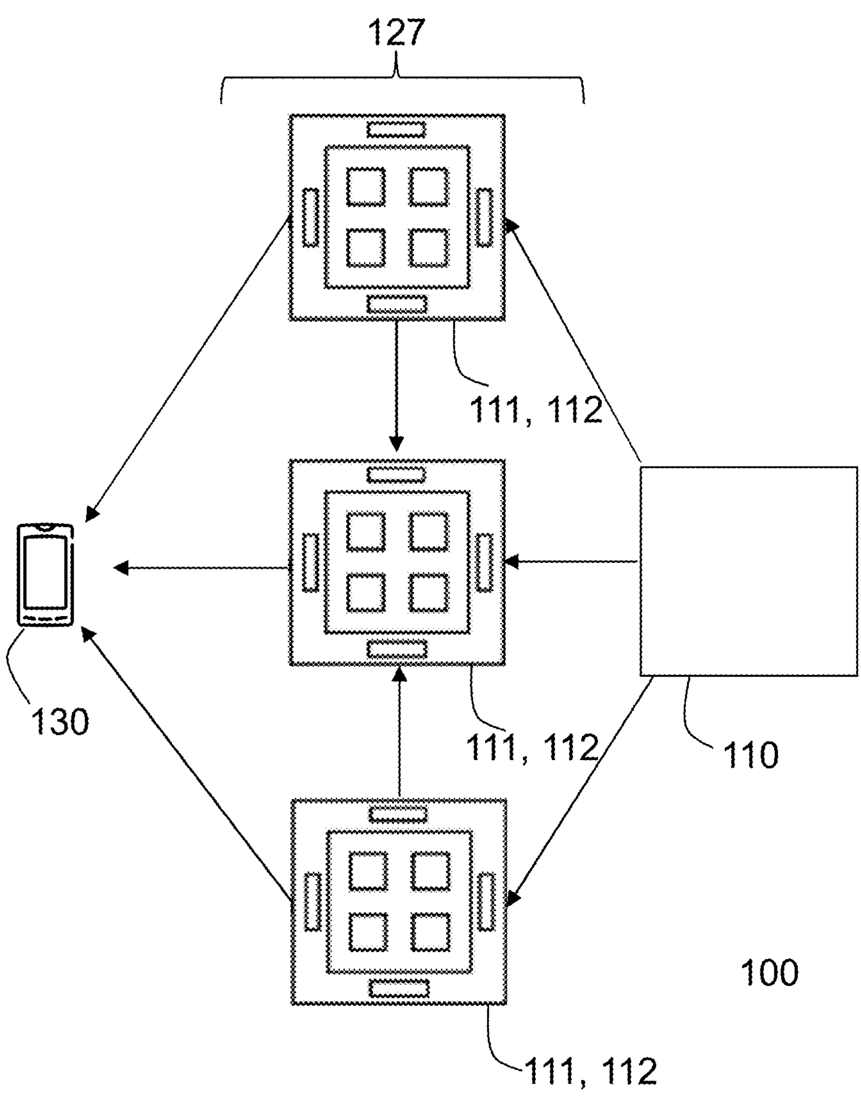

FIGS. 2*a*-2*c* respectively depicts three non-limiting examples of a communications network 100, sometimes also referred to as a communication system, such as a wireless communications network, wireless communications system, cellular radio system, or cellular network, in which embodiments herein may be implemented. The communications network 100 may typically be a 5G system, 5G network, NR-U or Next Gen System or network, Licensed-Assisted Access (LAA), or MulteFire. The communications network 100 may support a younger system than a 5G system. The communications network 100 may support other technologies, such as, for example Long-Term Evolution (LTE), LTEAdvanced/LTE-Advanced Pro, e.g. LTE Frequency Division Duplex (FDD), LTE Time Division Duplex (TDD), LTE Half-Duplex Frequency Division Duplex (HD-FDD), LTE operating in an unlicensed band, etc. . . . Other examples of other technologies the communications network 100 may support may be Wideband Code Division Multiple Access (WCDMA), Universal Terrestrial Radio Access (UTRA) TDD, Global System for Mobile Communications (GSM) network, Enhanced Data Rates for GSM Evolution (EDGE) network, GSM EDGE Radio Access Network (GERAN) network, Ultra-Mobile Broadband (UMB), network comprising of any combination of Radio Access Technologies (RATs) such as e.g. Multi-Standard Radio (MSR) base stations, multi-RAT base stations etc., any 3rd Generation Partnership Project (3GPP) cellular network, WiFi networks, Worldwide Interoperability for Microwave Access (WiMax), IoT, Narrowband Internet of Things (NB-IoT), or any cellular network or system. Thus, although terminology from 5G/NR and LTE may be used in this disclosure to exemplify embodiments herein, this should not be seen as limiting the scope of the embodiments herein to only the aforementioned systems.

The communications network 100 comprises a plurality of network nodes in an arrangement of network nodes towards a central network node 110 or managing network node. The arrangement may be understood as a spatial arrangement, wherein the plurality of network nodes may be geographically distributed. The plurality of network nodes comprises a first network node 111 and a second network node 112, as depicted in FIGS. 2*a-c*. In the arrangement, there may be one or more network nodes 113, 114, 115 preceding the second node 112, which may comprise, as depicted in FIGS. 2*a* and 2*b*, third network nodes 113, 115 and a fourth network node 114. The third network nodes 113, 115 may be understood as comprising a first third network node 113 and a second third network node 115 or fifth network node 115.

In the arrangement, there may be one or more network nodes 116, 117, 118, 119 preceding the respective third network node 113, 115, which may comprise, as depicted in FIGS. 2*a* and 2*b*, a sixth network node 116, a seventh network node 117, an eighth network node 118 and a ninth network node 119, wherein the sixth network node 116, and the seventh network node 117 may precede the first third node 113, and the eighth network node 118 and the ninth network node 119 may precede the second third node 115.

In the arrangement, there may be one or more network nodes 120, 121 preceding the fourth network node 114, which may comprise, as depicted in FIGS. 2*a* and 2*b*, a tenth network node 120 and an eleventh network node 121.

The term "preceding" may be understood to mean that, in the arrangement, a certain network node is further away from the central network node 110, or that it processes information before it is further processed by the certain network node.

In some embodiments such as that depicted in FIG. 2*b*, the arrangement may further comprise another network node 122. The another network node 122 may be subsequently adjacent to the first network node 111 towards a central network node 110.

The arrangement may have different shapes, such as serial, parallel or grid. That is, the arrangement may be understood to be flexible, with different topologies. In some non-limiting examples, some of the network nodes, which may be adjacent to each other, may be located forming stripes, e.g., forming a single line of adjacently located network nodes. The arrangement may additionally or alternatively be comprised of different branches of adjacently located network nodes, wherein the branches may radially end converge at the central network node 110.

Any of the central network node 110, the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122 may be a radio network node or a transmission point such as a radio base station, capable of serving a wireless device, such as a user equipment or a machine type communication device, in the communications network 100.

Any of the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122 may be a an access point (AP) or a transmission point and may have a fronthaul connection to the central network node 110. As access points, any of of the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122 may manage a respective plurality of antenna elements. The first network node 111 manages a first plurality of antenna elements 125.

The central network node 110 may be also referred to herein as a Central Processing Unit (CPU). The central network node 110 may be understood as a network node having a capability to coordinate the operation of the plurality of network nodes, e.g., the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122. The central network node 110 may be directly connected to one or more core networks through one or more backhaul connections.

In some examples, the central network node 110 may be a base station, such as a gNB in 5G or an eNB in 4G. In other examples, the network node 110 may be a distributed node, such as a virtual node in the cloud, and may perform its functions entirely on the cloud, or partially, in collaboration with a radio network node.

The communications network 100 may cover a geographical area, which in some embodiments may be divided into cell areas, wherein each cell area may be served by a radio network node, although, one radio network node may serve one or several cells. In the examples of FIGS. 2*a*-2*c*, cells are not represented. Any of the central network node 110, the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122 may be of different classes, such as, e.g., macro eNodeB, home eNodeB or pico base station, based on transmission power and thereby also cell size. In some examples, any of the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122 may serve receiving nodes with serving beams. The radio network node may support one or several communication technologies, and its name may depend on the technology and terminology used.

In some embodiments, the first network node 111 and the second network node 112 may be co-localized or be the same node, as schematically depicted in FIG. 2*a* by the rectangle with dashed lines.

While FIGS. 2*a* and 2*b* illustrate examples wherein the communications network 100 may comprise a single first network node 111, the communications network 100 may comprise a plurality of first network nodes 127. This is schematically represented in FIG. 2*c*, wherein the plurality of first network nodes 127 comprises three first network nodes 111. Each of the first network nodes 111 in the plurality of first network nodes 127 may have a respective arrangement similar to that depicted in FIGS. 2*a* and 2*b*. This is not depicted in FIG. 2*c* to simplify the figure.

The communications network 100 may also comprise a plurality of second network nodes such as the second network node 112.

One or more wireless devices 130 may be comprised in the wireless communication network 100, represented as a single wireless device in the non-limiting examples of FIGS. 2*a*-2*c*. Any of the one or more wireless devices 130 comprised in the communications network 100 may be a wireless communication device such as a 5G UE, or a UE, which may also be known as e.g., mobile terminal, wireless terminal and/or mobile station, a Customer Premises Equipment (CPE) a mobile telephone, cellular telephone, or laptop with wireless capability, just to mention some further examples. Any of the one or more wireless devices 130 comprised in the communications network 100 may be, for example, portable, pocket-storable, hand-held, computer-comprised, or a vehicle-mounted mobile device, enabled to communicate voice and/or data, via the RAN, with another entity, such as a server, a laptop, a Personal Digital Assistant (PDA), or a tablet, Machine-to-Machine (M2M) device, device equipped with a wireless interface, such as a printer or a file storage device, modem, or any other radio network unit capable of communicating over a radio link in a communications system. Any of the one or more wireless devices 130 comprised in the communications network 100 may be enabled to communicate wirelessly in the communications network 100. The communication may be performed e.g., via a RAN, and possibly the one or more core networks, which may be comprised within the communications network 100.

The first network node 111 may be configured to communicate within the communications network 100 with the central network node 110 over a first link, e.g., a radio link or a wired link. Any of the network nodes in the plurality of network nodes may be configured to communicate with their adjacent network node in the arrangement over a respective link. Any of the one or more wireless devices 130 may be configured to communicate within the communications network 100 with any of the network nodes over another respective link, e.g., a radio link, for example a first beam.

Links are represented by arrows in FIGS. 2*a*-2*c*. While the arrows may be depicted unidirectional, it may be understood that each of the links may be capable of bidirectional communication.

In general, the usage of “first”, “second”, “third”, “fourth”, “fifth”, “sixth”, “seventh”, “eighth”, “ninth”, tenth and/or “eleventh” herein may be understood to be an arbitrary way to denote different elements or entities, and may be understood to not confer a cumulative or chronological character to the nouns they modify.

Several embodiments are comprised herein. It should be noted that the examples herein are not mutually exclusive. Components from one embodiment may be tacitly assumed to be present in another embodiment and it will be obvious to a person skilled in the art how those components may be used in the other exemplary embodiments.

More specifically, the following are embodiments related to a first network node, such as the first network node 111, e.g., a first AP, embodiments related to a second network node, such as the second network node 112, e.g., a second AP, and embodiments related to a central network node, such as the central network node 110, e.g., a CPU.

Some embodiments herein will now be further described with some non-limiting examples.

In the following description, any reference to a/the CPU or central processing unit may be understood to equally refer to the central network node 110; any reference to a/the AP may be understood to equally refer to any of the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122; any reference to a/the aggregating AP may be understood to equally refer to the second network node 112; any reference to (the) UEs may be understood to equally refer the one or more wireless devices 130.

To assist in the understanding of embodiments herein, an overview of the methods used herein will be described first.

Figure 1:
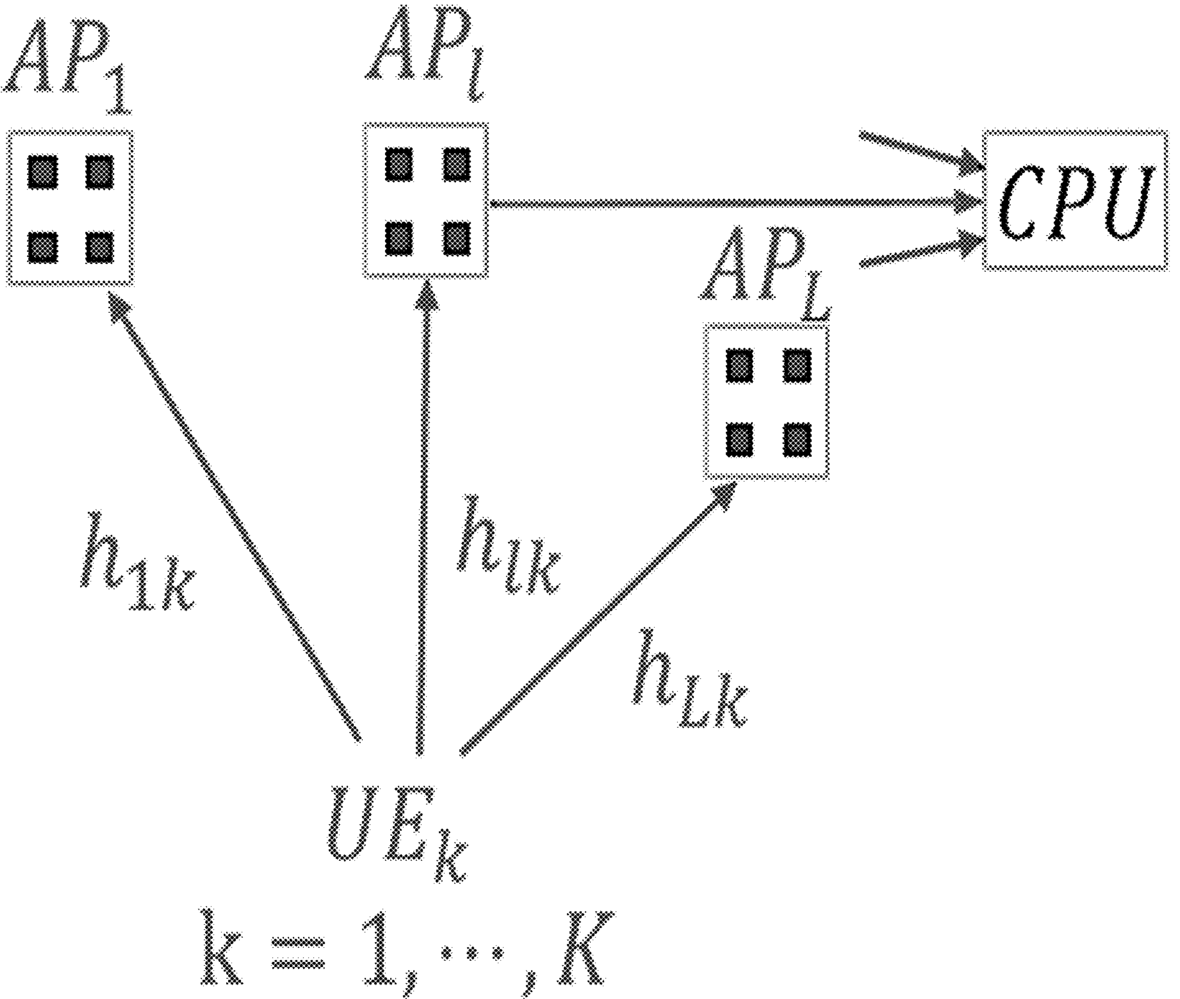
FIG. 1 is a schematic diagram representing a non-limiting example of uplink transmission from UE and receiving at APs, according to existing methods.

Instead of sending all antenna element signals to the CPU, as shown in FIG. 1 on the left, a sequentially processing and combining method was proposed in [1]. This disclosure may be understood to generalize and significantly improve the method in [1] by using two types of Kalman filter processing for uplink processing in a D-MIMO system. A first type of Kalman filter, Kalman filter type 1, may be used for updating the signal estimation with information from a local antenna panel in each AP, and a second type of Kalman, Kalman filter type 2, filter may be used to combine signal estimates from different sub-sets of APs.

Kalman Filter Type 1: Antenna Signal Update

To enable the formulation of the Kalman filter at each AP, the signal and the channel between all UEs and AP l may be rewritten in more compact vector or matrix forms in the following. The received data signal at AP l may be written as $y_l=H_l s+n_l$, where the channel is $H_l=[h_{l1}, \ldots, h_{lK}]$, and transmitted signals from all UEs is the state of vector $$s = \begin{bmatrix} s_1 \\ \vdots \\ s_K \end{bmatrix}.$$

The Kalman filter, here denoted Type 1 Kalman filter to distinguish from the Type 2 Kalman filter to be described below, may provide the estimate of the state vector $\hat{s}$ at AP l as:

$$\hat{s} = \hat{s}_0 + \mathcal{K}(y_l - H_l \hat{s}_0)$$

Which may be understood to minimize the mean-square error (MSE) $MSE=\mathbb{E}\{|s-\mathcal{K} y_l|^2\}$. The initial state vector, or the initial values to be used in the Kalman filter, for the first AP in a sub-set may be selected as $\hat{s}_0=0$, while the transmitted signal may have a normal distribution as $s\sim\mathcal{N}_C(0, P_0)$ where $P_0=\mathrm{diag}(p_1, \ldots, p_K)$, and where $p_k$ may be understood to be the transmit power of UE k, that is, of a respective wireless device of the one of the one or more wireless devices 130.

The combining vector $v_k$ given by level 4 implementation as described in the Section entitled "Level 4: Fully centralized combining" may assume that the channel $H_l$ is unknown, but the estimate of the channel may be done locally at each AP based on known pilot signals transmitted from UEs. Let $\hat{H}_l=[\hat{h}_{l1}, \ldots, \hat{h}_{lK}]$ be the estimate of channel $H_l$, see [2] for a detailed description of channel estimation. Applying the estimation of the channel, the estimate of the state vector s may then be written as:

$$\hat{s} = \hat{s}_0 + \mathcal{K}(y_l - \hat{H}_l \hat{s}_0),$$
$$l = 1, \ldots, L$$

and the covariance matrix of the Kalman filter may be given by:

$$P = P_0 - P_0 \hat{H}_l^H \left(\hat{H}_l P_0 \hat{H}_l^H + R_l\right)^{-1} \hat{H}_l P_0$$

The Kalman filter gain may be given by:

$$\mathcal{K} = P_0 \hat{H}_l^H \left(\hat{H}_l P_0 \hat{H}_l^H + R_l\right)^{-1}$$

where $R_l$ is the covariance matrix including both the correlation matrix of the channel estimation error and receiver noise, R $$R_l = \sum_{k=1}^{K} p_k C_{kl} + \sigma^2 I.$$

It has been shown that the combining vector for all UEs may be equivalent to the Kalman filter gain $\mathcal{K}$. Hence, the combining weights for all UEs may be $$\mathcal{K} = \begin{bmatrix} v_1 \\ \vdots \\ v_K \end{bmatrix}.$$

For each UE k the combining vector $v_k$ may be the same as it is given in level 4 implementation.

Kalman Filter Type 2: Sub-Set Combining Update

When APs are connected, serial, parallel or grid, the Kalman filter may be used at aggregating APs to improve the estimation and performance each time a new AP may be added to the aggregating APs. This may also be valid when one AP may forward the estimate to another AP for a joint combining. It has been shown that the estimate of data signal at any aggregating AP may be obtained by the estimation of the state vector from the Kalman filter whenever a new measurement from additional AP l may become available. A generalized form of using the Kalman filter at aggregating sub-sets of APs may be as described in the following.

Let $\mathcal{L}_1$ and $\mathcal{L}_2$ be two subsets of APs for which a state and covariance pair may be available. That is, from sub-set $\mathcal{L}_1$ we have $\hat{s}(\mathcal{L}_1)$ and $P(\mathcal{L}_1)$ and from sub-set $\mathcal{L}_2$ we have $\hat{s}(\mathcal{L}_2)$ and $P(\mathcal{L}_2)$.

The Type 2 Kalman that may combine this information may be defined as $$\hat{s}(\mathcal{L}_1 \cup \mathcal{L}_2) = \hat{s}(\mathcal{L}_1) + \mathcal{K}(\hat{s}(\mathcal{L}_2) - \hat{s}(\mathcal{L}_1)),$$
$$P(\mathcal{L}_1 \cup \mathcal{L}_2) = P(\mathcal{L}_1) - \mathcal{K} P(\mathcal{L}_1)$$

where $$\mathcal{K} = P(\mathcal{L}_1)(P(\mathcal{L}_1) + P(\mathcal{L}_2))^{-1}$$

The new state vector $\hat{s}(\mathcal{L}_1 \cup \mathcal{L}_2)$ may update the state vector from $\hat{s}(\mathcal{L}_1)$ and $\hat{s}(\mathcal{L}_2)$ and the new covariance matrix $P(\mathcal{L}_1 \cup \mathcal{L}_2)$ may be updated from the covariance matrix $P(\mathcal{L}_1)$ and $P(\mathcal{L}_2)$.

The advantage of using the Kalman filter in this context may understood to be that the upper bound performance provided by the fully centralized processing and combining level 4 implementation may be reached by the subset combining, where all sub-sets that connected to the same AP may be aggregated.

Embodiments of a computer-implemented method performed by a first network node, such as the first network node 111, will now be described with reference to the flowchart depicted in FIG. 3. The method may be understood to be for handling data. The first network node 111 operates in the communications network 100.

The communications network 100 may be a 5G network.

In some embodiments, the first network node 111 may be a first AP, e.g., AP l.

Several embodiments are comprised herein. In some embodiments all the actions may be performed. In some embodiments, two or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the first network node 111 is depicted in FIG. 3.

Figure 3:
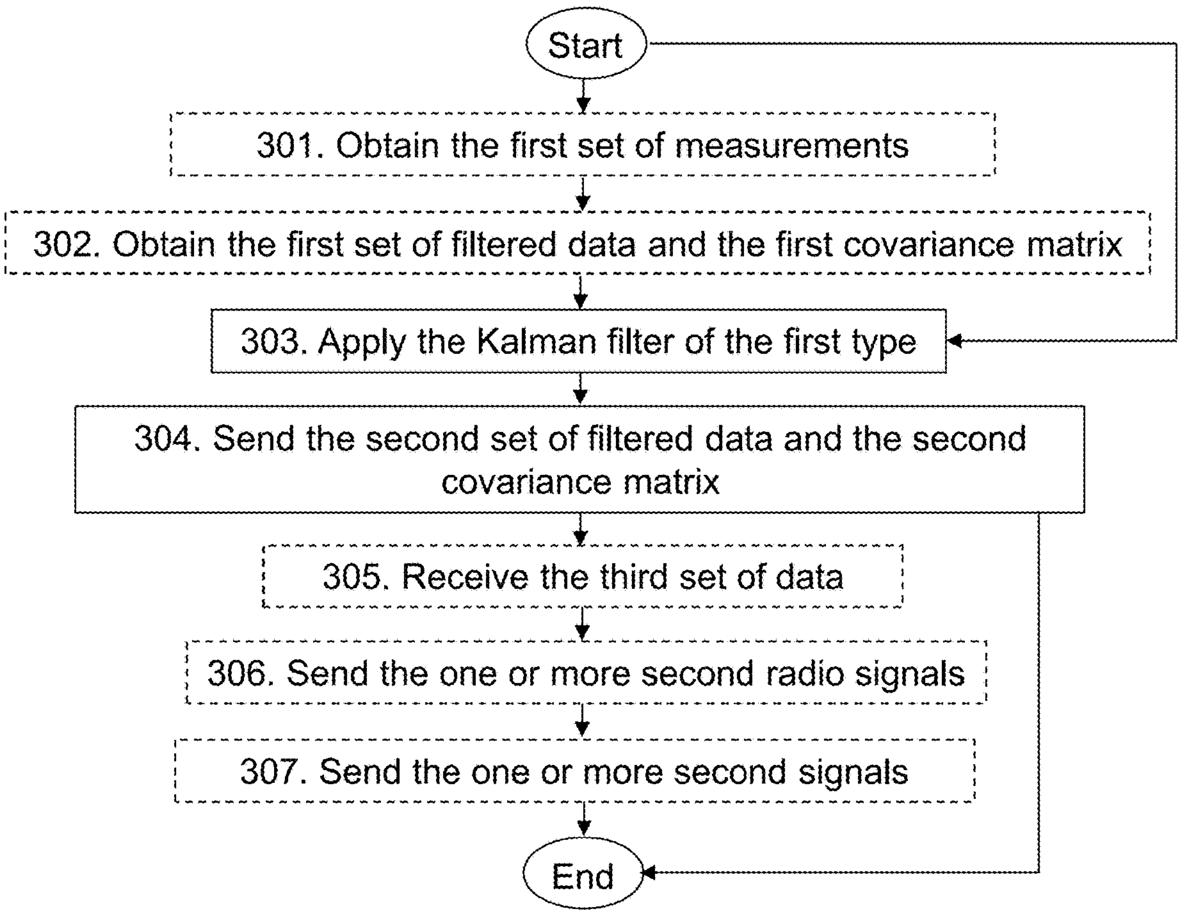
FIG. 3 is a flowchart depicting an example of a method performed by a first network node, according to embodiments herein.

In FIG. 3, optional actions are depicted with dashed boxes.

Action 301

In this Action 301, the first network node 111 may obtain, via the first plurality of antenna elements 125, a first set of measurements $y_l$ of one or more first radio signals $s_K$ respectively received from the one or more wireless devices 130.

The signals may have been received via the first plurality of antenna elements 125 managed by the first network node 111.

To enable the formulation of the Kalman filter at each AP, the signal and the channel between all UEs and AP l may be rewritten in more compact vector or matrix forms in the following. The received data signal at AP l may be written as $y=H_l s+n_l$, where the channel is $H_l=[h_{l1}, \ldots, h_{lK}]$, and transmitted signals from all UEs is the state vector $$s=\begin{bmatrix} s_1 \\ \vdots \\ s_K \end{bmatrix}.$$

The one or more first radio signals $s_K$, may be, for example signals transmitted by users, one for each user.

Obtaining may be understood as receiving, detecting, etc.

The channel $H_l$ is unknown, but the estimate of the channel can be done locally at each AP based on known pilot signals transmitted from UEs, see Section entitled "Distributed Multiple Input Multiple Output (D-MIMO) network" or [2] for a detailed description of channel estimation.

By obtaining the first set of measurements in this Action 301, the first network node 111 may be enabled to then process the first set of measurements as will be described in the next actions.

Action 302

In this Action 302, the first network node 111 may obtain, from the second network node 112 a first set of filtered data $\hat{s}_0$. The first set of filtered data $\hat{s}_0$ may comprise data on measurements of the one or more first radio signals $\hat{s}_K$ as: a) received by: a.i) the second network node 112, a.ii) the one or more network nodes 113, 114, 115 preceding the second network node 112 in the arrangement, or a.iii) both, and b) filtered with one or more Kalman filters $\mathcal{K}$. The one or more Kalman filters may be of a first type, of a second type, or both. Each of these types will be described further down.

In this Action 302, the first network node 111 may also obtain a first covariance matrix $P_0$ of the one or more Kalman filters. The covariance matrix of a Kalman filter may be understood to be a measure of the estimation errors when the estimate of a signal may be performed by using Kalman filter.

The initial state vector, or the initial values to be used in the Kalman filter, for the first AP in a sub-set may be selected as $\hat{s}_0=0$, while the transmitted signal may have a normal distribution as $s\sim\mathcal{N}_C(0,P_0)$ where $P_0=\mathrm{diag}(p_1, \ldots, p_K)$, and where $p_k$ may be understood to be the transmit power of UE k, that is, of a respective wireless device of the one of the one or more wireless devices 130.

The second network node 112 may be another AP.

The second network node 112 may be adjacent to the first network node 111 in the arrangement of network nodes towards the central network node 110. The arrangement may be a D-MIMO arrangement.

In some embodiments, the first network node 111 and the second network node 112 may be the same network node.

Action 303

In this Action 303, the first network node 111 applies a Kalman filter (KF) of a first type, also referred to herein as KF type 1 or first Kalman filter. The applying of the Kalman filter of the first type is to a first aggregation of: a) the first set of measurements $y_l$ collected via the first plurality of antenna elements 125 managed by the first network node 111 in Action 301, and b) the first set of filtered data $\hat{s}_0$. The first set of filtered data have been received from the second network node 112 in Action 302. The applying in this Action 303 of the Kalman filter of the first type is using the first covariance matrix $P_0$. The applying in this Action 303 of the Kalman filter $\mathcal{K}$ of the first type outputs a second set of filtered data $\hat{s}$, and a second covariance matrix P.

In some embodiments, the one or more Kalman filters and the Kalman filter of the first type may be applied with square-root implementation. See the section entitled "Square-root implementation of Kalman filter" in Action 402 for further details.

The Kalman filter, here denoted Type 1 Kalman filter to distinguish from the Type 2 Kalman filter described earlier, may provide the estimate of the state vector $\hat{s}$ at AP l as:

$$\hat{s}=\hat{s}_0+\mathcal{K}(y_l-H_l\hat{s}_0)$$

Which may be understood to minimize the mean-square error $\mathrm{MSE}=\mathbb{E}\{|s-\mathcal{K}y_l|^2\}$.

The combining vector $v_k$ given by level 4 implementation as described in the Section entitled "Level 4: Fully centralized combining" may assume that the channel $H_l$ is unknown, but the estimate of the channel may be done locally at each AP based on known pilot signals transmitted from UEs. Let $\hat{H}_l=[\hat{h}_{l1}, \ldots, \hat{h}_{lK}]$ be the estimate of channel $H_l$, see [2] for a detailed description of channel estimation. Applying the estimation of the channel, the estimate of the state vector s may then be written as:

$$\hat{s}=\hat{s}_0+\mathcal{K}(y_l-\hat{H}_l\hat{s}_0),\ l=1, \ldots, L$$

and the covariance matrix of the Kalman filter may be given by:

$$P = P_0 - P_0\hat{H}_l^H\left(\hat{H}_l P_0 \hat{H}_l^H + R_l\right)^{-1}\hat{H}_l P_0$$

The Kalman filter gain may be given by:

$$\mathcal{K} = P_0\hat{H}_l^H\left(\hat{H}_l P_0 \hat{H}_l^H + R_l\right)^{-1}$$

where $R_l$ may be understood to be the covariance matrix including both the correlation matrix of the channel estimation error and receiver noise, $$R_l = \sum_{k=1}^{K} p_k C_{kl} + \sigma^2 I.$$

It has been shown that the combining vector for all UEs may be equivalent to the Kalman filter gain $\mathcal{K}$. Hence, the combining weights for all UEs may be $$\mathcal{K} = \begin{bmatrix} v_1 \\ \vdots \\ v_K \end{bmatrix}.$$

For each UE, k the combining vector $v_k$ may be the same as it may be given in level 4 implementation.

Action 304

In this Action 304, the first network node 111 sends, in an uplink direction, the second set of filtered data $\hat{s}$ and the second covariance matrix P. The sending in this Action 304 may be to one of: the another network node 122 subsequently adjacent to the first network node 111 towards the central network node 110, and the central network node 110. In other words, the first network node 111 may send the second set of filtered data $\hat{s}$ and the second covariance matrix P to the next network node, e.g., AP, towards the central network node 110, or directly to central network node 110, if there may be no further network nodes in between the first network node 111 and the central network node 110, e.g., the first network node 111 is the last network node on a strip.

Action 305

Embodiments herein may also comprise downlink signalling towards the one or more wireless devices 130.

In this Action 305, the first network node 111 may receive from the central network node 110 a third set of data r for transmission to the one or more wireless devices 130.

The receiving in this Action 305 may be understood to be in the downlink direction.

Action 306

In this Action 306, the first network node 111 may send, to the one or more wireless devices 130, via the first plurality of antenna elements 125, one or more second radio signals $$u_l = K_l^H r_l.$$

The one or more second radio signals may be based on the third set of data $r_l$ to which received third set of data a gain, e.g., a first gain, may have been applied. That is, may have been applied by the first network node 111. The first gain applied may be based on the Kalman filter that may have been applied in the uplink direction, reversed, e.g., the Kalman filter of the first type.

Linear Quadratic Regulator (LQR) Precoding-Duality of Uplink Kalman Filtering

Using the duality principle in optimization theory, the dual problem of the Kalman filtering may be the LQR problem. The uplink and downlink problems may be understood to be dual, but the parameters may be understood to need to be interpreted differently. In a D-MIMO network, the downlink may be understood to be an LQR problem, embodiments herein may apply the duality principle to solve the downlink precoding using the uplink Kalman filtering when the downlink and uplink channels may be reciprocal.

The duality of uplink and downlink will be illustrated later, in FIG. 9.

In the uplink, the signals $s \in \mathbb{C}^K$ transmitted from UEs may be received at $AP_l$, which may be written as $y_l = H_l s + n_l$, where n is the receiver noise at $AP_l$. As described in Section "Kalman filter type 1: Antenna signal update", the Kalman filter may give the optimal estimate of the signal $\hat{s} = \mathcal{K} y_l$. In the downlink, the data signal $r \in \mathbb{C}^K$, which may be available at the CPU, may need to be transmitted to UEs via a subset of APs. Let $y = H^H u + \tilde{e}$, the dual LQR problem may be formulated as to find u given the signal r so that the linear quadratic cost function $\mathbb{E}((y-r)^H \tilde{P}_0 (y-r) + u^H \tilde{\Sigma}^2 u)$ may be minimized. Here $\tilde{P}_0$ may be understood to be the weight on the quadratic error of the received signal and $\tilde{\Sigma}$ the weight on transmitted energy. The optimal solution may become $u = \mathcal{K}^H r$. When the CPU is connected to a subset of APs $\{AP_1, \ldots, AP_L\}$, the CPU may split the signal $r = r_1 + \ldots + r_L$ among the APs where $r_l$ may be tailored according to antenna gains of $AP_l$. For each $AP_l$, the precoding based on the duality of the uplink Kalman filter gain may become $$\mathcal{K}_l^H,$$

and $$u_l = \mathcal{K}_l^H r_l.$$

The received signal at UEs may become $$y = \sum_{l=1}^{L} H_l^H u_l + \tilde{e}.$$

Figure 10:
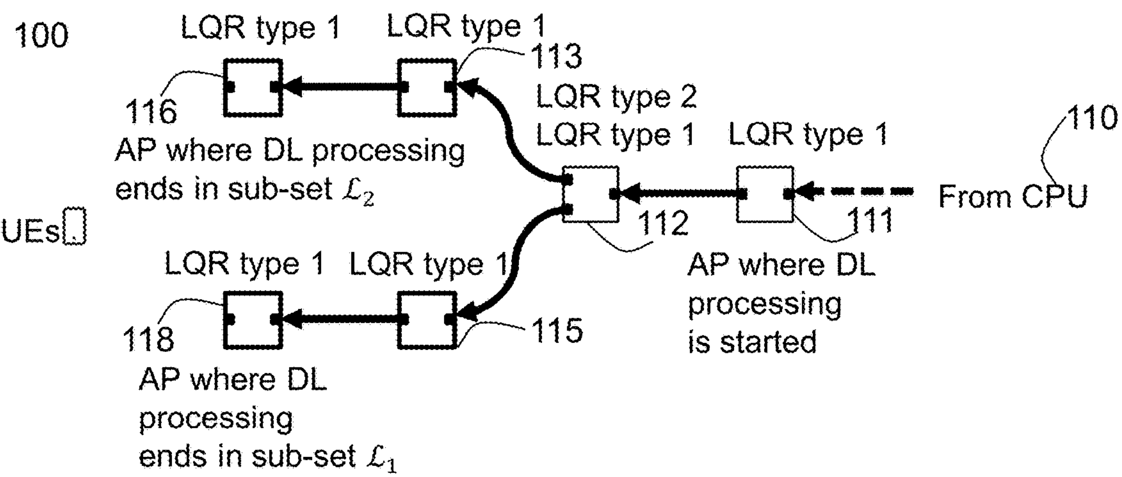
FIG. 10 is a schematic representation depicting a non-limiting example of aspects of a method according to embodiments herein.
Figure 10:
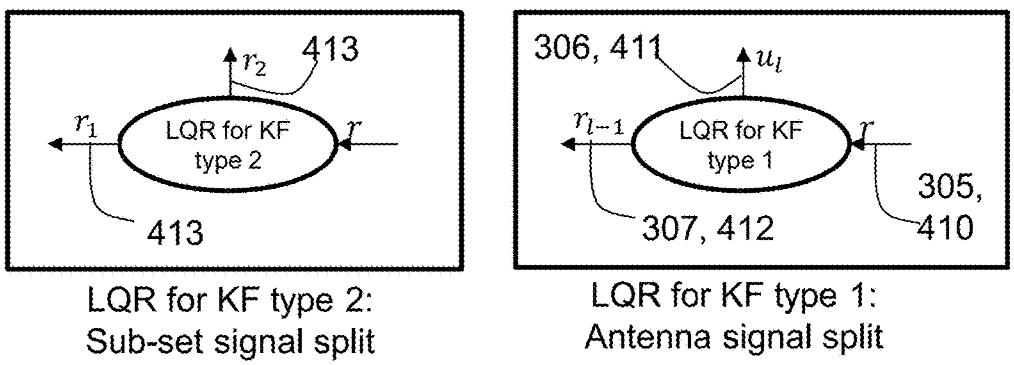

Using the duality, the signal may follow the same path from APs to CPU in the uplink combining, but backwards in the reverse order from CPU to APs, as will be shown in FIG. 10.

When APs may be parallelly connected, the split of the antenna signal for type 2 Kalman filter may be obtained by:

$$\begin{bmatrix} r_1 \\ r_2 \end{bmatrix} = \begin{bmatrix} I - K^H \\ K^H \end{bmatrix} r.$$

and for type 1 Kalman filter, the LQR precoding signal $$u_l = \mathcal{K}_l^H r_l$$

may be sent from $AP_l$ to all serving UEs. When APs may be serially connected, the signal may be split either from CPU or from $AP_l$ backwards to next AP, $AP_{l-1}$. The split for type 1 Kalman filter may be obtained by $$r_{l-1} = (I - H_l^H K_l^H) r$$

while the LQR precoding signal may become $$u_l = K_l^H r_l.$$

Action 307

In this Action 307, the first network node 111 may send, to the second network node 112, in a downlink direction, one or more second signals $r_{l-1}$. The one or more second signals may be based on the third set of data n, to which received third set of data r another gain, e.g., a second gain, may have been applied. That is, may have been applied by the first network node 111. The second gain may be based on e.g., the Kalman Filter that may have been applied in the uplink direction, reversed, e.g., the Kalman filter of the first type.

Embodiments of a computer-implemented method, performed by a second network node, such as the second network node 112, will now be described with reference to the flowchart depicted in FIG. 4. The method may be understood to be for handling the data. The second network node 112 operates in the communications network 100.

Several embodiments are comprised herein. In some embodiments all the actions may be performed. In some embodiments, two or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the second network node 112 is depicted in FIG. 4.

Figure 4:
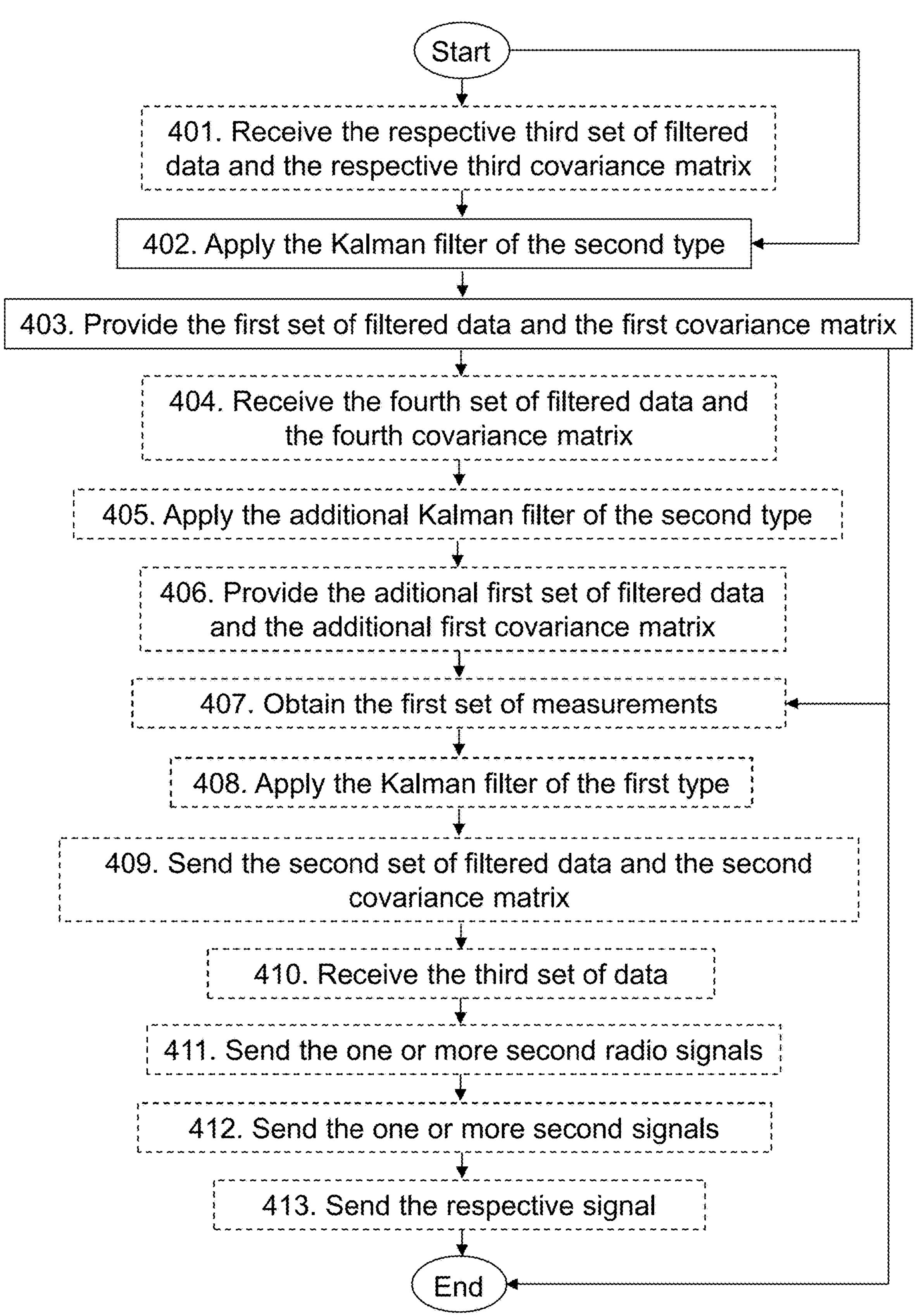
FIG. 4 is a flowchart depicting an example of a method performed by a second network node, according to embodiments herein.

In FIG. 4, optional actions are indicated with dashed boxes.

The detailed description of some of the features described for the method performed by the second network node 112 corresponds to that already provided when describing the method performed by the first network node 111 and will therefore not be repeated here. For example, in some embodiments, the second network node 112 may be the same network node as the first network node 111.

Action 401

In this Action 401, the second network node 112 may receive, respectively, from each of the two third network nodes 113, 115 the following. The second network node 112 may receive a respective third set of filtered data $\hat{s}(\mathcal{L}_1)$, $\hat{s}(\mathcal{L}_2)$. The respective third set of filtered data $\hat{s}(\mathcal{L}_1)$, $\hat{s}(\mathcal{L}_2)$ may comprise data on measurements of the one or more first radio signals, respectively received from one or more wireless devices 130, as: a) received by: a.i) the respective third network nodes 113, 115, a.ii) the one or more network nodes 116, 117, 118, 119 respectively preceding the respective third network node 113, 115 in the arrangement of network nodes towards the central network node 110, or a.iii) both, and b) filtered with one or more respective Kalman filters, e.g., by the Kalman Filters in the first third network node 113 and the second third network node 115, respectively, and optionally, e.g., additionally by the Kalman Filters in the one or more network nodes 116, 117, 118, 119 respectively preceding the respective third network node 113, 115 in the arrangement. The second network node 112 may also receive in this Action 401 a respective third covariance matrix of the one or more respective Kalman filters $P(\mathcal{L}_1)$, $P(\mathcal{L}_2)$. That is, a respective third covariance matrix from each of the two third network nodes 113, 115.

The two third network nodes 113, 115 may be network nodes 113, 115 preceding the second node 112 in the arrangement of network nodes towards the central network node 110.

Respective may be understood to mean that the second network node 112 may receive a third set of filtered data from each of the two third nodes 113, 115.

Action 402

When APs are connected, serial, parallel or grid, the Kalman filter may be used at aggregating APs to improve the estimation and performance each time a new AP may be added to the aggregating APs. This may also be valid when one AP may forward the estimate to another AP for a joint combining. It has been shown that the estimate of data signal at any aggregating AP may be obtained by the estimation of the state vector from the Kalman filter whenever a new measurement from additional AP l may become available.

In this Action 402, the second network node 112 applies the Kalman filter of a second type to the two respective third sets of filtered data $\hat{s}(\mathcal{L}_1)$, $\hat{s}(\mathcal{L}_2)$ respectively received from each of two third network nodes 113, 115 operating in the communications network 100 in Action 401. The applying in this Action 402 is performed using respective third covariance matrices $P(\mathcal{L}_1)$, $P(\mathcal{L}_2)$. The applying in this Action 402 of the Kalman filter of the second type outputs the first set of filtered data $\hat{s}(\mathcal{L}_1 \cup \mathcal{L}_2)$, and the first covariance matrix $P(\mathcal{L}_1 \cup \mathcal{L}_2)$.

A generalized form of using the Kalman filter at aggregating sub-sets of APs may be as described in the following.

Let $\mathcal{L}_1$ and $\mathcal{L}_2$ be two subsets of APs for which a state and covariance pair may be available. That is, from sub-set $\mathcal{L}_1$ we have $\hat{s}(\mathcal{L}_1)$ and $P(\mathcal{L}_1)$ and from sub-set $\mathcal{L}_2$ we have $\hat{s}(\mathcal{L}_2)$ and $P(\mathcal{L}_2)$.

The Type 2 Kalman that may combine this information may be defined as $$\hat{s}(\mathcal{L}_1 \cup \mathcal{L}_2) = \hat{s}(\mathcal{L}_1) + \mathcal{K}(\hat{s}(\mathcal{L}_2) - \hat{s}(\mathcal{L}_1)),$$

$$P(\mathcal{L}_1 \cup \mathcal{L}_2) = P(\mathcal{L}_1) - \mathcal{K}P(\mathcal{L}_1)$$

where $$\mathcal{K} = P(\mathcal{L}_1)(P(\mathcal{L}_1) + P(\mathcal{L}_2))^{-1}$$

The new state vector $\hat{s}(\mathcal{L}_1 \cup \mathcal{L}_2)$ may update the state vector from $\hat{s}(\mathcal{L}_1)$ and $\hat{s}(\mathcal{L}_2)$ and the new covariance matrix $P(\mathcal{L}_1 \cup \mathcal{L}_2)$ may be updated from the covariance matrix $P(\mathcal{L}_1)$ and $P(\mathcal{L}_2)$.

The advantage of using the Kalman filter in this context may understood to be that the upper bound performance provided by the fully centralized processing and combining level 4 implementation may be reached by the subset combining, where all sub-sets that connected to the same AP may be aggregated.

As explained earlier, any Kalman filter applied, e.g., the one or more respective Kalman filters and the Kalman filter of the second type, may be applied with square-root implementation.

Square-Root Implementation of Kalman Filter

One implementation aspect that may need to be considered may be how much time may be required for processing of the signals. The processing time may depend on computational processing time and the time for collecting the signals. Here, the most computational demanding operation may be understood to be to calculate the inverse of the covariance matrix. The number of elements in the covariance matrix may determine the computational complexity. By using the Kalman filter in the decentralized subset combining method, the signals may be processed locally at each AP, or collected at an aggregating AP or APs. The APs that may not be overlapping may process the signals in parallel, which may reduce the delay for processing and collecting the estimated signals. However, an aggregating AP or APs may have certain requirements on processing capabilities. With the square-root implementation of the Kalman filter, the number of operations for the Type 1 Kalman filter per AP may be ~NK(N+K), where N is the number of antenna elements at AP and K is the number of UEs. The total operations Type 1 Kalman filtering where L APs may be connected may thus be in the order of ~LNK (N+K), as has been shown. For Type 2 Kalman filter, where sub-sets may be aggregated, the number of operations may be ~$K^3$ per AP.

It has been shown that the Kalman filter may provide equivalent results whether the signals may be collected at CPU or at APs. This may be understood to imply that the required hardware capacity to process the signals may have different requirements whether the signals may be processed centralized at CPU or distributed at APs. The Kalman filter implementation may enable parallelization of the processing to many less capable processors at the distributed APs. Hence, by applying the Kalman filter implementation, the required hardware capacity may be gathered at CPU or distributed among APs.

Theoretical formulation of the Kalman filter, see Sections entitled "Kalman filter type 1: Antenna signal update", "Kalman filter type 2: Sub-set combining update" and "Using Kalman filters type 1 and type 2 for uplink D-MIMO processing", may give the optimal solution for the given measurements by the Kalman filter gain $\mathcal{K}$ and covariance matrix P. Numerically, the implementation of the Kalman filter may require the calculation of the inverse of a matrix where the singularity may be a numerical issue. Embodiments herein may use the square-root implementation to avoid singularity problem when inverse of the matrix.

In the square-root implementation, the covariance matrix P may be replaced by its square-root, S, such that $P=SS^T$. With the square-root implementation, the measurement update may be implemented using a QR factorization:

$$\begin{bmatrix} W & 0 \\ \tilde{\mathcal{K}} & S(+) \end{bmatrix} = \begin{bmatrix} R^{1/2} & HS(-) \\ 0 & S(-) \end{bmatrix} U$$

where U may be understood to be a unitary matrix and W and S(+) may be understood to be triangular matrices. The update of state vector may become:

$$\hat{s}(+) = \hat{s}(-) + \tilde{\mathcal{K}} W^{-1}(y_l - \hat{H}_l \hat{s}(-)),\ l = 1, \ldots, L$$

The update of the covariance matrix may become $P(+)=S(+)S^T(+)=P(-)-\tilde{\mathcal{K}}\tilde{\mathcal{K}}^T$.

The time required to perform QR factorization may depend on the capability of hardware processor at AP and CPU. If QR-factorization is performed with a single-core processor, the required processing time may be in the order of $\mathcal{O}$(NK(N+K)) at each AP. QR-factorization may have also the possibility to fully utilize modern multi-core processor, then the processing time may be reduced to $\mathcal{O}$(NK) if there are N+K parallel operations. The theoretical limit for such QR factorization is $\mathcal{O}$(N+K), which may require N(N+K) parallel computations for a multi-core hardware processor.

Action 403

The second network node 112 in this Action 403, provides, in the uplink direction, the first set of filtered data $\hat{s}(\mathcal{L}_1 \cup \mathcal{L}_2)$ and the first covariance matrix $P(\mathcal{L}_1 \cup \mathcal{L}_2)$ to one of: a) the second network node 112 for further processing, b) the first network node 111, as described earlier in Action 302, and c) the central network node 110. Option a) may be understood to correspond to internal or local processing. Option b) may be understood to correspond to embodiments wherein the first network node 111 may be next in the arrangement towards the central network node 110. Option c) may be understood to correspond to embodiments wherein there may be no further network nodes in the arrangement, between the second network node 112 and the central network node 110, e.g., the second network node 112 may be the last network node in a strip towards the central network node 110.

In some embodiments, the second network node 112 may be adjacent to the first network node 111 in the arrangement, and the arrangement may be a D-MIMO arrangement.

Action 404

In some embodiments, the second network node 112 may provide the first set of filtered data and the first covariance matrix to the second network node 112 for further processing, e.g., internally, that is, for sequential processing internally. In some of such embodiments, the method may comprise Action 404, Action 405 and Action 406.

In some embodiments wherein the second network node 112 may provide the first set of filtered data $\hat{s}(\mathcal{L}_1 \cup \mathcal{L}_2)$, and the first covariance matrix $P(\mathcal{L}_1 \cup \mathcal{L}_2)$ to the second network node 112 for further processing, the method may further comprise, in this Action 404, the second network node 112 receiving, from the fourth network node 114 operating in the communications network 100 the following. The second network node 112 may receive: i) a fourth set of filtered data $\hat{s}(\mathcal{L}_3)$. The fourth set of filtered data $\hat{s}(\mathcal{L}_3)$ may comprise data on measurements of the one or more first radio signals as: a) received by: a.i) the fourth network node 114, a.ii) the one or more network nodes 120, 121 preceding the fourth network node 114 in the arrangement of network nodes towards the central network node 110, or a.iii) both and b) filtered with one or more further Kalman filters, e.g., by the fourth network node 114, and optionally, e.g., additionally by the Kalman Filters in the one or more network nodes 120, 121 preceding the fourth network node 114 in the arrangement. The second network node 112 may also receive, ii) a fourth covariance matrix $P(\mathcal{L}_3)$ of the one or more further Kalman filters.

The one or more further Kalman filters may have been applied with square-root implementation.

Action 405

In some embodiments wherein the second network node 112 may provide the first set of filtered data $\hat{s}(\mathcal{L}_1 \cup \mathcal{L}_2)$, and the first covariance matrix $P(\mathcal{L}_1 \cup \mathcal{L}_2)$ to the second network node 112 for further processing, the method may further comprise, in this Action 405, the second network node 112 applying an additional Kalman filter of the second type to the fourth set of filtered data $\hat{s}(\mathcal{L}_3)$ and the first set of filtered data $\hat{s}(\mathcal{L}_1 \cup \mathcal{L}_2)$. The applying of the additional Kalman filter of the second type to the fourth set of filtered data and the first set of filtered data may be using the respective fourth covariance matrix $P(\mathcal{L}_3)$ and the first covariance matrix $P(\mathcal{L}_1 \cup \mathcal{L}_2)$. The applying in this Action 405 of the additional Kalman filter of the second type may output an additional first set of filtered data $\hat{s}(\mathcal{L}_1 \cup \mathcal{L}_2 \cup \mathcal{L}_3)$, and an additional first covariance matrix $P(\mathcal{L}_1 \cup \mathcal{L}_2 \cup \mathcal{L}_3)$.

The additional Kalman filter of the second type may have been applied with square-root implementation.

Action 406

In some embodiments wherein the second network node 112 may provide the first set of filtered data $\hat{s}(\mathcal{L}_1 \cup \mathcal{L}_2)$, and the first covariance matrix $P(\mathcal{L}_1 \cup \mathcal{L}_2)$ to the second network node 112 for further processing, the method may further comprise, in this Action 406, the second network node 112 providing, in the uplink direction, the additional first set of filtered data $\hat{s}(\mathcal{L}_1 \cup \mathcal{L}_2 \cup \mathcal{L}_3)$ and the additional first covariance matrix $P(\mathcal{L}_1 \cup \mathcal{L}_2 \cup \mathcal{L}_3)$. The providing of the additional first set of filtered data and the additional first covariance matrix may be to one of: a) the second network node 112 for further processing, b) the first network node 111, and c) the central network node 110. As explained before, option a) may be understood to correspond to internal or local processing. Option b) may be understood to correspond to embodiments wherein the first network node 111 may be next in the arrangement towards the central network node 110. Option c) may be understood to correspond to embodiments wherein there may be no further network nodes in the arrangement, between the second network node 112 and the central network node 110, e.g., the second network node 112 may be the last network node in a strip towards the central network node 110.

The second network node 112 may be adjacent to the first network node 111 in the arrangement. The arrangement may be a D-MIMO arrangement.

Action 407

As has been mentioned earlier, in some embodiments, the second network node 112 may be the same network node as the first network node 111. Actions 407, and 408-409 may be performed in such embodiments. Their implementation may be understood to correspond to Actions 301, and 303-304 as described for the first network node 111. Actions 410-412 may be also performed in embodiments wherein the second network node 112 may be the same network node as the first network node 111. In such case, Actions 410-412 may be understood to correspond to Actions 305-307 as described for the first network node 111.

In embodiments wherein the second network node 112 may be the same network node as the first network node 111, in this Action 407, the second network node 112 may obtain, via the first plurality of antenna elements 125 managed by the first network node 111, the first set of measurements $y_l$ of the one or more first radio signals $s_K$.

Action 408

In embodiments wherein the second network node 112 may be the same network node as the first network node 111, in this Action 408, the second network node 112 may apply the Kalman filter of a first type to the first set of measurements $y_l$, and one of: a) the first set of filtered data $\hat{s}(\mathcal{L}_1 \cup \mathcal{L}_2 \cup \mathcal{L}_3)$, using the first covariance matrix, and b) the additional first set of filtered data, using the additional first covariance matrix $P(\mathcal{L}_1 \cup \mathcal{L}_2 \cup \mathcal{L}_3)$. The applying in this Action 408 of the Kalman filter of the first type may output the second set of filtered data s, and the second covariance matrix P.

Action 409

In embodiments wherein the second network node 112 may be the same network node as the first network node 111, in this Action 409, the second network node 112 may send, in the uplink direction, the second set of filtered data $\hat{s}$ and the second covariance matrix P to one of: the another network node 122 subsequently adjacent to the first network node 111 towards the central network node 110, and the central network node 110.

Action 410

In embodiments wherein the second network node 112 may be the same network node as the first network node 111, in this Action 410, the second network node 112 may receive, from the central network node 110, at least the third set of data $r_l$ for transmission to the one or more wireless devices 130.

The third set of data may be split by the central network node 110 among the plurality of first network nodes 127.

The receiving in this Action 410 may be understood to be in the downlink direction.

Action 411

In embodiments wherein the second network node 112 may have performed Action 410, this Action 411, the second network node 112 may send, to the one or more wireless devices 130, via the first plurality of antenna elements 125, the one or more second radio signals $$u_l = K_l^H r_l.$$

The one or more second radio signals $$u_l = K_l^H r_l$$

may be based on the third set of data $r_l$, to which received third set of data a gain, e.g., the first gain, may have been applied. The first gain applied may be based on the Kalman filter that may have been applied in the uplink direction, reversed, e.g., the Kalman filter of the first type.

Action 412

In this Action 412, the second network node 112 may send, to the second network node 112, in the downlink direction, the one or more second signals $r_{l-1}$. The one or more second signals may be based on the third set of data $r_l$, to which received third set of data $r_l$ another gain, e.g., the second gain, may have been applied. The second gain applied may be based on the Kalman filter that may have been applied in the uplink direction, reversed, e.g., the Kalman filter of the first type.

Action 413

In this Action 413, the second network node 112 may send, respectively to each of the two third network nodes 113, 115, a respective signal $r_1,r_2$. The respective signal $r_1,r_2$ may comprise at least a subset of the third set of data for transmission towards the one or more wireless devices 130, to which respective signal a respective third gain may have been applied. The respective third gain may be based on the Kalman filter of the second type that may have been applied by the second network node 112 in the uplink from the two third network nodes 113, 115, e.g., reversed.

Embodiments of a computer-implemented method, performed by a central network node, such as the central network node 110, will now be described with reference to the flowchart depicted in FIG. 5. The method may be understood to be for handling the data. The central network node 110 operates in the communications network 100.

Several embodiments are comprised herein. In some embodiments all the actions may be performed. In some embodiments, two or more actions may be performed. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. A non-limiting example of the method performed by the central network node 110 is depicted in FIG. 5. Some actions may be performed in a different order than that shown in FIG. 5.

Figure 5:
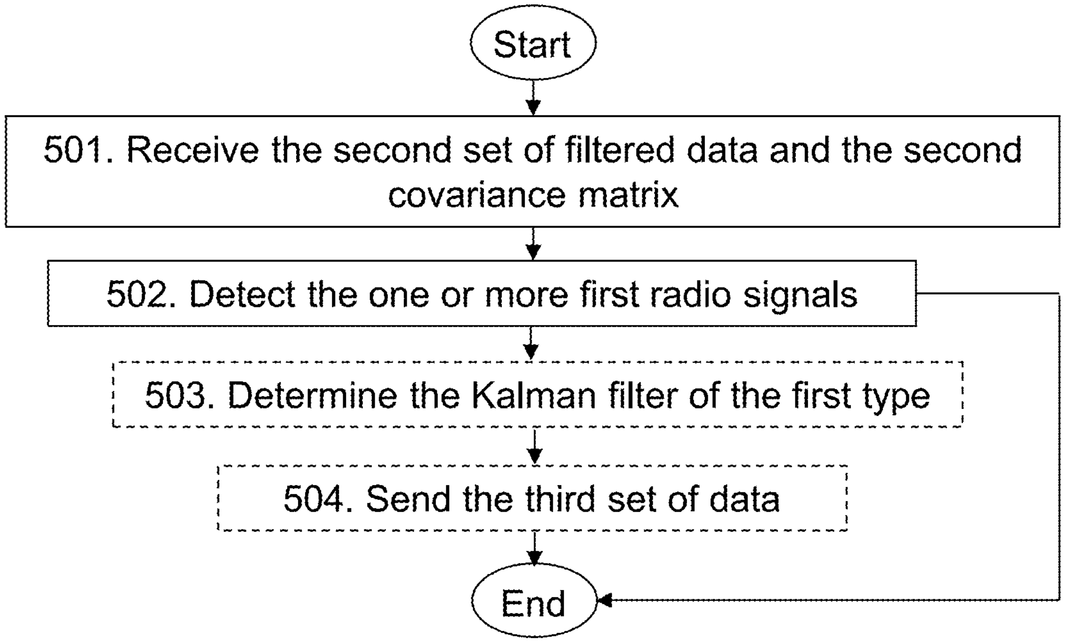
FIG. 5 is a flowchart depicting an example of a method performed by a central network node, according to embodiments herein.

In FIG. 5, optional actions are indicated with dashed boxes.

The detailed description of some of the features described for the method performed by the central network node 110 corresponds to that already provided when describing the method performed by the first network node 111 and will therefore not be repeated here. For example, in some embodiments, the central network node 110 may be adjacent to the first network node 111 in the arrangement, and the arrangement may be a D-MIMO arrangement.

Action 501

In this Action 501, the central network node 110 receives from the first network node 111 operating in the communications network 100, the second set of filtered data $\hat{s}$ and the second covariance matrix P. The second set of filtered data $\hat{s}$ and the second covariance matrix P have been obtained by having applied the Kalman filter of the first type to the first aggregation of the first set of measurements $y_l$ collected via the first plurality of antenna elements 125 managed by first network node 111 and the first set of filtered data $\hat{s}_0$ received from the second network node 112.

The second set of filtered data $\hat{s}$ and the second covariance matrix P may have been obtained by having applied the Kalman filter of the first type to: the first set of measurements $y_l$, the first set of filtered data $\hat{s}_0$, and the first covariance matrix $P_0$ of the one or more Kalman filters. The first set of measurements $y_l$ may be of one or more first radio signals $s_K$ respectively received from one or more wireless devices 130. The second network node 112 may precede the first network node 111 in the arrangement of network nodes towards the central network node 110. The first set of filtered data may comprise data on measurements of the one or more first radio signals $s_K$ as: a) received by: a.i) the second network node 112, a.ii) the one or more network nodes 113, 115 preceding the second network node 112 in the arrangement of network nodes towards the central network node 110, or a.iii) both, and b) filtered with one or more Kalman filters.

The first covariance matrix $P_0$ of the one or more Kalman filters may be obtained, from the second network node 112.

As explained earlier, any Kalman filter applied, e.g., the one or more respective Kalman filters and the Kalman filter of the second type, may have been applied with square-root implementation.

Action 502

In this Action 502, the central network node 110 detects the one or more first radio signals $s_K$ based on the second set of filtered data $\hat{s}$ and the second covariance matrix P.

Action 503

The central network node 110 in this Action 503, may determine the Kalman filter of the first type applied based on the detected one or more first radio signals $s_K$ and the second covariance matrix $\hat{s}$.

Action 504

In this Action 504, the central network node 110 may send, in a downlink direction, to the first network node 111, the third set of data r for transmission to the one or more wireless devices 130.

The sending in Action 504 may be to the plurality of first network nodes 127 comprising the first network node 111.

In some embodiments wherein the sending in this Action 504 may be to the plurality of first network nodes 127 comprising the first network node 111, the determining in Action 503 may further comprise determining a respective Kalman filter of the first type applied by each of the first network nodes in the plurality of first network nodes 127 in the uplink direction, based on detected one or more respective first radio signals and a respective second covariance matrix. In some of such embodiments, the sending in this Action 504 may further comprise sending in the downlink direction, to the plurality of first network nodes 127, the third set of data r for transmission to the one or more wireless devices 130. The third set of data r may be sent in a respective split signal The one or more further Kalman filters may have been applied with square-root implementation.

Embodiments herein may also relate to a computer-implemented method, performed by the communications network 100, comprising the plurality of first network nodes 127, the plurality of second nodes 112 and the central network node 110, respectively performing the methods according to any of FIGS. 3-5, that is, any of Actions 310-307, 410-413 and 501-504.

In some of these embodiments, the plurality of first network nodes 127 and the plurality of second network nodes 112 may be arranged in subsets in the arrangement, and the subsets may respectively perform the methods according to any of FIGS. 3-5, that is, any of Actions 310-307, 410-413 and 501-504, in parallel. This may be understood to expedite the processing.

Next, non-limiting examples of embodiments herein will be provided to further explain and illustrate how Kalman filters type 1 and type 2 may be used for uplink D-MIMO processing in embodiments herein.

Using Kalman Filters Type 1 and Type 2 for Uplink D-MIMO Processing

Figure 6:
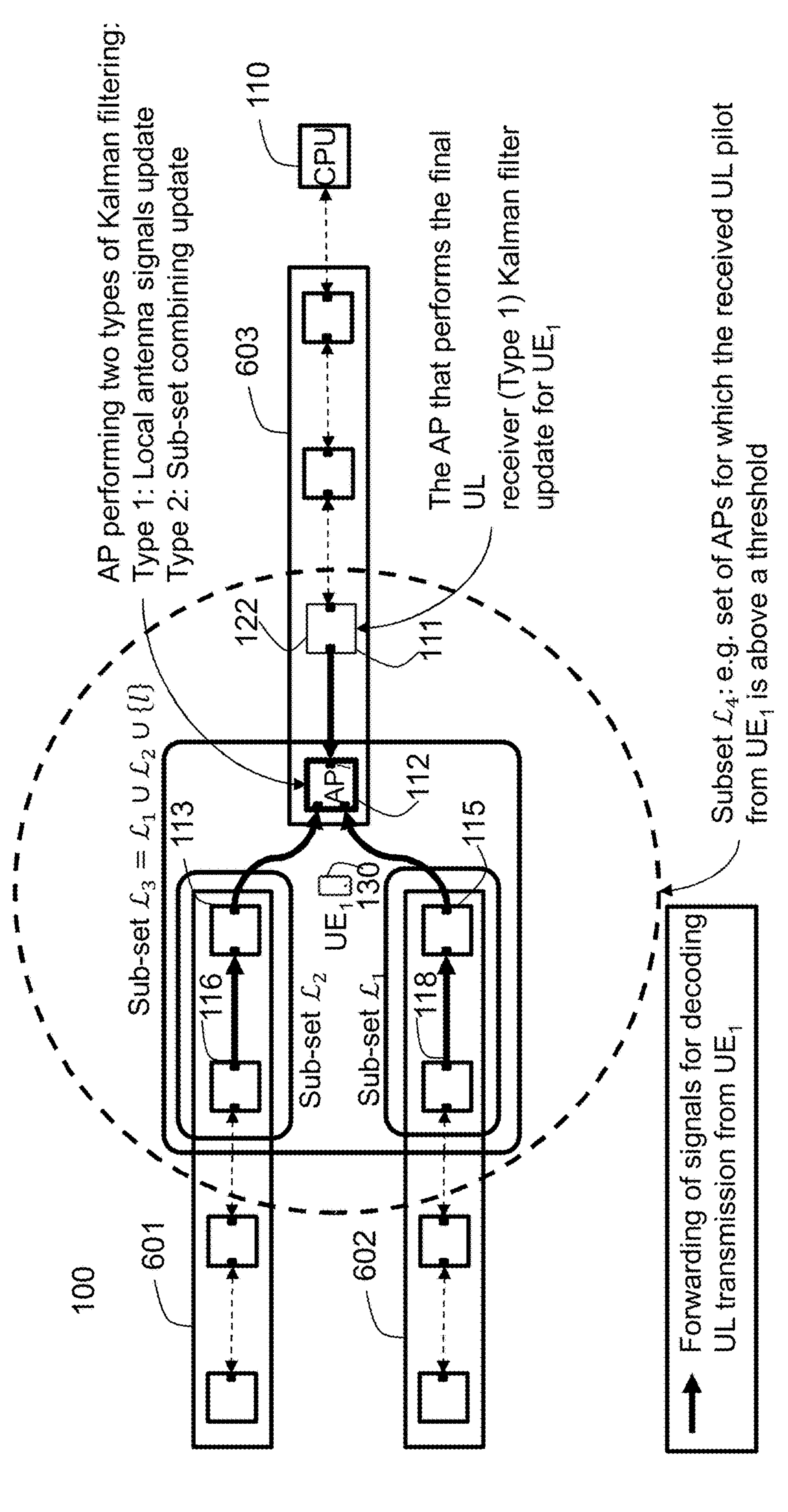
FIG. 6 is a schematic representation depicting a non-limiting example of aspects of a method according to embodiments herein.

FIG. 6 is a schematic diagram depicting a non-limiting example depicting the process of aggregating sub-set sizes. In FIG. 6 is a schematic diagram wherein an example of the communications network 100 as a D-MIMO deployment comprising three radio stripes 601, 602 and 603, and a central processing unit, the central network node 110, is depicted. On each radio stripe 601, 602 and 603, a number of APs may be used for processing uplink signals from a UE of the one or more wireless devices 130, an example UE denoted $UE_1$ is shown in FIG. 6. Each AP is depicted as a square with straight edges. The uplink decoding process may start by assigning a sub-set of all APs to the UE. This may be done by instructing the UE to transmit an uplink pilot signal for the APs to measure on. The coverage area of the uplink pilot corresponding to $UE_1$ is schematically depicted with a dashed circle in FIG. 6. The set of APs within this circle may be denoted $\mathcal{L}_4$. In regard to the processing performed in $AP_l$, which may be understood to be an example of the second network node 112. This AP may receive processed information from two sub-sets of APs denoted $\mathcal{L}_1$ and $\mathcal{L}_2$. Subset $\mathcal{L}_1$ comprises the second third network node 115 and the eighth network node 118, and subset $\mathcal{L}_2$ comprises the first third network node 113 and the sixth network node 116. Before using the local antenna signals, $AP_l$ may need to combine the two input signals from the sub-sets $\mathcal{L}_1$ and $\mathcal{L}_2$ by using a Type 2 Kalman filter as described above. After this, a Type 1 Kalman filter may be applied, also described above, using the information update from the local antenna panel at $AP_l$. The signal at the output of $AP_l$ may become a new sub-set, denoted $\mathcal{L}_3$, to be used as an input for the adjacent AP, in this example, the first network node 111, which is then succeeded by the another network node 122 towards the central network node 110. The final sub-set may be denoted $\mathcal{L}_4$ and it may contain all APs associated with the UL processing of the example $UE_1$.

Figure 7:
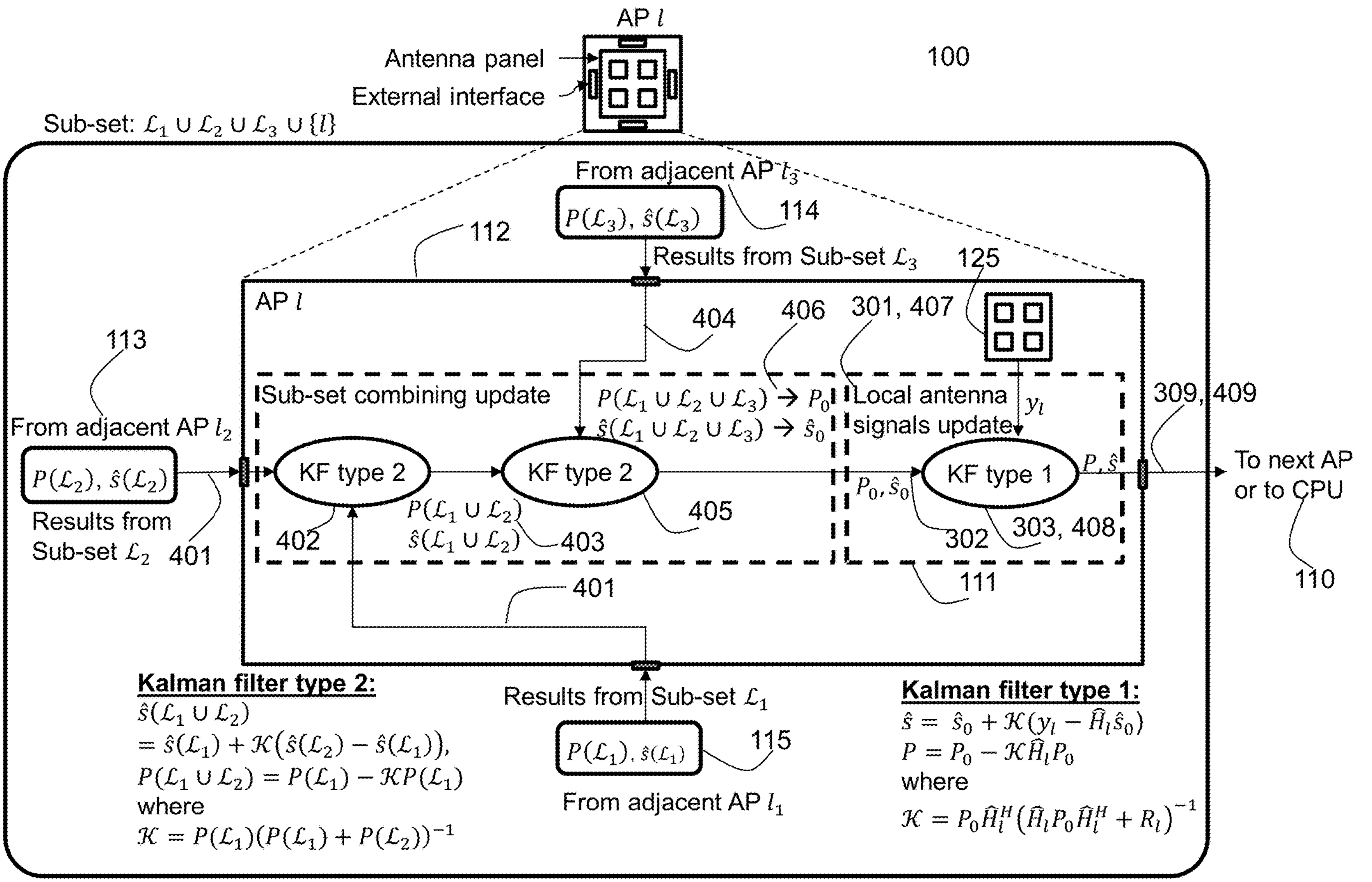
FIG. 7 is a schematic representation depicting another non-limiting example of aspects a method according to embodiments herein.

FIG. 7 is a schematic diagram depicting a non-limiting example of the communications network 100, depicting the two types of Kalman filter operation in an AP that both aggregates several sub-sets into one combined sub-set before updating the state and covariance estimates with information from a local antenna panel. Note that estimation of $\hat{H}_l$, and $R_l$ is not explicitly shown in this figure. Methods for estimating channel and covariance matrices are well known in prior art. In the schematic diagram of FIG. 7, the processing and the two types of Kalman filtering occurring in an AP with index l that aggregates several sub-sets is depicted in more detail. $AP_l$, may be understood to be an example of the second network node 112. This AP has three input signals where the intermediate processing of three sub-sets is provided. The input sub-sets are denoted $\mathcal{L}_1$, $\mathcal{L}_2$, and $\mathcal{L}_3$ in this example, and are obtain in accordance with Action 401 and Action 404, as indicated. AP $l_1$ may be understood to be comprised in the input sub-sets $\mathcal{L}_1$, as an example of the second third network node 115. AP $l_2$ may be understood to be comprised in the input sub-sets $\mathcal{L}_2$, as an example of the first third network node 113. $AP_l$, may be understood to be comprised in the input sub-sets $\mathcal{L}_3$, as an example of the fourth network node 114. In this example, the Type 2 Kalman filtering operations may combine intermediate results from two sub-sets. Since there are three input sub-sets in this example, two type 2 Kalman filters may need to be applied, one in accordance with Action 402, and one in accordance with Action 403 and Action 405. Once all input sub-sets have been combined into a single aggregate sub-set, provided in accordance with Action 406, the Type 1 Kalman filter may be applied in accordance with Action 408 and Action 303, that may update the signal and the covariance estimates, now denoted $\hat{s}_0$ and $P_0$, with the information from the local antenna panel, denoted $y_l$ and obtained in accordance with Action 310 and Action 407. In this example, the second network node 112 is the same network node 112 as the first network node 111. The local antenna panel may be understood to be the first plurality of antenna elements 125. The result after the final Type 1 Kalman filtering operation may be a new symbol and covariance estimate that may become the input values to the next AP or, if this is the final AP in the aggregation, may be sent in accordance with Action 309 and Action 409, to the CPU, that is, the central network node 110, for further processing, e.g., by higher layers.

Figure 8:
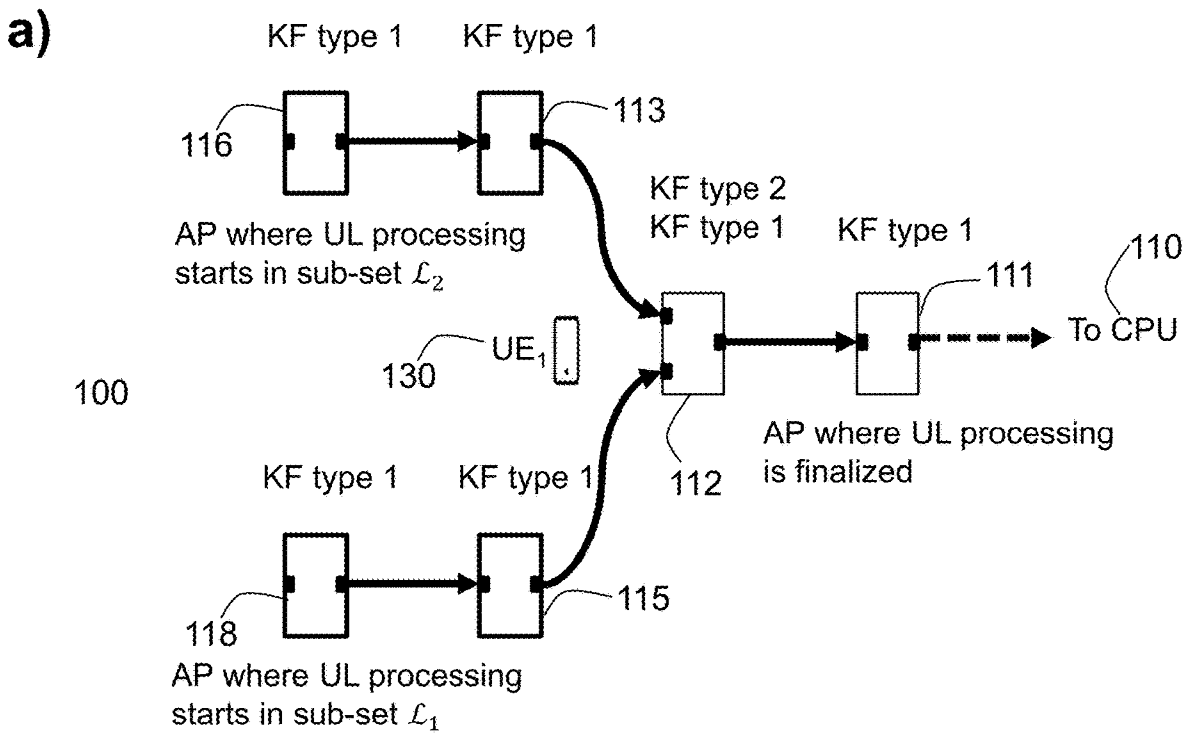
FIG. 8 is a schematic representation depicting a further non-limiting example of downlink aspects of a method according to embodiments herein.
Figure 8:
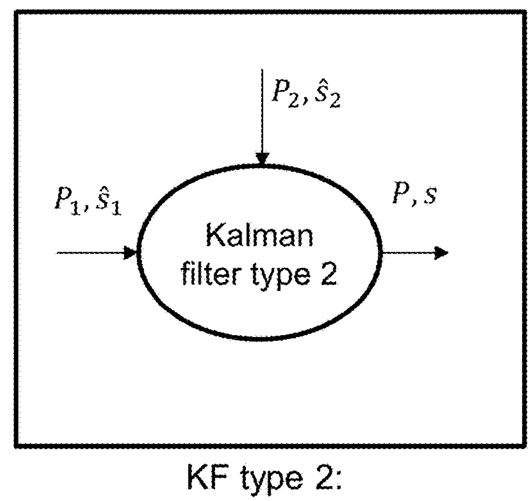
Figure 8:
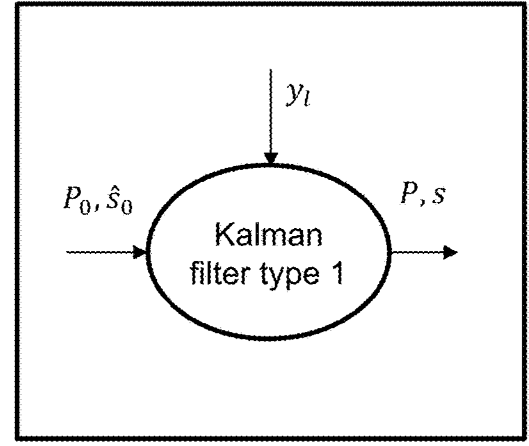

FIG. 8 is a schematic diagram depicting, at the top on panel a), a non-limiting example depicting the use of Type 1 Kalman filters for applying updates using local antenna panels in each AP and Type 2 Kalman filters for combining multiple sub-sets. The bottom on panel b), depicts a non-limiting example renaming input and output variables in each Kalman filter operation to simplify notation. FIG. 8 provides an example where a simplified notation is used. The uplink processing may comprise several Kalman filtering stages. When an AP only updates the input state with local information from the antenna panel, only Type 1 Kalman filtering may be performed, as described for example, for the first network node 111. For APs that may also combine information from multiple sub-sets, such as the second network node 112, one or more Type 2 Kalman filter operations may also need to be deployed, see panel a) in FIG. 8. Panel b) of FIG. 8 depicts that for each Kalman filter stage, it may be convenient to rename the input and output variables since that may simplify the notation. An example UE denoted $UE_1$ is shown in FIG. 8 as an example of the one or more wireless devices 130.

LQR Precoding—Duality of Uplink Kalman Filtering

Figure 9:
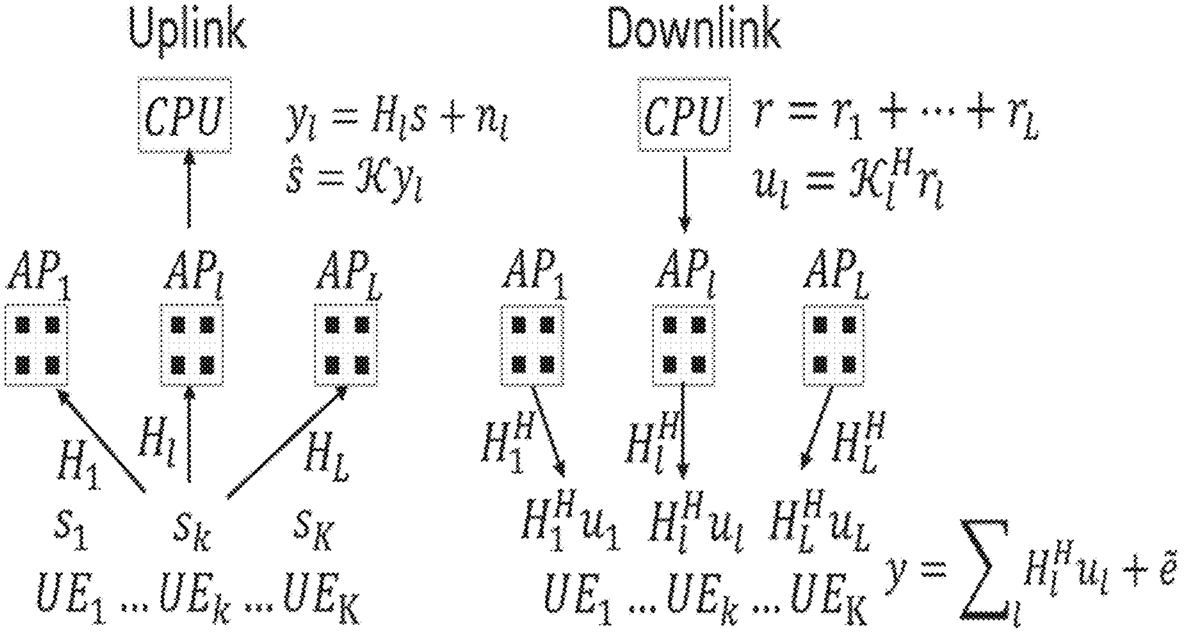
FIG. 9 is a schematic representation depicting uplink and downlink aspects of a method according to embodiments herein.

The duality of uplink and downlink is illustrated in FIG. 9. Particularly, FIG. 9 is a schematic diagram illustrating the duality of uplink and downlink in a D-MIMO network. In the uplink, the signals $s\in\mathbb{C}^K$ transmitted from UEs may be received at $AP_l$, which may be written as $y_l=H_ls+n_l$, where n is the receiver noise at $AP_l$. As we describe in Section "Kalman filter type 1: Antenna signal update", the Kalman filter may give the optimal estimate of the signal $\hat{s}=\mathcal{K}\,y_l$. In the downlink, the data signal $r\in\mathbb{C}^K$, which may be available at CPU, may need to be transmitted to UEs via a subset of APs. Let $y=H^Hu+\tilde{e}$, the dual LQR problem may be formulated as to find u given the signal r so that the linear quadratic cost function $\mathbb{E}((y-r)^H\tilde{P}_0(y-r)+u^H\tilde{\Sigma}^2u)$ may be minimized. Here $\tilde{P}_0$ is the weight on the quadratic error of the received signal and $\tilde{\Sigma}$ the weight on transmitted energy. The optimal solution may become $u=\mathcal{K}^Hr$. When the CPU is connected to a subset of APs $\{AP_1, \ldots, AP_L\}$, the CPU may split the signal $r=r_l+\ldots+r_L$ among the APs where $r_l$ may be tailored according to antenna gains of $AP_l$. For each $AP_l$, the precoding based on the duality of the uplink Kalman filter gain may become $$\mathcal{K}_l^H,$$

and $$u_l=\mathcal{K}_l^Hr_l.$$

The received signal at UEs may become $$y=\sum_{l=1}^{L}H_l^Hu_l+\tilde{e}.$$

Using the duality, the signal may follow the same path from APs to CPU in the uplink combining, but backwards in the reverse order from CPU to APs, as it is shown in the schematic diagram of FIG. 10. The nodes depicted in FIG. 10 are the same as those depicted in panel a) of FIG. 8. FIG. 10 illustrates, at the top in panel a), a schematic diagram depicting a non-limiting example of the use of the duality using LQR to obtain the downlink precoding for Type 1 Kalman filters in each AP and Type 2 Kalman filters for splitting the antenna signal into sub-sets. At the bottom in panel b), FIG. 10 illustrates, with another schematic diagram, renaming input and output variables in each Kalman filter operation simplifying the notation. When APs may be parallelly connected, the split of the antenna signal for type 2 Kalman filter may be obtained by:

$$\begin{bmatrix} r_1 \\ r_2 \end{bmatrix} = \begin{bmatrix} I - K^H \\ K^H \end{bmatrix} r.$$

and then provided in accordance with Action 413, and for type 1 Kalman filter, the LQR precoding signal $$u_l = \mathcal{K}_l^H r_l$$

may be sent from $AP_l$ to all serving UEs. When APs may be serially connected, the signal may be split either from CPU, in accordance with Action 305 and Action 410, or from $AP_l$ backwards to next AP, $AP_{l-1}$. The split for type 1 Kalman filter, shown at bottom in panel b) of FIG. 10 on the right, may be obtained by $$r_{l-1} = (I - H_l^H K_l^H) r,$$

while the LQR precoding signal may become $$u_l = K_l^H r_l,$$

and provided in accordance with Action 306 and Action 411.

Certain embodiments disclosed herein may provide one or more of the following technical advantage(s), which may be summarized as follows. Embodiments herein may enable the Kalman filter for receiver combining in a D-MIMO network. The performance may be optimal when applying the Kalman filter at each step of the aggregating.

Some embodiments may use the square-root implementation of the Kalman. A further advantage of such embodiments may be that the square-root implementation of the Kalman filter may always assure that the covariance matrix may be symmetric and positive semi-definite. In the decentralized processing and combining, the Kalman filter when aggregating new APs may provide the combining vector that may minimize estimation error (MSE), at each step of incrementation, from a subset of one AP to a subset of all APs. As yet a further advantage, the Kalman filter may have flexibility to be connected in different constellations, serial, parallel, grid connections, it may be implemented in a very scalable trade-off between complexity and performance.

With the proposed Kalman filter implementation, different constellations of APs and CPU, may have the same performance as there may be no information loss in any of the updating steps when each estimate may be based on the Kalman filter.

Figure 11:
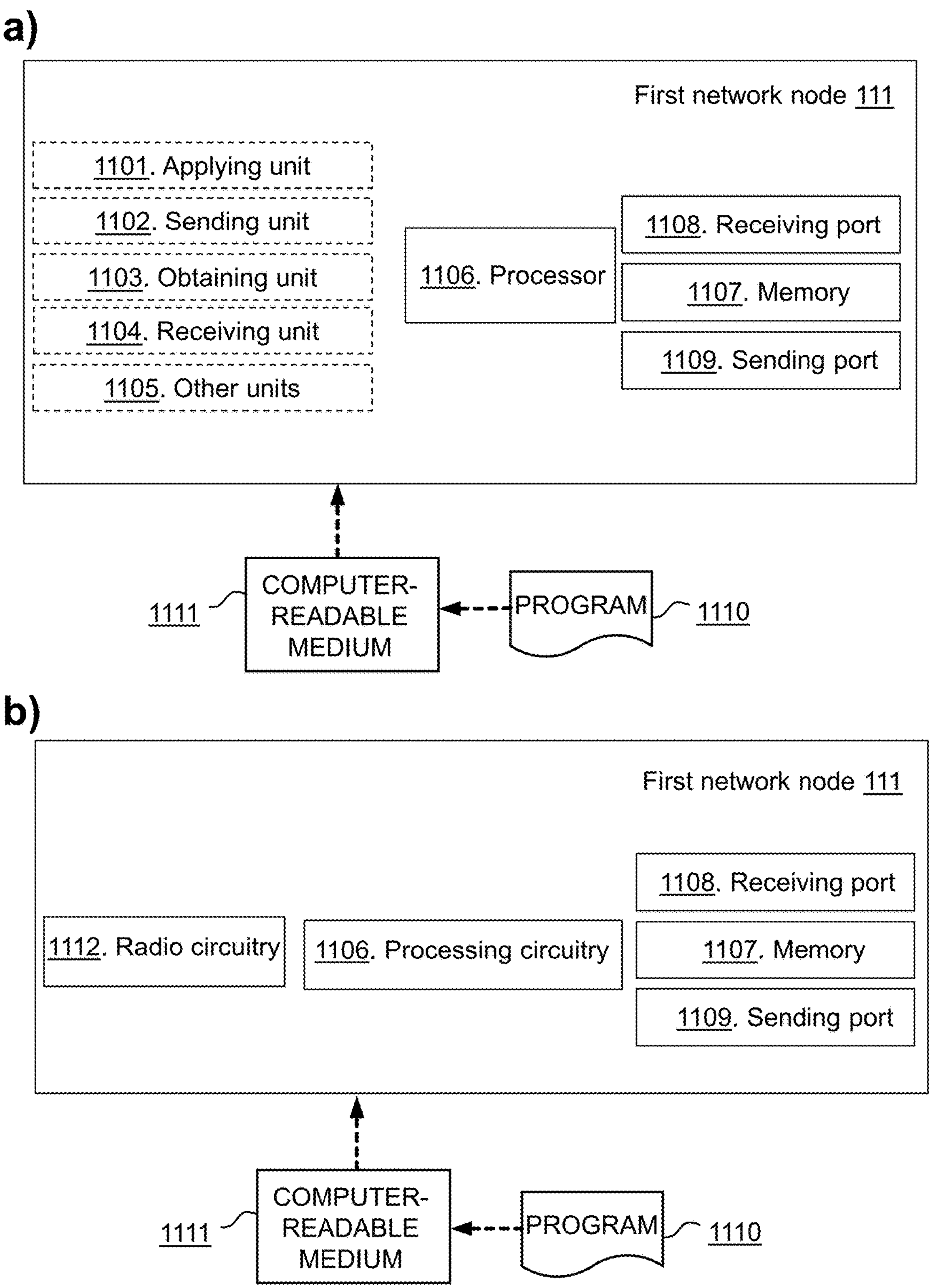
FIG. 11 is a schematic block diagram illustrating two non-limiting examples, a) and b), of a first network node, according to embodiments herein.

FIG. 11 depicts two different examples in panels a) and b), respectively, of the arrangement that the first network node 111 may comprise. In some embodiments, the first network node 111 may comprise the following arrangement depicted in FIG. 11*a*. The first network node 111 may be understood to be for handling data. The first network node 111 is configured to operate in the communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. The detailed description of some of the features described for the first network node 111 corresponds to that already provided when describing the method performed by the first network node 111 and will therefore not be repeated here. For example, in some embodiments, the second network node 112 may be configured to be adjacent to the first network node 111 in the arrangement of network nodes towards the central network node 110, and the arrangement may be configured to be a D-MIMO arrangement.

In FIG. 11, optional units are indicated with dashed boxes.

The first network node 111 is configured to perform the applying of Action 303, e.g. by means of an applying unit 1101 within the first network node 111, configured to apply the Kalman filter of the first type to the first aggregation of the first set of measurements $y_l$ configured to be collected via the first plurality of antenna elements 125 configured to be managed by the first network node 111, and the first set of filtered data $\hat{s}_0$ configured to be received from the second network node 112, using the first covariance matrix $P_0$. The applying of the Kalman filter $\mathcal{K}$ of the first type is configured to output the second set of filtered data $\hat{s}$, and the second covariance matrix P.

The first network node 111 is also configured to perform the sending of Action 304, e.g. by means of a sending unit 1102, configured to send, in the uplink direction, the second set of filtered data $\hat{s}$ and the second covariance matrix P to one of: the another network node 122 subsequently adjacent to the first network node 111 towards the central network node 110, and the central network node 110.

The first network node 111 may be configured to perform the obtaining of Action 301, e.g. by means of an obtaining unit 1103, configured to obtain, via the first plurality of antenna elements 125, the first set of measurements $y_l$ of one or more first radio signals $s_K$ configured to be respectively received from the one or more wireless devices 130.

The first network node 111 may be configured to perform the obtaining of this Action 302, e.g. by means of the obtaining unit 1103, configured to obtain, from the second network node 112: the first set of filtered data $\hat{s}_0$, and the first covariance matrix $P_0$ of the one or more Kalman filters. The first set of filtered data $\hat{s}_0$ is configured to comprise the data on measurements of the one or more first radio signals $\hat{s}_K$ as configured to be: a) received by: a.i) the second network node 112, a.ii) the one or more network nodes 113, 114, 115 configured to be preceding the second network node 112 in the arrangement, or a.iii) both, and b) filtered with one or more Kalman filters $\mathcal{K}$.

In some embodiments, the one or more Kalman filters and the Kalman filter of the first type may be configured to be applied with square-root implementation.

In some embodiments, the first network node 111 and the second network node 112 may be configured to be the same network node.

The first network node 111 may be configured to perform the receiving of Action 305, e.g. by means of a receiving unit 1104 within the first network node 111, configured to receive from the central network node 110, a third set of data n for transmission to the one or more wireless devices 130.

The first network node 111 may be configured to perform this sending Action 306, e.g. by means of the sending unit 1102 within the first network node 111, configured to send to the one or more wireless devices 130, via the first plurality of antenna elements 125, the one or more second radio signals $$u_1 = K_1^H r_1$$

based on the third set of data $r_l$, to which received third set of data the first gain, is configured to have been applied. The first gain applied is configured to be based on the Kalman filter that is configured to have been applied in the uplink direction, reversed.

The first network node 111 may be configured to perform the sending of this Action 307, e.g. by means of the sending unit 1102, configured to send, to the second network node 112, in the downlink direction, the one or more second signals $r_{l-1}$ based on the third set of data $r_l$, to which received third set of data $r_l$, the second gain is configured to have been applied, based on the Kalman Filter that is configured to have been applied in the uplink direction, reversed.

Other units 1105 may be comprised in the first network node 111.

The embodiments herein in the first network node 111 may be implemented through one or more processors, such as a processor 1106 in the first network node 111 depicted in FIG. 11*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the first network node 111. One such carrier may be in the form of a CD ROM disc. It is however feasible with other data carriers such as a memory stick. The computer program code may furthermore be provided as pure program code on a server and downloaded to the first network node 111.

The first network node 111 may further comprise a memory 1107 comprising one or more memory units. The memory 1107 is arranged to be used to store obtained information, store data, configurations, schedulings, and applications etc. to perform the methods herein when being executed in the first network node 111.

In some embodiments, the first network node 111 may receive information from, e.g., the central network node 110, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100, through a receiving port 1108. In some embodiments, the receiving port 1108 may be, for example, connected to one or more antennas in first network node 111. In other embodiments, the first network node 111 may receive information from another structure in the communications network 100 through the receiving port 1108. Since the receiving port 1108 may be in communication with the processor 1106, the receiving port 1108 may then send the received information to the processor 1106. The receiving port 1108 may also be configured to receive other information.

The processor 1106 in the first network node 111 may be further configured to transmit or send information to e.g., the central network node 110, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100, through a sending port 1109, which may be in communication with the processor 1106, and the memory 1107.

Those skilled in the art will also appreciate that the units 1101-1105 described above may refer to a combination of analog and digital circuits, and/or one or more processors configured with software and/or firmware, e.g., stored in memory, that, when executed by the one or more processors such as the processor 1106, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1101-1105 described above may be implemented as one or more applications running on one or more processors such as the processor 1106.

Thus, the methods according to the embodiments described herein for the first network node 111 may be respectively implemented by means of a computer program 1110 product, comprising instructions, i.e., software code portions, which, when executed on at least one processor 1106, cause the at least one processor 1106 to carry out the actions described herein, as performed by the first network node 111. The computer program 1110 product may be stored on a computer-readable storage medium 1111. The computer-readable storage medium 1111, having stored thereon the computer program 1110, may comprise instructions which, when executed on at least one processor 1106, cause the at least one processor 1106 to carry out the actions described herein, as performed by the first network node 111. In some embodiments, the computer-readable storage medium 1111 may be a non-transitory computer-readable storage medium, such as a CD ROM disc, or a memory stick. In other embodiments, the computer program 1110 product may be stored on a carrier containing the computer program 1110 just described, wherein the carrier is one of an electronic signal, optical signal, radio signal, or the computer-readable storage medium 1111, as described above.

The first network node 111 may comprise a communication interface configured to facilitate communications between the first network node 111 and other nodes or devices, e.g., the central network node 110, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100. The interface may, for example, include a transceiver configured to transmit and receive radio signals over an air interface in accordance with a suitable standard.

In other embodiments, the first network node 111 may comprise the following arrangement depicted in FIG. 11*b*. The first network node 111 may comprise a processing circuitry 1106, e.g., one or more processors such as the processor 1106, in the first network node 111 and the memory 1107. The first network node 111 may also comprise a radio circuitry 1112, which may comprise e.g., the receiving port 1108 and the sending port 1109. The processing circuitry 1106 may be configured to, or operable to, perform the method actions according to FIG. 3, FIGS. 6-10 and/or FIGS. 15-19, in a similar manner as that described in relation to FIG. 11*a*. The radio circuitry 1112 may be configured to set up and maintain at least a wireless connection with the central network node 110, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100. Circuitry may be understood herein as a hardware component.

Hence, embodiments herein also relate to the first network node 111 operative to operate in the communications network 100. The first network node 111 may comprise the processing circuitry 1106 and the memory 1107, said memory 1107 containing instructions executable by said processing circuitry 1106, whereby the first network node 111 is further operative to perform the actions described herein in relation to the first network node 111, e.g., in FIG. 3, FIGS. 6-10 and/or FIGS. 15-19.

Figure 12:
FIG. 12 is a schematic block diagram illustrating two non-limiting examples, a) and b), of a second network node, according to embodiments herein.
Figure 12:
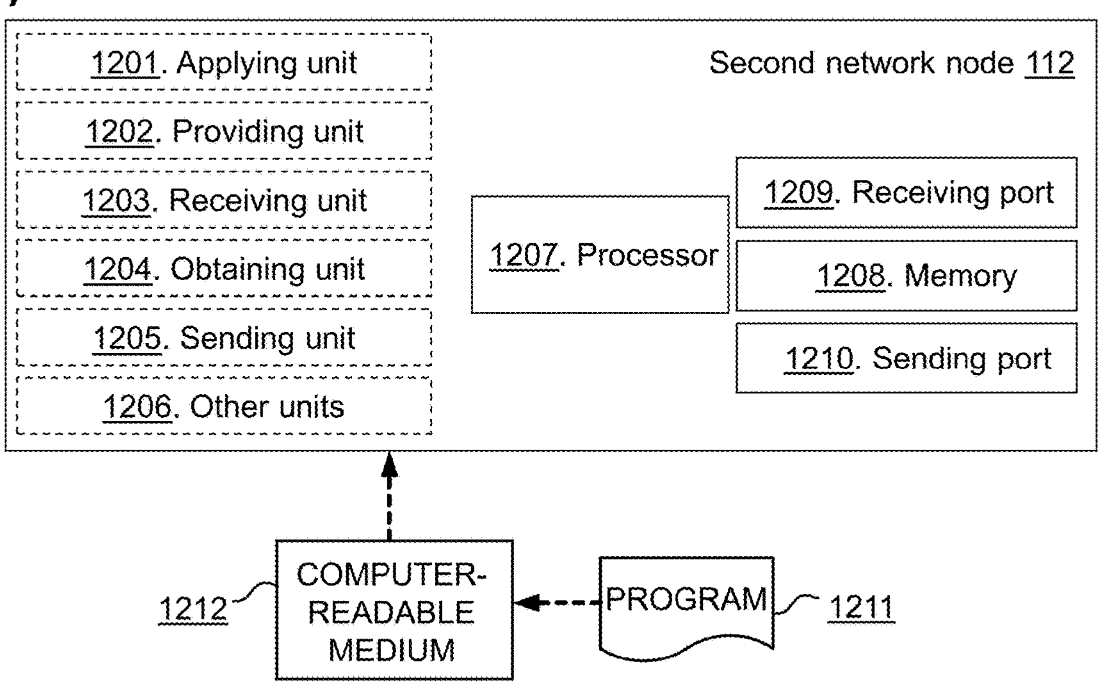
Figure 12:
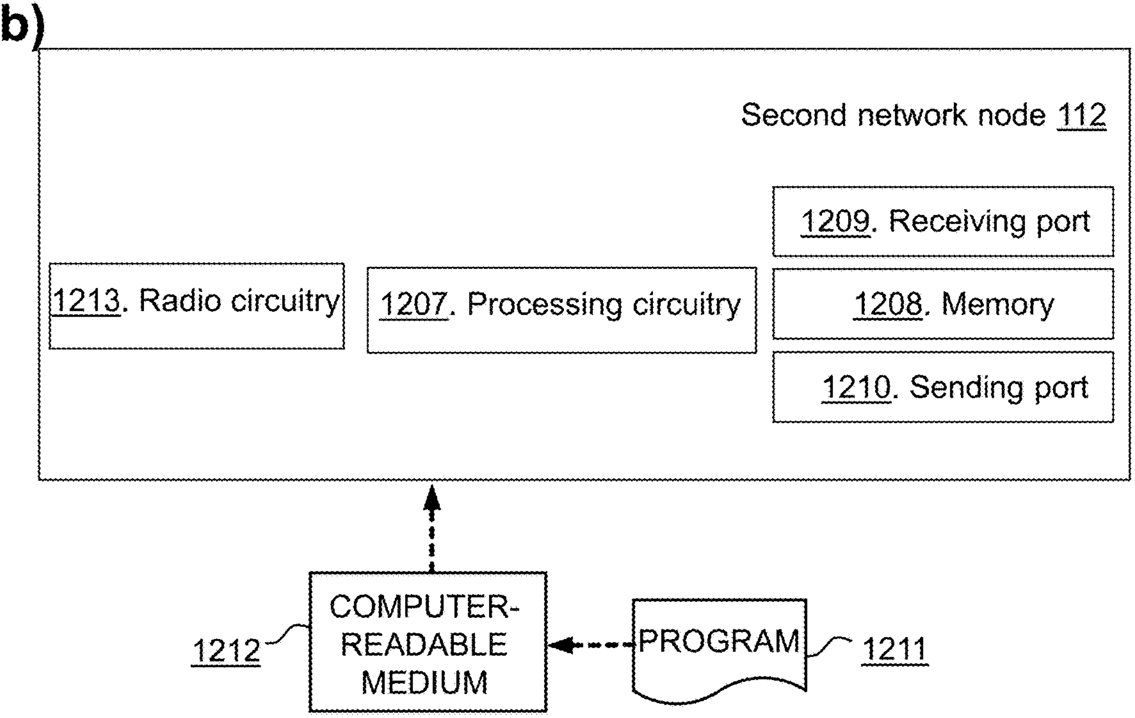

FIG. 12 depicts two different examples in panels a) and b), respectively, of the arrangement that the second network node 112 may comprise. In some embodiments, the second network node 112 may comprise the following arrangement depicted in FIG. 12*a*. The second network node 112 may be understood to be for handling data. The second network node 112 is configured to operate in the communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. The detailed description of some of the features described for the network node 110 corresponds to that already provided when describing the method performed by the wireless device 130 and will therefore not be repeated here. For example, in some embodiments, the second network node 112 may be configured to be the same network node as the first network node 111.

In FIG. 12, optional units are indicated with dashed boxes.

The second network node 112 is configured to perform the applying of Action 402, e.g. by means of an applying unit 1201, configured to apply the Kalman filter of the second type to two respective third sets of filtered data $\hat{s}(\mathcal{L}_1)$, $\hat{s}(\mathcal{L}_2)$ configured to be respectively received from each of two third network nodes 113, 115 configured to be operating in the communications network 100. The applying is configured to be performed using the respective third covariance matrices $P(\mathcal{L}_1)$, $P(\mathcal{L}_2)$. The applying of the Kalman filter of the second type is configured to output the first set of filtered data $\hat{s}(\mathcal{L}_1 \cup \mathcal{L}_2)$, and the first covariance matrix $P(\mathcal{L}_1 \cup \mathcal{L}_2)$.

The second network node 112 is also configured to perform the providing of Action 403, e.g. by means of a providing unit 1202, configured to provide, in the uplink direction, the first set of filtered data $\hat{s}(\mathcal{L}_1 \cup \mathcal{L}_2)$ and the first covariance matrix $P(\mathcal{L}_1 \cup \mathcal{L}_2)$ to one of: a) the second network node 112 for further processing, b) the first network node 111, and c) the central network node 110.

The second network node 112 may be configured to perform the receiving of Action 401, e.g. by means of a receiving unit 1203, configured to receive, respectively, from each of the two third network nodes 113, 115: the respective third set of filtered data $\hat{s}(\mathcal{L}_1)$, $\hat{s}(\mathcal{L}_2)$ and the respective third covariance matrix of the one or more respective Kalman filters. The respective third set of filtered data $\hat{s}(\mathcal{L}_1)$, $\hat{s}(\mathcal{L}_2)$ is configured to comprise data on the measurements of the one or more first radio signals, configured to be respectively received from the one or more wireless devices 130, as configured to be: a) received by: a.i) the respective third network nodes 113, 115, a.ii) the one or more network nodes 116, 117, 118, 119 configured to be respectively preceding the respective third network node 113, 115 in the arrangement of network nodes towards the central network node 110, or a.iii) both, and b) filtered with one or more respective Kalman filters.

In some embodiments, wherein the second network node 112 may be configured to provide the first set of filtered data $\hat{s}(\mathcal{L}_1 \cup \mathcal{L}_2)$, and the first covariance matrix $P(\mathcal{L}_1 \cup \mathcal{L}_2)$ to the second network node 112 for further processing, the second network node 112 may be further configured to perform the receiving of Action 404, e.g. by means of the receiving unit 1203, configured to receive from the fourth network node 114 configured to be operating in the communications network 100: the fourth set of filtered data $\hat{s}(\mathcal{L}_3)$, and the fourth covariance matrix $P(\mathcal{L}_3)$ of the one or more further Kalman filters. The fourth set of filtered data $\hat{s}(\mathcal{L}_3)$ is configured to comprise data on the measurements of the one or more first radio signals as configured to be: a) received by: a.i) the fourth network node 114, a.ii) the one or more network nodes 120, 121 configured to be preceding the fourth network node 114 in the arrangement of network nodes towards the central network node 110, or a.iii) both, and b) filtered with one or more further Kalman filters.

In some of the embodiments wherein the second network node 112 may be configured to provide the first set of filtered data $\hat{s}(\mathcal{L}_1 \cup \mathcal{L}_2)$, and the first covariance matrix $P(\mathcal{L}_1 \cup \mathcal{L}_2)$ to the second network node 112 for further processing, the second network node 112 may be further configured to perform the applying of Action 405, e.g. by means of the applying unit 1201, configured to apply the additional Kalman filter of the second type to the fourth set of filtered data $\hat{s}(\mathcal{L}_3)$ and the first set of filtered data $\hat{s}(\mathcal{L}_1 \cup \mathcal{L}_2)$, using the respective fourth covariance matrix $P(\mathcal{L}_3)$ and the first covariance matrix $P(\mathcal{L}_1 \cup \mathcal{L}_2)$. The applying of the additional Kalman filter of the second type may be configured to output the additional first set of filtered data $\hat{s}(\mathcal{L}_1 \cup \mathcal{L}_2 \cup \mathcal{L}_3)$, and the additional first covariance matrix $P(\mathcal{L}_1 \cup \mathcal{L}_2 \cup \mathcal{L}_3)$.

The second network node 112 may be configured to perform the providing of Action 406, e.g. by means of the providing unit 1202, configured to provide, in the uplink direction, the additional first set of filtered data $\hat{s}(\mathcal{L}_1 \cup \mathcal{L}_2 \cup \mathcal{L}_3)$ and the additional first covariance matrix $P(\mathcal{L}_1 \cup \mathcal{L}_2 \cup$ $\mathcal{L}_3$) to one of: a) the second network node 112 for further processing, b) the first network node 111, and c) the central network node 110.

In some embodiments, the second network node 112 may be configured to be adjacent to the first network node 111 in the arrangement, and the arrangement may be configured to be a D-MIMO arrangement In some embodiments, any Kalman filter applied may be configured to be applied with square-root implementation.

The second network node 112 may be configured to perform the obtaining of Action 407, e.g. by means of an obtaining unit 1204 within the second network node 112, configured to obtain, via the first plurality of antenna elements 125 configured to be managed by the first network node 111, the first set of measurements $y_l$ of the one or more first radio signals $s_K$.

The second network node 112 may be configured to perform the applying Action 408, e.g. by means of the applying unit 1201 within the second network node 112, configured to apply the Kalman filter of the first type to the first set of measurements $y_l$, and one of: a) the first set of filtered data $\hat{s}(\mathcal{L}_1 \cup \mathcal{L}_2 \cup \mathcal{L}_3)$, using the first covariance matrix, and b) the additional first set of filtered data, using the additional first covariance matrix $P(\mathcal{L}_1 \cup \mathcal{L}_2 \cup \mathcal{L}_3)$. The applying of the Kalman filter of the first type may be configured to output the second set of filtered data $\hat{s}$, and the second covariance matrix P.

The second network node 112 may be configured to perform the sending of Action 409, e.g. by means of a sending unit 1205 within the second network node 112, configured to send, in the uplink direction, the second set of filtered data $\hat{s}$ and the second covariance matrix P to one of: the another network node 122 subsequently adjacent to the first network node 111 towards the central network node 110, and the central network node 110.

The second network node 112 may be configured to perform the receiving of Action 410, e.g. by means of the receiving unit 1203 within the second network node 112, configured to receive, from the central network node 110, the third set of data n for transmission to the one or more wireless devices 130.

The second network node 112 may be configured to perform the sending of Action 411, e.g. by means of the sending unit 1205 within the second network node 112, configured to send to the one or more wireless devices 130, via the first plurality of antenna elements 125, the one or more second radio signals $$u_l = K_l^H r_l$$

based on the third set of data $r_l$, to which received third set of data the first gain may be configured to have been applied. The first gain applied may be configured to be based on the Kalman filter that may have been applied in the uplink direction, reversed.

The second network node 112 may be configured to perform the sending of Action 412, e.g. by means of the sending unit 1205, configured to send, to the second network node 112, in the downlink direction, one or more second signals $r_{l-1}$ based on the third set of data $r_l$, to which received third set of data r the second gain, may be configured to have been applied. The second gain applied may be configured to be based on the Kalman filter that may be configured to have been applied in the uplink direction, reversed.

The second network node 112 may be configured to perform the sending of Action 413, e.g. by means of the sending unit 1205, configured to send, respectively to each of the two third network nodes 113, 115, the respective signal $r_1,r_2$. The respective signal $r_1,r_2$ is configured to comprise at least the subset of the third set of data for transmission towards the one or more wireless devices 130, to which respective signal the respective third gain may be configured to have been applied. The respective third gain may be configured to be based on the Kalman filter of the second type applied by the second network node 112 in the uplink from the two third network nodes 113, 115, reversed.

Other units 1206 may be comprised in the second network node 112.

The embodiments herein in the second network node 112 may be implemented through one or more processors, such as a processor 1207 in the second network node 112 depicted in FIG. 12*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the second network node 112. One such carrier may be in the form of a CD ROM disc. It is however feasible with other data carriers such as a memory stick. The computer program code may furthermore be provided as pure program code on a server and downloaded to the second network node 112.

The second network node 112 may further comprise a memory 1208 comprising one or more memory units. The memory 1208 is arranged to be used to store obtained information, store data, configurations, schedulings, and applications etc. to perform the methods herein when being executed in the second network node 112.

In some embodiments, the second network node 112 may receive information from, e.g., the central network node 110, the first network node 111, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100, through a receiving port 1209. In some embodiments, the receiving port 1209 may be, for example, connected to one or more antennas in second network node 112. In other embodiments, the second network node 112 may receive information from another structure in the communications network 100 through the receiving port 1209. Since the receiving port 1209 may be in communication with the processor 1207, the receiving port 1209 may then send the received information to the processor 1207. The receiving port 1209 may also be configured to receive other information.

The processor 1207 in the second network node 112 may be further configured to transmit or send information to e.g., the central network node 110, the first network node 111, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100, through a sending port 1210, which may be in communication with the processor 1207, and the memory 1208.

Those skilled in the art will also appreciate that the units 1201-1206 described above may refer to a combination of analog and digital circuits, and/or one or more processors configured with software and/or firmware, e.g., stored in memory, that, when executed by the one or more processors such as the processor 1207, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1201-1206 described above may be implemented as one or more applications running on one or more processors such as the processor 1207.

Thus, the methods according to the embodiments described herein for the second network node 112 may be respectively implemented by means of a computer program 1211 product, comprising instructions, i.e., software code portions, which, when executed on at least one processor 1207, cause the at least one processor 1207 to carry out the actions described herein, as performed by the second network node 112. The computer program 1211 product may be stored on a computer-readable storage medium 1212. The computer-readable storage medium 1212, having stored thereon the computer program 1211, may comprise instructions which, when executed on at least one processor 1207, cause the at least one processor 1207 to carry out the actions described herein, as performed by the second network node 112. In some embodiments, the computer-readable storage medium 1212 may be a non-transitory computer-readable storage medium, such as a CD ROM disc, or a memory stick. In other embodiments, the computer program 1211 product may be stored on a carrier containing the computer program 1211 just described, wherein the carrier is one of an electronic signal, optical signal, radio signal, or the computer-readable storage medium 1212, as described above.

The second network node 112 may comprise a communication interface configured to facilitate communications between the second network node 112 and other nodes or devices, e.g., the central network node 110, the first network node 111, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100. The interface may, for example, include a transceiver configured to transmit and receive radio signals over an air interface in accordance with a suitable standard.

In other embodiments, the second network node 112 may comprise the following arrangement depicted in FIG. 12*b*. The second network node 112 may comprise a processing circuitry 1207, e.g., one or more processors such as the processor 1207, in the second network node 112 and the memory 1208. The second network node 112 may also comprise a radio circuitry 1213, which may comprise e.g., the receiving port 1209 and the sending port 1210. The processing circuitry 1207 may be configured to, or operable to, perform the method actions according to FIG. 4, FIGS. 6-10 and/or FIGS. 15-19, in a similar manner as that described in relation to FIG. 12*a*. The radio circuitry 1213 may be configured to set up and maintain at least a wireless connection with the central network node 110, the first network node 111, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100. Circuitry may be understood herein as a hardware component.

Hence, embodiments herein also relate to the second network node 112 operative to operate in the communications network 100. The second network node 112 may comprise the processing circuitry 1207 and the memory 1208, said memory 1208 containing instructions executable by said processing circuitry 1207, whereby the second network node 112 is further operative to perform the actions described herein in relation to the second network node 112, e.g., in FIG. 4, FIGS. 6-10 and/or FIGS. 15-19.

Figure 13:
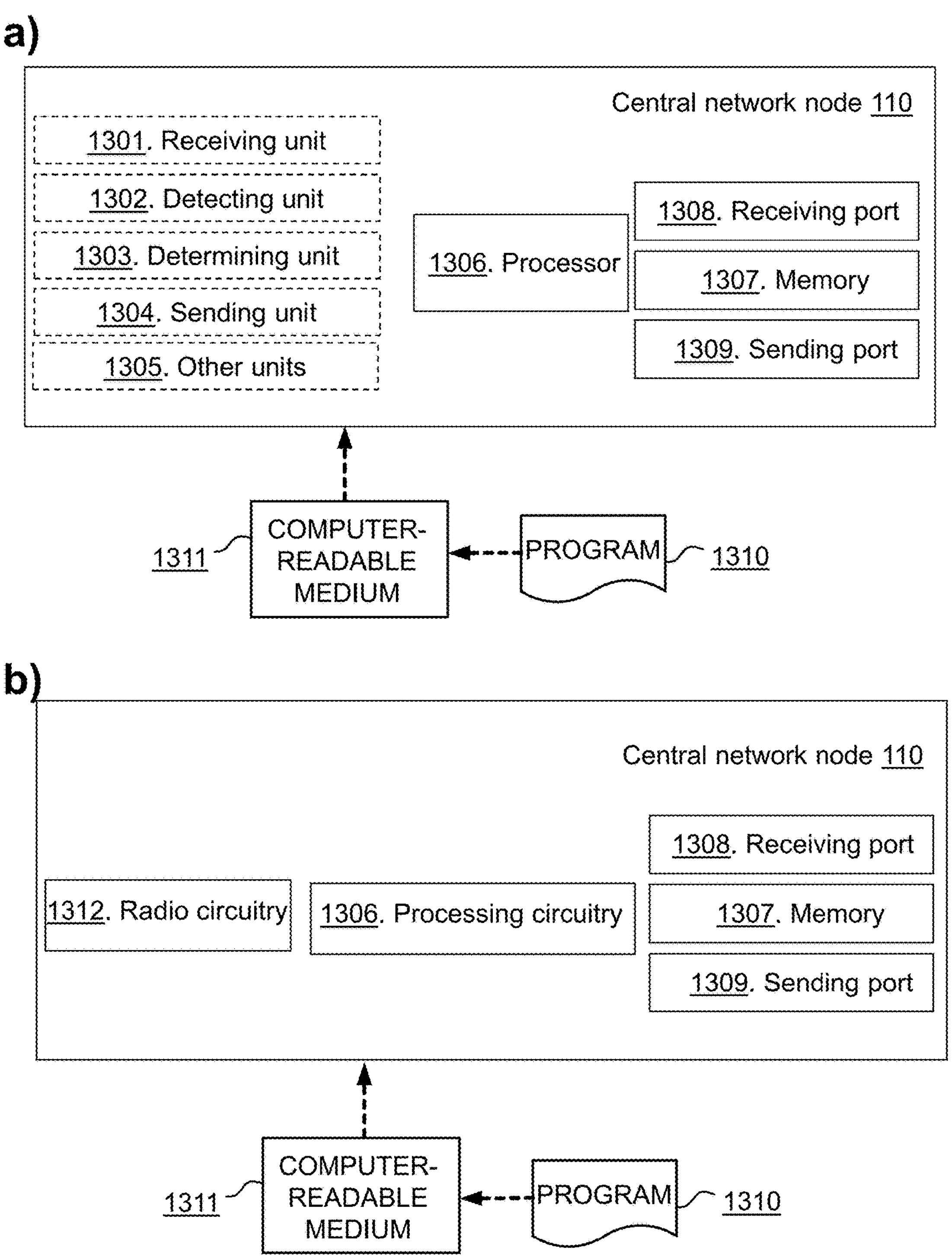
FIG. 13 is a schematic block diagram illustrating two non-limiting examples, a) and b), of a central network node, according to embodiments herein.

FIG. 13 depicts two different examples in panels a) and b), respectively, of the arrangement that the central network node 110 may comprise. In some embodiments, the central network node 110 may comprise the following arrangement depicted in FIG. 13*a*. The central network node 110 may be understood to be for handling data. The central network node 110 is configured to operate in the communications network 100.

Several embodiments are comprised herein. It should be noted that the examples herein are not mutually exclusive. One or more embodiments may be combined, where applicable. All possible combinations are not described to simplify the description. Components from one embodiment may be tacitly assumed to be present in another embodiment and it will be obvious to a person skilled in the art how those components may be used in the other exemplary embodiments. The detailed description of some of the features described for the central network node 110 corresponds to that already provided when describing the method performed by the first network node 111 and will therefore not be repeated here. For example, in some embodiments, the central network node 110 may be configured to be adjacent to the first network node 111 in the arrangement, and the arrangement may be configured to be a D-MIMO arrangement.

In FIG. 13, optional units are indicated with dashed boxes.

The central network node 110 is configured to perform the receiving of Action 501, e.g. by means of a receiving unit 1301 comprised in the central network node 110, configured to receive, from the first network node 111 configured to operate in the communications network 100, the second set of filtered data $\hat{s}$ and the second covariance matrix P. The second set of filtered data $\hat{s}$ and the second covariance matrix P are configured to have been obtained by having applied a Kalman filter of the first type to the first aggregation of the first set of measurements $y_l$ collected via the first plurality of antenna elements 125 configured to be managed by the first network node 111 and the first set of filtered data $\hat{s}_0$ configured to be received from the second network node 112.

The central network node 110 is configured to perform the detecting of this Action 502, e.g. by means of a detecting unit 1302 comprised in the central network node 110, configured to detect the one or more first radio signals $s_K$ based on the second set of filtered data $\hat{s}$ and the second covariance matrix P.

In some embodiments, the second set of filtered data $\hat{s}$ and the second covariance matrix P may be configured to have been obtained by having applied a Kalman filter of the first type to: i) the first set of measurements $y_l$; the first set of measurements $y_l$ may be configured to be of one or more first radio signals $s_K$ respectively received from one or more wireless devices 130, ii) the first set of filtered data $\hat{s}_0$, wherein the second network node 112 may be configured to precede the first network node 111 in the arrangement of network nodes towards the central network node 110; the first set of filtered data may be configured to comprise data on measurements of the one or more first radio signals $s_K$ as configured to be: a) received by: a.i) the second network node 112, a.ii) the one or more network nodes 113, 115 preceding the second network node 112 in the arrangement of network nodes towards the central network node 110, or a.iii) both, and b) filtered with one or more Kalman filters, and iii) the first covariance matrix $P_0$ of the one or more Kalman filters, configured to be obtained, from the second network node 112.

The central network node 110 may be configured to perform the determining of Action 503, e.g. by means of a determining unit 1303 comprised in the central network node 110, configured to determine the Kalman filter of the first type applied based on the detected one or more first radio signals $s_K$ and the second covariance matrix $\hat{s}$.

The central network node 110 may be configured to perform the sending of Action 504, e.g. by means of a sending unit 1304, configured to send, in the downlink direction, to the first network node 111, the third set of data r for transmission to the one or more wireless devices 130.

In some embodiments wherein the sending may be configured to be to the plurality of first network nodes 127 configured to comprise the first network node 111, the following may apply: a) the determining may be further configured to comprise determining the respective Kalman filter of the first type applied by each of the first network nodes in the plurality of first network nodes 127 in the uplink direction, based on detected one or more respective first radio signals and the respective second covariance matrix, and b) the sending may be further configured to comprise sending in the downlink direction, to the plurality of first network nodes 127, the third set of data r for transmission to the one or more wireless devices 130. The third set of data r may be configured to be sent in the respective split signal.

Other units 1305 may be comprised in the central network node 110.

The embodiments herein in the central network node 110 may be implemented through one or more processors, such as a processor 1306 in the central network node 110 depicted in FIG. 13*a*, together with computer program code for performing the functions and actions of the embodiments herein. A processor, as used herein, may be understood to be a hardware component. The program code mentioned above may also be provided as a computer program product, for instance in the form of a data carrier carrying computer program code for performing the embodiments herein when being loaded into the central network node 110. One such carrier may be in the form of a CD ROM disc. It is however feasible with other data carriers such as a memory stick. The computer program code may furthermore be provided as pure program code on a server and downloaded to the central network node 110.

The central network node 110 may further comprise a memory 1307 comprising one or more memory units. The memory 1307 is arranged to be used to store obtained information, store data, configurations, schedulings, and applications etc. to perform the methods herein when being executed in the central network node 110.

In some embodiments, the central network node 110 may receive information from, e.g., the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100, through a receiving port 1308. In some embodiments, the receiving port 1308 may be, for example, connected to one or more antennas in central network node 110. In other embodiments, the central network node 110 may receive information from another structure in the communications network 100 through the receiving port 1308. Since the receiving port 1308 may be in communication with the processor 1306, the receiving port 1308 may then send the received information to the processor 1306. The receiving port 1308 may also be configured to receive other information.

The processor 1306 in the central network node 110 may be further configured to transmit or send information to e.g., the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100, through a sending port 1309, which may be in communication with the processor 1306, and the memory 1307.

Those skilled in the art will also appreciate that the units 1301-1305 described above may refer to a combination of analog and digital circuits, and/or one or more processors configured with software and/or firmware, e.g., stored in memory, that, when executed by the one or more processors such as the processor 1306, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Also, in some embodiments, the different units 1301-1305 described above may be implemented as one or more applications running on one or more processors such as the processor 1306.

Thus, the methods according to the embodiments described herein for the central network node 110 may be respectively implemented by means of a computer program 1310 product, comprising instructions, i.e., software code portions, which, when executed on at least one processor 1306, cause the at least one processor 1306 to carry out the actions described herein, as performed by the central network node 110. The computer program 1310 product may be stored on a computer-readable storage medium 1311. The computer-readable storage medium 1311, having stored thereon the computer program 1310, may comprise instructions which, when executed on at least one processor 1306, cause the at least one processor 1306 to carry out the actions described herein, as performed by the central network node 110. In some embodiments, the computer-readable storage medium 1311 may be a non-transitory computer-readable storage medium, such as a CD ROM disc, or a memory stick. In other embodiments, the computer program 1310 product may be stored on a carrier containing the computer program 1310 just described, wherein the carrier is one of an electronic signal, optical signal, radio signal, or the computer-readable storage medium 1311, as described above.

The central network node 110 may comprise a communication interface configured to facilitate communications between the central network node 110 and other nodes or devices, e.g., the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100. The interface may, for example, include a transceiver configured to transmit and receive radio signals over an air interface in accordance with a suitable standard.

In other embodiments, the central network node 110 may comprise the following arrangement depicted in FIG. 13*b*. The central network node 110 may comprise a processing circuitry 1306, e.g., one or more processors such as the processor 1306, in the central network node 110 and the memory 1307. The central network node 110 may also comprise a radio circuitry 1312, which may comprise e.g., the receiving port 1308 and the sending port 1309. The processing circuitry 1306 may be configured to, or operable to, perform the method actions according to FIG. 5, FIGS. 6-10 and/or FIGS. 15-19, in a similar manner as that described in relation to FIG. 13*a*. The radio circuitry 1312 may be configured to set up and maintain at least a wireless connection with the first network node 111, the second network node 112, the one or more network nodes 113, 114, 115 preceding the second node 112, the fourth network node 114, the one or more network nodes 116, 117, 118, 119 preceding the respective third network node 113, 115, the one or more network nodes 120, 121 preceding the fourth network node 114 and the another node 122, the one or more wireless devices 130 and/or another structure in the communications network 100. Circuitry may be understood herein as a hardware component.

Hence, embodiments herein also relate to the central network node 110 operative to operate in the communications network 100. The central network node 110 may comprise the processing circuitry 1306 and the memory 1307, said memory 1307 containing instructions executable by said processing circuitry 1306, whereby the central network node 110 is further operative to perform the actions described herein in relation to the central network node 110, e.g., in FIG. 5, FIGS. 6-10 and/or FIGS. 15-19.

Embodiments herein also comprise a communications network 100 comprising the plurality of first network nodes 127, the plurality a second nodes 112 and the central network node 110, respectively configured according to any of FIGS. 11-13.

In some embodiments, the plurality of first network nodes 127 and the plurality of second network nodes 112 may be configured to be arranged in subsets in an arrangement, and the subsets may be respectively configured according to any of FIGS. 11-13, and configured to be arranged in parallel As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

When using the word "comprise" or "comprising" it shall be interpreted as non-limiting, i.e. meaning "consist at least of".

A processor may be understood herein as a hardware component.

The embodiments herein are not limited to the above described preferred embodiments. Various alternatives, modifications and equivalents may be used. Therefore, the above embodiments should not be taken as limiting the scope of the invention.

Examples of Embodiments Herein

Examples related to embodiments herein may be as follows.

Example 1. A computer-implemented method, performed by a first network node (111), for handling data, the first network node (111) operating in a communications network (100), the method comprising:

applying (303) a Kalman filter of a first type to a first aggregation of a first set of measurements ($y_l$) collected via a first plurality of antenna elements (125) managed by the first network node (111), and a first set of filtered data ($\hat{s}_0$) received from a second network node (112), using a first covariance matrix ($P_0$), wherein the applying (303) of the Kalman filter ($\mathcal{K}$) of the first type outputs a second set of filtered data ($\hat{s}$), and a second covariance matrix (P), and sending (304), in an uplink direction, the second set of filtered data ($\hat{s}$) and the second covariance matrix (P) to one of: another network node (122) subsequently adjacent to the first network node (111) towards a central network node (110), and the central network node (110).

Example 2. The computer-implemented method according to example 1, wherein the second network node (112) is adjacent to the first network node (111) in an arrangement of network nodes towards a central network node (110), wherein the arrangement is a Distributed Multiple Input Multiple Output, D-MIMO, arrangement.

Example 3. The computer-implemented method according to any of examples 1-2, further comprising:

obtaining (301), via the first plurality of antenna elements (125), the first set of measurements ($y_l$) of one or more first radio signals ($s_K$) respectively received from one or more wireless devices (130), and obtaining (302), from the second network node (112):

i. the first set of filtered data (so), the first set of filtered data (so) comprising data on measurements of the one or more first radio signals ($s_K$) as:

a) received by: a.i) the second network node (112), a.ii) one or more network nodes (113, 114, 115) preceding the second network node (112) in the arrangement, or a.iii) both, and b) filtered with one or more Kalman filters ($\mathcal{K}$), and ii. the first covariance matrix ($P_0$) of the one or more Kalman filters.

Example 4. The computer-implemented method according to example 3, wherein the one or more Kalman filters and the Kalman filter of the first type are applied with square-root implementation.

Example 5. The computer-implemented method according to any of examples 1-4, wherein the first network node (111) and the second network node (112) are the same network node.

Example 6. The computer-implemented method according to example 3 and any of examples 4-5, further comprising:

receiving (305) from the central network node (110):

i. a third set of data ($r_l$) for transmission to the one or more wireless devices (130).

Example 7. The computer-implemented method according to example 6, further comprising at least one of:

sending (306) to the one or more wireless devices (130), via the first plurality of antenna elements (125), one or more second radio signals $$(u_l = K_l^H r_l)$$

based on the third set of data ($r_l$) to which received third set of data a gain, e.g., a first gain, has been applied, e.g., wherein the gain applied may be based on the Kalman filter that may have been applied in the uplink direction, reversed, e.g., the Kalman filter of the first type, and sending (307), to the second network node (112), in a downlink direction, one or more second signals ($r_{l-1}$) based on the third set of data ($r_l$) to which received third set of data ($r_l$) a gain has been applied, another gain, e.g., a second gain, based on e.g., the Kalman Filter that may have been applied in the uplink direction is reversed, e.g., the Kalman filter of the first type.

Example 8. A computer-implemented method, performed by a second network node (112), for handling data, the second network node (112) operating in a communications network (100), the method comprising:

applying (402) a Kalman filter of a second type to two respective third sets of filtered data ($\hat{s}(\mathcal{L}_1)$, $\hat{s}(\mathcal{L}_2)$) respectively received from each of two third network nodes (113, 115) operating in the communications network (100), the applying (402) being performed using respective third covariance matrices($P(\mathcal{L}_1)$, $P(\mathcal{L}_2)$), wherein the applying (402) of the Kalman filter of the second type outputs a first set of filtered data ($\hat{s}(\mathcal{L}_1 \cup \mathcal{L}_2)$), and a first covariance matrix ($P(\mathcal{L}_1 \cup \mathcal{L}_2)$), and providing (403), in an uplink direction, the first set of filtered data ($\hat{s}(\mathcal{L}_1 \cup \mathcal{L}_2)$) and the first covariance matrix ($P(\mathcal{L}_1 \cup \mathcal{L}_2)$) to one of: a) the second network node (112) for further processing, b) a first network node (111), and c) a central network node (110).

Example 9. The computer-implemented method according to example 8, further comprising:

receiving (401), respectively, from each of the two third network nodes (113, 115):

i. a respective third set of filtered data ($\hat{s}(\mathcal{L}_1)$, $\hat{s}(\mathcal{L}_2)$), the respective third set of filtered data ($\hat{s}(\mathcal{L}_1)$, $\hat{s}(\mathcal{L}_2)$) comprising data on measurements of one or more first radio signals, respectively received from one or more wireless devices (130), as:

a) received by: a.i) the respective third network nodes (113, 115), a.ii) one or more network nodes (116, 117, 118, 119) respectively preceding the respective third network node (113, 115) in an arrangement of network nodes towards a central network node (110), or a.iii) both, and b) filtered with one or more respective Kalman filters, and ii. a respective third covariance matrix of the one or more respective Kalman filters.

Example 10. The computer-implemented method according to example 9, wherein the second network node (112) provides the first set of filtered data ($\hat{s}(\mathcal{L}_1 \cup \mathcal{L}_2)$), and the first covariance matrix ($P(\mathcal{L}_1 \cup \mathcal{L}_2)$) to the second network node (112) for further processing, and wherein the method further comprises:

receiving (404) from a fourth network node (114) operating in the communications network (100):

i. a fourth set of filtered data ($\hat{s}(\mathcal{L}_3)$), the fourth set of filtered data ($\hat{s}(\mathcal{L}_3)$) comprising data on measurements of the one or more first radio signals as:

a) received by: a.i) the fourth network node (114), a.ii) one or more network nodes (120, 121) preceding the fourth network node (114) in the arrangement of network nodes towards the central network node (110), or a.iii) both, and b) filtered with one or more further Kalman filters, and ii. a fourth covariance matrix ($P(\mathcal{L}_3)$) of the one or more further Kalman filters, applying (405) an additional Kalman filter of the second type to the fourth set of filtered data ($\hat{s}(\mathcal{L}_3)$) and the first set of filtered data ($\hat{s}(\mathcal{L}_1 \cup \mathcal{L}_2)$), using the respective fourth covariance matrix ($P(\mathcal{L}_3)$) and the first covariance matrix ($P(\mathcal{L}_1 \cup \mathcal{L}_2)$), wherein the applying (404) of the additional Kalman filter of the second type outputs an additional first set of filtered data ($\hat{s}(\mathcal{L}_1 \cup \mathcal{L}_2 \cup \mathcal{L}_3)$), and an additional first covariance matrix ($P(\mathcal{L}_1 \cup \mathcal{L}_2 \cup \mathcal{L}_3)$), and providing (406), in the uplink direction, the additional first set of filtered data ($\hat{s}(\mathcal{L}_1 \cup \mathcal{L}_2 \cup \mathcal{L}_3)$) and the additional first covariance matrix ($P(\mathcal{L}_1 \cup \mathcal{L}_2 \cup \mathcal{L}_3)$) to one of: a) the second network node (112) for further processing, b) the first network node (111), and c) the central network node (110).

Example 11. The computer-implemented method according to any of examples 9-10, wherein the second network node (112) is adjacent to the first network node (111) in the arrangement, and wherein the arrangement is a Distributed Multiple Input Multiple Output, D-MIMO, arrangement.

Example 12. The computer-implemented method according to any of examples 9-11, wherein any Kalman filter applied, e.g., the one or more respective Kalman filters and the Kalman filter of the second type, are applied with square-root implementation.

Example 13. The computer-implemented method according to any of examples 8-12, wherein the second network node (112) is the same network node as the first network node (111).

Example 14. The computer-implemented method according to example 13 and 10, further comprising:

obtaining (407), via a first plurality of antenna elements (125) managed by the first network node (111), a first set of measurements ($y_l$) of the one or more first radio signals ($s_K$), and applying (408) a Kalman filter of a first type to the first set of measurements ($y_l$), and one of:

a. the first set of filtered data ($\hat{s}(\mathcal{L}_1 \cup \mathcal{L}_2 \cup \mathcal{L}_3)$), using the first covariance matrix, and b. the additional first set of filtered data, using the additional first covariance matrix ($P(\mathcal{L}_1 \cup \mathcal{L}_2 \cup \mathcal{L}_3)$), wherein the applying (408) of the Kalman filter of the first type outputs a second set of filtered data ($\hat{s}$), and a second covariance matrix (P), and sending (409), in the uplink direction, the second set of filtered data ($\hat{s}$) and the second covariance matrix (P) to one of: another network node (122) subsequently adjacent to the first network node (111) towards the central network node (110), and the central network node (110).

Example 15. The computer-implemented method according to examples 9 and 14, further comprising:

receiving (410) from the central network node (110), at least:

i. a third set of data ($r_l$) for transmission to the one or more wireless devices (130).

Example 16. The computer-implemented method according to example 15, further comprising at least one of:

sending (411) to the one or more wireless devices (130), via the first plurality of antenna elements (125), one or more second radio signals $$(u_l = K_l^H r_l)$$

based on the third set of data ($r_l$) to which received third set of data a gain, e.g., a first gain, has been applied, e.g., wherein the gain applied may be based on the Kalman filter that may have been applied in the uplink direction, reversed, e.g., the Kalman filter of the first type, and sending (412), to the second network node (112), in a downlink direction, one or more second signals ($r_{l-1}$) based on the third set of data ($r_l$) to which received third set of data ($r_l$) another gain, e.g., a second gain, has been applied, e.g., wherein the gain applied may be based on the Kalman filter that may have been applied in the uplink direction, reversed, e.g., the Kalman filter of the first type.

Example 17. The computer-implemented method according to any of examples 15-16, further comprising at least one of:

sending (413), respectively to each of the two third network nodes (113, 115), a respective signal ($r_1$,$r_2$), the respective signal ($r_1$,$r_2$) comprising at least a subset of the third set of data for transmission towards the one or more wireless devices (130), to which respective signal a respective third gain has been applied, e.g., the respective third gain being based on the Kalman filter of the second type applied by the second network node (112) in the uplink from the two third network nodes (113, 115).

Example 18. A computer-implemented method, performed by a central network node (110), for handling data the central network node (110) operating in a communications network (100), the method comprising:

receiving (501) from a first network node (111) operating in the communications network (100), a second set of filtered data ($\hat{s}$) and a second covariance matrix (P), the second set of filtered data ($\hat{s}$) and the second covariance matrix (P) having been obtained by having applied a Kalman filter of a first type to a first aggregation of a first set of measurements ($y_l$) collected via a first plurality of antenna elements (125) managed by first network node (111) and a first set of filtered data (so) received from a second network node (112), and detecting (502) one or more first radio signals ($s_K$) based on the second set of filtered data ($\hat{s}$) and the second covariance matrix (P).

Example 19. The computer-implemented method according to example 18, wherein:

the second set of filtered data ($\hat{s}$) and the second covariance matrix (P) have been obtained by having applied a Kalman filter of a first type to:

i. the first set of measurements ($y_l$), the first set of measurements ($y_l$) being of one or more first radio signals ($s_K$) respectively received from one or more wireless devices (130), and ii. the first set of filtered data ($\hat{s}_0$), wherein the second network node (112) precedes the first network node (111) in an arrangement of network nodes towards the central network node (110), wherein the first set of filtered data comprises data on measurements of the one or more first radio signals ($s_K$) as:

a. received by: a.i) the second network node (112), a.ii) one or more network nodes (113, 115) preceding the second network node (112) in the arrangement of network nodes towards the central network node (110), or a.iii) both, and b. filtered with one or more Kalman filters, and iii. a first covariance matrix ($P_0$) of the one or more Kalman filters, obtained, from the second network node (112).

Example 20. The computer-implemented method according to any of examples 18-19, further comprising:

determining (503) the Kalman filter of the first type applied based on the detected one or more first radio signals ($s_K$) and the second covariance matrix ($\hat{s}$), and sending (504) in a downlink direction, to the first network node (111), a third set of data ($r_l$) for transmission to the one or more wireless devices (130).

Example 21. The computer-implemented method according to example 20, wherein the sending (504) is to a plurality of first network nodes (127) comprising the first network node (111), and wherein:

a. the determining (503) further comprises determining a respective Kalman filter of the first type applied by each of the first network nodes in the plurality of first network nodes (127) in an uplink direction, based on detected one or more respective first radio signals and a respective second covariance matrix, and b. the sending (504) further comprises sending in the downlink direction, to the plurality of first network nodes (127), the third set of data (r) for transmission to the one or more wireless devices (130), the third set of data (r) being sent in a respective split signal.

Example 22. A computer-implemented method, performed by communications network (100) comprising a plurality of first network nodes (127), a plurality a second nodes (112) and a central network node (110), respectively performing the methods according to any of examples 1-21.

Example 23. The method of example 22, wherein the plurality of first network nodes (127) and the plurality of second network nodes (112) are arranged in subsets in an arrangement, and wherein the subsets respectively perform the methods according to any of examples 1-21 in parallel.

Further Extensions And Variations

Figure 14:
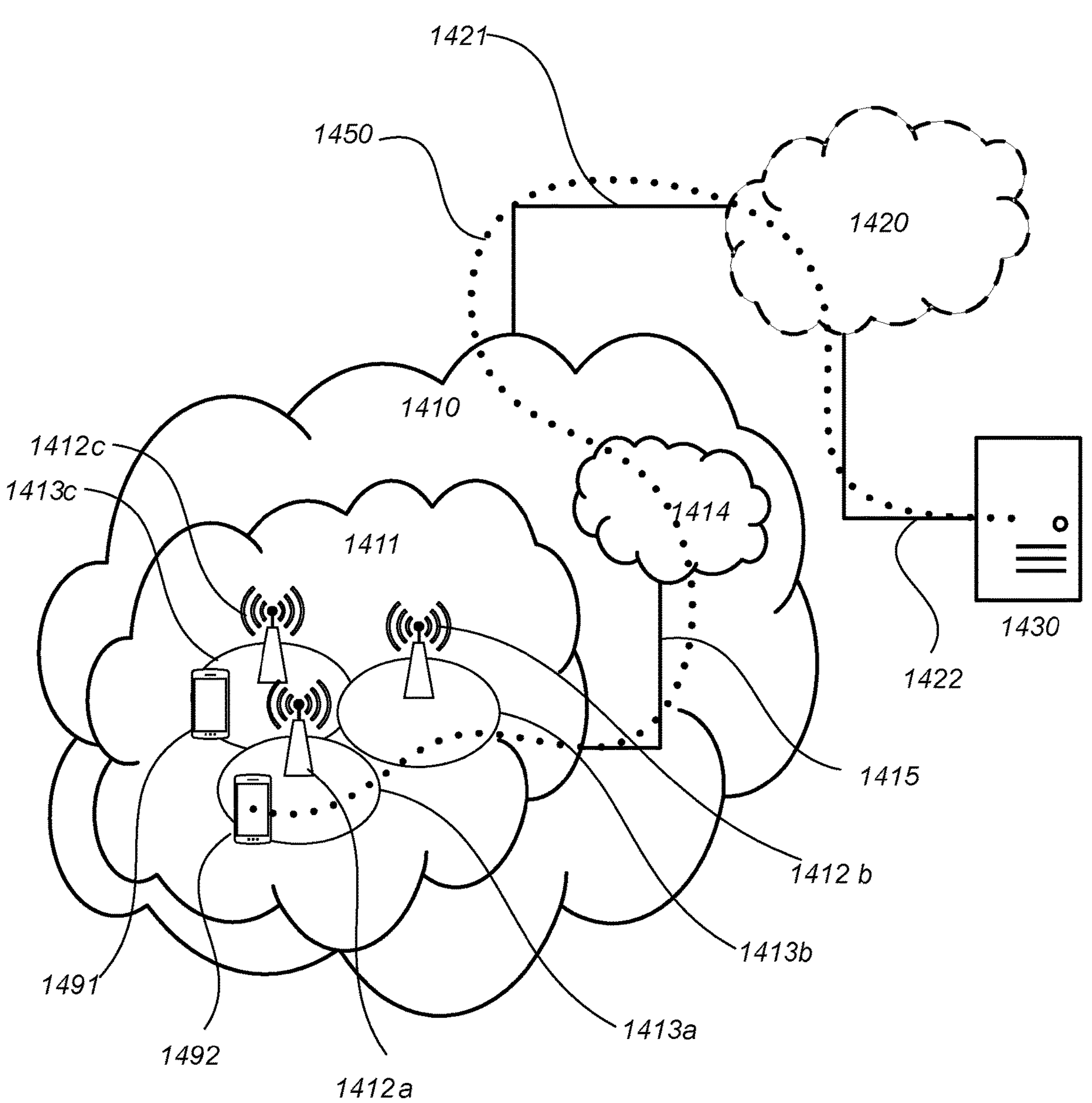
FIG. 14 is a schematic block diagram illustrating a telecommunication network connected via an intermediate network to a host computer, according to embodiments herein.

FIG. 14: Telecommunication network connected via an intermediate network to a host computer in accordance with some embodiments With reference to FIG. 14, in accordance with an embodiment, a communication system includes telecommunication network 1410 such as the communications network 100, for example, a 3GPP-type cellular network, which comprises access network 1411, such as a radio access network, and core network 1414. Access network 1411 comprises a plurality of network nodes such as the first network node 111, the second network node 112 and/or the central network node 110. For example, base stations 1412*a*, 1412*b*, 1412*c*, such as NBs, eNBs, gNBs or other types of wireless access points, each defining a corresponding coverage area 1413*a*, 1413*b*, 1413*c*. Each base station 1412*a*, 1412*b*, 1412*c* is connectable to core network 1414 over a wired or wireless connection 1415. A plurality of wireless devices, such as the one or more wireless devices 130 are comprised in the communications network 100. In FIG. 14, a first UE 1491 located in coverage area 1413*c* is configured to wirelessly connect to, or be paged by, the corresponding base station 1412*c*. A second UE 1492 in coverage area 1413*a* is wirelessly connectable to the corresponding base station 1412*a*. While a plurality of UEs 1491, 1492 are illustrated in this example, the disclosed embodiments are equally applicable to a situation where a sole UE is in the coverage area or where a sole UE is connecting to the corresponding base station 1412. Any of the UEs 1491, 1492 are examples of the one or more wireless devices 130.

Telecommunication network 1410 is itself connected to host computer 1430, which may be embodied in the hardware and/or software of a standalone server, a cloud-implemented server, a distributed server or as processing resources in a server farm. Host computer 1430 may be under the ownership or control of a service provider, or may be operated by the service provider or on behalf of the service provider. Connections 1421 and 1422 between telecommunication network 1410 and host computer 1430 may extend directly from core network 1414 to host computer 1430 or may go via an optional intermediate network 1420. Intermediate network 1420 may be one of, or a combination of more than one of, a public, private or hosted network; intermediate network 1420, if any, may be a backbone network or the Internet; in particular, intermediate network 1420 may comprise two or more sub-networks(not shown).

The communication system of FIG. 14 as a whole enables connectivity between the connected UEs 1491, 1492 and host computer 1430. The connectivity may be described as an over-the-top (OTT) connection 1450. Host computer 1430 and the connected UEs 1491, 1492 are configured to communicate data and/or signaling via OTT connection 1450, using access network 1411, core network 1414, any intermediate network 1420 and possible further infrastructure (not shown) as intermediaries. OTT connection 1450 may be transparent in the sense that the participating communication devices through which OTT connection 1450 passes are unaware of routing of uplink and downlink communications. For example, base station 1412 may not or need not be informed about the past routing of an incoming downlink communication with data originating from host computer 1430 to be forwarded (e.g., handed over) to a connected UE 1491. Similarly, base station 1412 need not be aware of the future routing of an outgoing uplink communication originating from the UE 1491 towards the host computer 1430.

In relation to FIGS. 15, 16, 17, 18, and 19, which are described next, it may be understood that a UE is an example of the one or more wireless devices 130, and that any description provided for the UE equally applies to the one or more wireless devices 130. It may be also understood that the base station is an example of the first network node 111, the second network node 112 and/or the central network node 110, and that any description provided for the base station equally applies to the first network node 111, the second network node 112 and/or the central network node 110.

Figure 15:
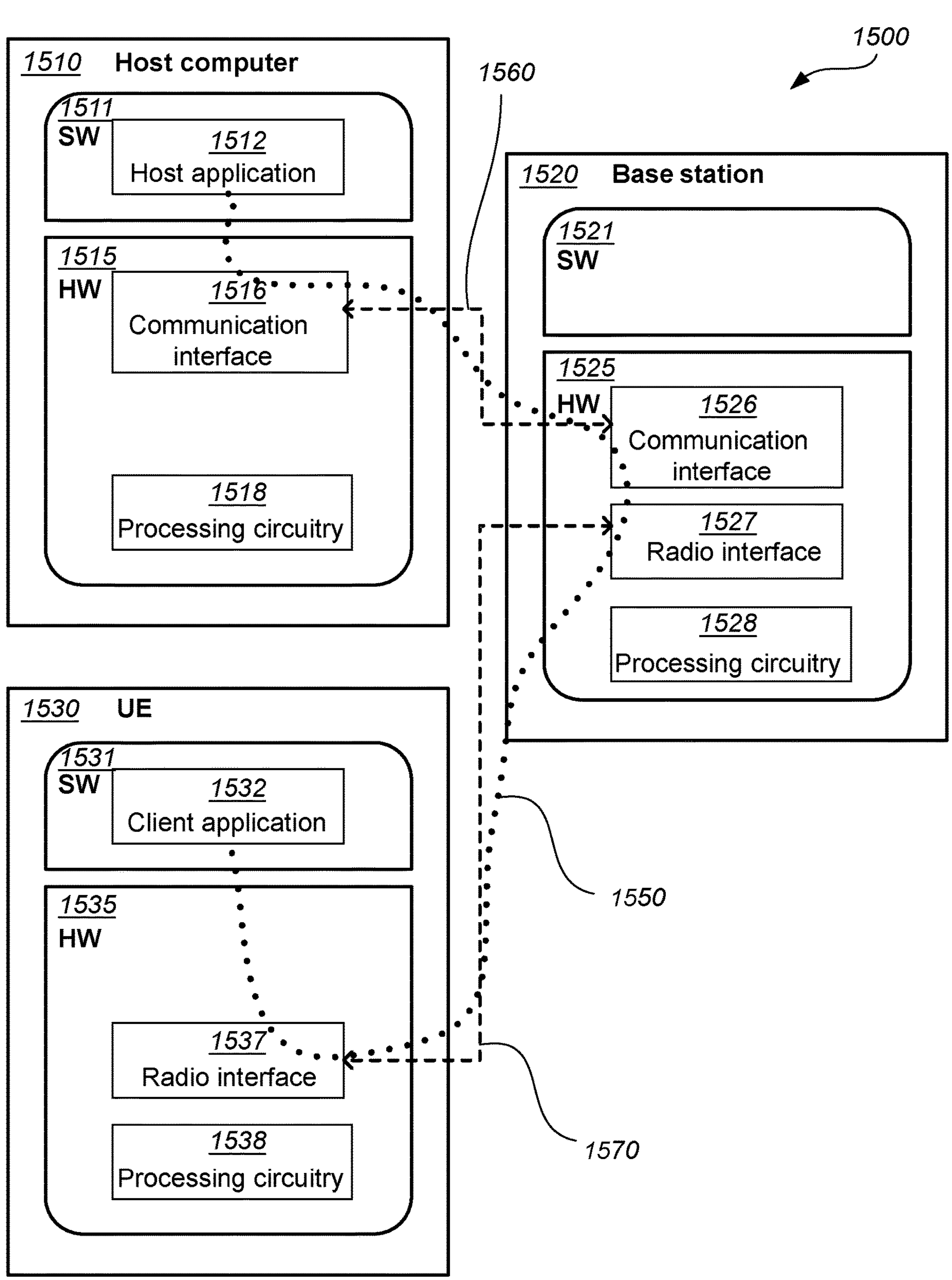
FIG. 15 is a generalized block diagram of a host computer communicating via a base station with a user equipment over a partially wireless connection, according to embodiments herein.

FIG. 15: Host computer communicating via a base station with a user equipment over a partially wireless connection in accordance with some embodiments Example implementations, in accordance with an embodiment, of the one or more wireless devices 130, e.g., a UE, the first network node 111, the second network node 112 and/or the central network node 110, e.g., a base station and host computer discussed in the preceding paragraphs will now be described with reference to FIG. 15. In communication system 1500, such as the communications network 100, host computer 1510 comprises hardware 1515 including communication interface 1516 configured to set up and maintain a wired or wireless connection with an interface of a different communication device of communication system 1500. Host computer 1510 further comprises processing circuitry 1518, which may have storage and/or processing capabilities. In particular, processing circuitry 1518 may comprise one or more programmable processors, application-specific integrated circuits, field programmable gate arrays or combinations of these (not shown) adapted to execute instructions. Host computer 1510 further comprises software 1511, which is stored in or accessible by host computer 1510 and executable by processing circuitry 1518. Software 1511 includes host application 1512. Host application 1512 may be operable to provide a service to a remote user, such as UE 1530 connecting via OTT connection 1550 terminating at UE 1530 and host computer 1510. In providing the service to the remote user, host application 1512 may provide user data which is transmitted using OTT connection 1550.

Communication system 1500 further includes the first network node 111, the second network node 112 and/or the central network node 110, exemplified in FIG. 15 as a base station 1520 provided in a telecommunication system and comprising hardware 1525 enabling it to communicate with host computer 1510 and with UE 1530. Hardware 1525 may include communication interface 1526 for setting up and maintaining a wired or wireless connection with an interface of a different communication device of communication system 1500, as well as radio interface 1527 for setting up and maintaining at least wireless connection 1570 with the one or more wireless devices 130, exemplified in FIG. 15 as a UE 1530 located in a coverage area (not shown in FIG. 15) served by base station 1520. Communication interface 1526 may be configured to facilitate connection 1560 to host computer 1510. Connection 1560 may be direct or it may pass through a core network (not shown in FIG. 15) of the telecommunication system and/or through one or more intermediate networks outside the telecommunication system. In the embodiment shown, hardware 1525 of base station 1520 further includes processing circuitry 1528, which may comprise one or more programmable processors, application-specific integrated circuits, field programmable gate arrays or combinations of these (not shown) adapted to execute instructions. Base station 1520 further has software 1521 stored internally or accessible via an external connection.

Communication system 1500 further includes UE 1530 already referred to. Its hardware 1535 may include radio interface 1537 configured to set up and maintain wireless connection 1570 with a base station serving a coverage area in which UE 1530 is currently located. Hardware 1535 of UE 1530 further includes processing circuitry 1538, which may comprise one or more programmable processors, application-specific integrated circuits, field programmable gate arrays or combinations of these (not shown) adapted to execute instructions. UE 1530 further comprises software 1531, which is stored in or accessible by UE 1530 and executable by processing circuitry 1538. Software 1531 includes client application 1532. Client application 1532 may be operable to provide a service to a human or non-human user via UE 1530, with the support of host computer 1510. In host computer 1510, an executing host application 1512 may communicate with the executing client application 1532 via OTT connection 1550 terminating at UE 1530 and host computer 1510. In providing the service to the user, client application 1532 may receive request data from host application 1512 and provide user data in response to the request data. OTT connection 1550 may transfer both the request data and the user data. Client application 1532 may interact with the user to generate the user data that it provides.

It is noted that host computer 1510, base station 1520 and UE 1530 illustrated in FIG. 15 may be similar or identical to host computer 1430, one of base stations 1412*a*, 1412*b*, 1412*c* and one of UEs 1491, 1492 of FIG. 14, respectively. This is to say, the inner workings of these entities may be as shown in FIG. 15 and independently, the surrounding network topology may be that of FIG. 14.

In FIG. 15, OTT connection 1550 has been drawn abstractly to illustrate the communication between host computer 1510 and UE 1530 via base station 1520, without explicit reference to any intermediary devices and the precise routing of messages via these devices. Network infrastructure may determine the routing, which it may be configured to hide from UE 1530 or from the service provider operating host computer 1510, or both. While OTT connection 1550 is active, the network infrastructure may further take decisions by which it dynamically changes the routing (e.g., on the basis of load balancing consideration or reconfiguration of the network).

Wireless connection 1570 between UE 1530 and base station 1520 is in accordance with the teachings of the embodiments described throughout this disclosure. One or more of the various embodiments improve the performance of OTT services provided to UE 1530 using OTT connection 1550, in which wireless connection 1570 forms the last segment. More precisely, the teachings of these embodiments may improve the latency, signalling overhead, and service interruption and thereby provide benefits such as reduced user waiting time, better responsiveness and extended battery lifetime.

A measurement procedure may be provided for the purpose of monitoring data rate, latency and other factors on which the one or more embodiments improve. There may further be an optional network functionality for reconfiguring OTT connection 1550 between host computer 1510 and UE 1530, in response to variations in the measurement results. The measurement procedure and/or the network functionality for reconfiguring OTT connection 1550 may be implemented in software 1511 and hardware 1515 of host computer 1510 or in software 1531 and hardware 1535 of UE 1530, or both. In embodiments, sensors(not shown) may be deployed in or in association with communication devices through which OTT connection 1550 passes; the sensors may participate in the measurement procedure by supplying values of the monitored quantities exemplified above, or supplying values of other physical quantities from which software 1511, 1531 may compute or estimate the monitored quantities. The reconfiguring of OTT connection 1550 may include message format, retransmission settings, preferred routing etc.; the reconfiguring need not affect base station 1520, and it may be unknown or imperceptible to base station 1520. Such procedures and functionalities may be known and practiced in the art. In certain embodiments, measurements may involve proprietary UE signaling facilitating host computer 1510's measurements of throughput, propagation times, latency and the like. The measurements may be implemented in that software 1511 and 1531 causes messages to be transmitted, in particular empty or 'dummy' messages, using OTT connection 1550 while it monitors propagation times, errors etc.

The first network node embodiments relate to FIG. 3, FIGS. 6-10, FIG. 11 and FIGS. 15-19.

The first network node 111 may also be configured to communicate user data with a host application unit in a host computer 1510, e.g., via another link such as 1550.

The first network node 111 may comprise an arrangement as shown in FIG. 11 or in FIG. 15.

The second network node embodiments relate to FIG. 4, FIGS. 6-10, FIG. 12 and FIGS. 15-19.

The second network node 112 may also be configured to communicate user data with a host application unit in a host computer 1510, e.g., via another link such as 1550.

The second network node 112 may comprise an arrangement as shown in FIG. 12 or in FIG. 15.

The central network node embodiments relate to FIG. 5, FIGS. 6-10, FIG. 13 and

FIGS. 15-19.

The central network node 110 may also be configured to communicate user data with a host application unit in a host computer 1510, e.g., via another link such as 1550.

The central network node 110 may comprise an arrangement as shown in FIG. 13 or in FIG. 15.

Figures 16, 17:
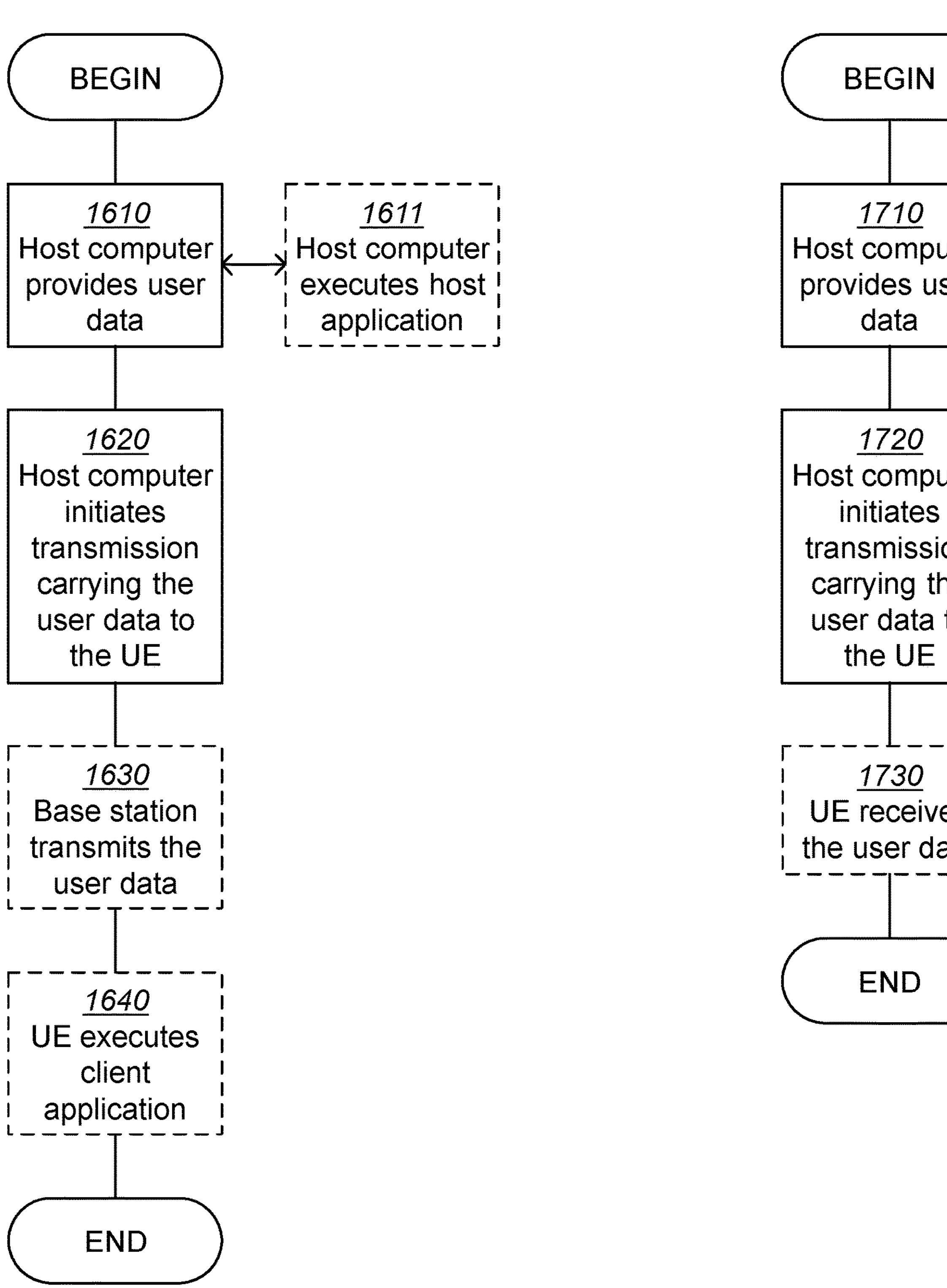
FIG. 16 is a flowchart depicting embodiments of a method in a communications system including a host computer, a base station and a user equipment, according to embodiments herein.
FIG. 17 is a flowchart depicting embodiments of a method in a communications system including a host computer, a base station and a user equipment, according to embodiments herein.

FIG. 16: Methods implemented in a communication system including a host computer, a base station and a user equipment in accordance with some embodiments FIG. 16 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 16 will be included in this section. In step 1610, the host computer provides user data. In substep 1611 (which may be optional) of step 1610, the host computer provides the user data by executing a host application. In step 1620, the host computer initiates a transmission carrying the user data to the UE. In step 1630 (which may be optional), the base station transmits to the UE the user data which was carried in the transmission that the host computer initiated, in accordance with the teachings of the embodiments described throughout this disclosure. In step 1640 (which may also be optional), the UE executes a client application associated with the host application executed by the host computer.

FIG. 17: Methods implemented in a communication system including a host computer, a base station and a user equipment in accordance with some embodiments FIG. 17 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 17 will be included in this section. In step 1710 of the method, the host computer provides user data. In an optional substep (not shown) the host computer provides the user data by executing a host application. In step 1720, the host computer initiates a transmission carrying the user data to the UE. The transmission may pass via the base station, in accordance with the teachings of the embodiments described throughout this disclosure. In step 1730 (which may be optional), the UE receives the user data carried in the transmission.

Figures 18, 19:
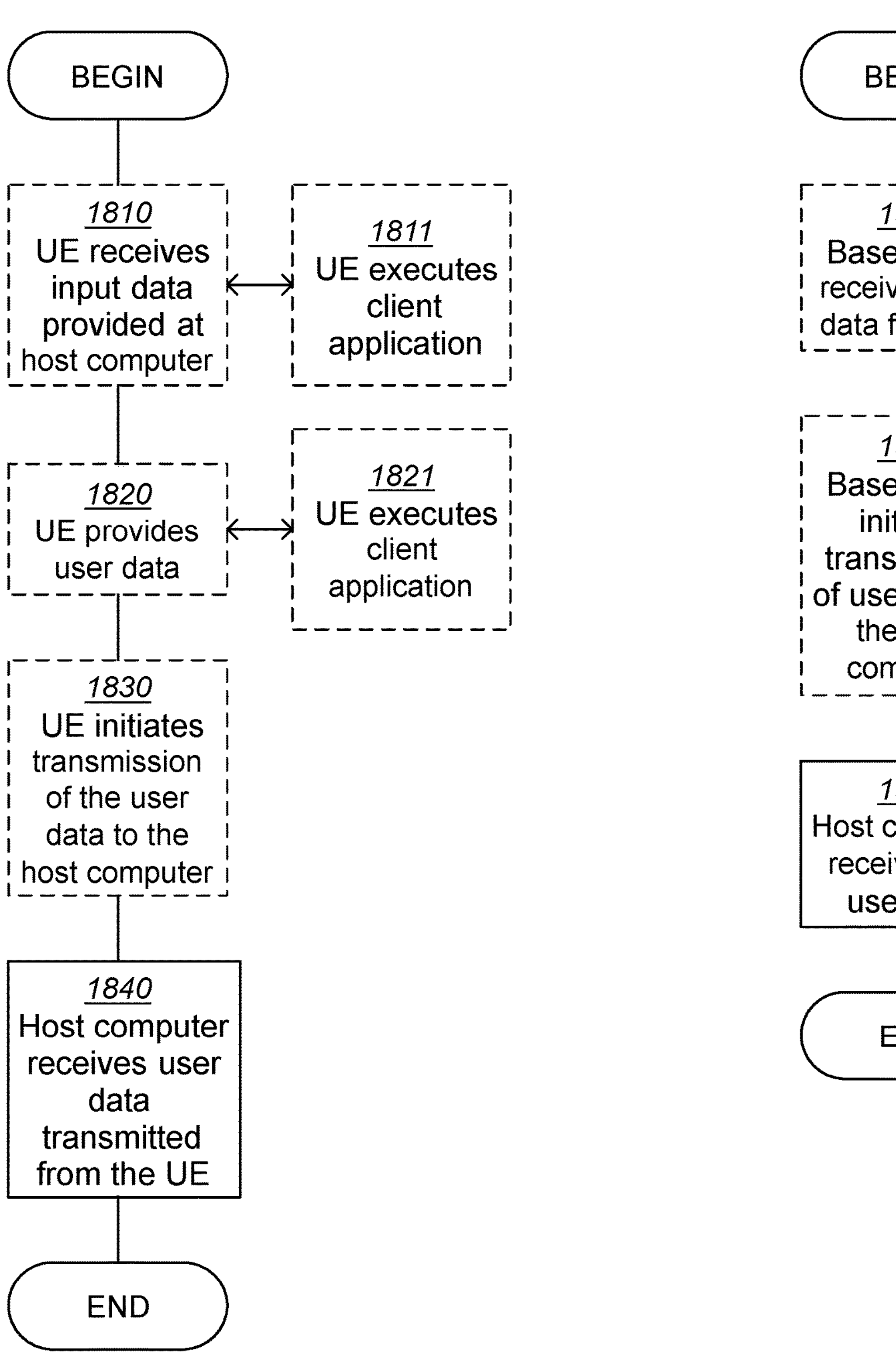
FIG. 18 is a flowchart depicting embodiments of a method in a communications system including a host computer, a base station and a user equipment, according to embodiments herein.
FIG. 19 is a flowchart depicting embodiments of a method in a communications system including a host computer, a base station and a user equipment, according to embodiments herein.

FIG. 18: Methods implemented in a communication system including a host computer, a base station and a user equipment in accordance with some embodiments FIG. 18 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 18 will be included in this section. In step 1810 (which may be optional), the UE receives input data provided by the host computer. Additionally or alternatively, in step 1820, the UE provides user data. In substep 1821 (which may be optional) of step 1820, the UE provides the user data by executing a client application. In substep 1811 (which may be optional) of step 1810, the UE executes a client application which provides the user data in reaction to the received input data provided by the host computer. In providing the user data, the executed client application may further consider user input received from the user. Regardless of the specific manner in which the user data was provided, the UE initiates, in substep 1830 (which may be optional), transmission of the user data to the host computer. In step 1840 of the method, the host computer receives the user data transmitted from the UE, in accordance with the teachings of the embodiments described throughout this disclosure.

FIG. 19: Methods implemented in a communication system including a host computer, a base station and a user equipment in accordance with some embodiments FIG. 19 is a flowchart illustrating a method implemented in a communication system, in accordance with one embodiment. The communication system includes a host computer, a base station and a UE which may be those described with reference to FIGS. 14 and 15. For simplicity of the present disclosure, only drawing references to FIG. 19 will be included in this section. In step 1910 (which may be optional), in accordance with the teachings of the embodiments described throughout this disclosure, the base station receives user data from the UE. In step 1920 (which may be optional), the base station initiates transmission of the received user data to the host computer. In step 1930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further Numbered Embodiments

1. A base station configured to communicate with a user equipment (UE), the base station comprising a radio interface and processing circuitry configured to perform one or more of the actions described herein as performed by the first network node 111, the second network node 112 and/or the central network node 110.

5. A communication system including a host computer comprising:

processing circuitry configured to provide user data; and a communication interface configured to forward the user data to a cellular network for transmission to a user equipment (UE), wherein the cellular network comprises a base station having a radio interface and processing circuitry, the base station's processing circuitry configured to perform one or more of the actions described herein as performed by the first network node 111, the second network node 112 and/or the central network node 110.

6. The communication system of embodiment 5, further including the base station.

7. The communication system of embodiment 6, further including the UE, wherein the UE is configured to communicate with the base station.

8. The communication system of embodiment 7, wherein:

the processing circuitry of the host computer is configured to execute a host application, thereby providing the user data; and the UE comprises processing circuitry configured to execute a client application associated with the host application.

11. A method implemented in a base station, comprising one or more of the actions described herein as performed by the first network node 111, the second network node 112 and/or the central network node 110.

15. A method implemented in a communication system including a host computer, a base station and a user equipment (UE), the method comprising:

at the host computer, providing user data; and at the host computer, initiating a transmission carrying the user data to the UE via a cellular network comprising the base station, wherein the base station performs one or more of the actions described herein as performed by the first network node 111, the second network node 112 and/or the central network node 110.

16. The method of embodiment 15, further comprising:

at the base station, transmitting the user data.

17. The method of embodiment 16, wherein the user data is provided at the host computer by executing a host application, the method further comprising:
at the UE, executing a client application associated with the host application.
21. A user equipment (UE) configured to communicate with a base station, the UE comprising a radio interface and processing circuitry configured to perform one or more of the actions described herein as performed by the one or more wireless devices 130.
25. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's processing circuitry configured to perform one or more of the actions described herein as performed by the one or more wireless devices 130.
26. The communication system of embodiment 25, further including the UE.
27. The communication system of embodiment 26, wherein the cellular network further includes a base station configured to communicate with the UE.
28. The communication system of embodiment 26 or 27, wherein:
the processing circuitry of the host computer is configured to execute a host application, thereby providing the user data; and
the UE's processing circuitry is configured to execute a client application associated with the host application.
31. A method implemented in a user equipment (UE), comprising one or more of the actions described herein as performed by the one or more wireless devices 130.
35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs one or more of the actions described herein as performed by the one or more wireless devices 130.
36. The method of embodiment 35, further comprising:
at the UE, receiving the user data from the base station.
41. A user equipment (UE) configured to communicate with a base station, the UE comprising a radio interface and processing circuitry configured to perform one or more of the actions described herein as performed by the one or more wireless devices 130.
45. A communication system including a host computer comprising:
a communication interface configured to receive user data originating from a transmission from a user equipment (UE) to a base station,
wherein the UE comprises a radio interface and processing circuitry, the UE's processing circuitry configured to: perform one or more of the actions described herein as performed by the one or more wireless devices 130.
46. The communication system of embodiment 45, further including the UE.
47. The communication system of embodiment 46, further including the base station, wherein the base station comprises a radio interface configured to communicate with the UE and a communication interface configured to forward to the host computer the user data carried by a transmission from the UE to the base station.
48. The communication system of embodiment 46 or 47, wherein:
the processing circuitry of the host computer is configured to execute a host application; and
the UE's processing circuitry is configured to execute a client application associated with the host application, thereby providing the user data.
49. The communication system of embodiment 46 or 47, wherein:
the processing circuitry of the host computer is configured to execute a host application, thereby providing request data; and
the UE's processing circuitry is configured to execute a client application associated with the host application, thereby providing the user data in response to the request data.
51. A method implemented in a user equipment (UE), comprising one or more of the actions described herein as performed by the one or more wireless devices 130.
52. The method of embodiment 51, further comprising:
providing user data; and
forwarding the user data to a host computer via the transmission to the base station.
55. A method implemented in a communication system including a host computer, a base station and a user equipment (UE), the method comprising:
at the host computer, receiving user data transmitted to the base station from the UE, wherein the UE performs one or more of the actions described herein as performed by the one or more wireless devices 130.
56. The method of embodiment 55, further comprising:
at the UE, providing the user data to the base station.
57. The method of embodiment 56, further comprising:
at the UE, executing a client application, thereby providing the user data to be transmitted; and
at the host computer, executing a host application associated with the client application.
58. The method of embodiment 56, further comprising:
at the UE, executing a client application; and
at the UE, receiving input data to the client application, the input data being provided at the host computer by executing a host application associated with the client application,
wherein the user data to be transmitted is provided by the client application in response to the input data.
61. A base station configured to communicate with a user equipment (UE), the base station comprising a radio interface and processing circuitry configured to perform one or more of the actions described herein as performed by the first network node 111, the second network node 112 and/or the central network node 110.
65. A communication system including a host computer comprising a communication interface configured to receive user data originating from a transmission from a user equipment (UE) to a base station, wherein the base station comprises a radio interface and processing circuitry, the base station's processing circuitry configured to perform one or more of the actions described herein as performed by the first network node 111, the second network node 112 and/or the central network node 110.

66. The communication system of embodiment 65, further including the base station.

67. The communication system of embodiment 66, further including the UE, wherein the UE is configured to communicate with the base station.

68. The communication system of embodiment 67, wherein:

the processing circuitry of the host computer is configured to execute a host application;

the UE is configured to execute a client application associated with the host application, thereby providing the user data to be received by the host computer.

71. A method implemented in a base station, comprising one or more of the actions described herein as performed by the first network node 111, the second network node 112 and/or the central network node 110.

75. A method implemented in a communication system including a host computer, a base station and a user equipment (UE), the method comprising:

at the host computer, receiving, from the base station, user data originating from a transmission which the base station has received from the UE, wherein the UE performs one or more of the actions described herein as performed by the one or more wireless devices 130.

76. The method of embodiment 75, further comprising: at the base station, receiving the user data from the UE.

77. The method of embodiment 76, further comprising: at the base station, initiating a transmission of the received user data to the host computer.

REFERENCES

[1] P. Frenger, E. G. Larsson et al: "Apparatuses and methods for sequential receive combining", PCT/SE2019/050811P78028, WO2021040590A1.

[2] E. Björnson and J. Hoydis and L. Sanguinetti "Making Cell-Free Massive MIMO competitive with MMSE processing and centralized implementation", Foundations and Trends® in Signal Processing, vol. 11, 2017.

The invention claimed is:

1. A computer-implemented method, performed by a first network node, for handling data, the first network node operating in a communications network, the method comprising:

applying a Kalman filter of a first type to a first aggregation of a first set of measurements ($y_l$) collected via a first plurality of antenna elements managed by the first network node, and a first set of filtered data ($\hat{s}_0$) received from a second network node, using a first covariance matrix ($P_0$), wherein the applying of the Kalman filter ($\mathcal{K}$) of the first type outputs a second set of filtered data, and a second covariance matrix (P), and sending, in an uplink direction, the second set of filtered data ($\hat{s}$) and the second covariance matrix (P) to one of: another network node subsequently adjacent to the first network node towards a central network node, and the central network node.

2. The computer-implemented method according to claim 1, wherein the second network node is adjacent to the first network node in an arrangement of network nodes towards a central network node, wherein the arrangement is a Distributed Multiple Input Multiple Output, D-MIMO, arrangement.

3. The computer-implemented method according to claim 1, further comprising:

obtaining, via the first plurality of antenna elements, the first set of measurements ($y_l$) of one or more first radio signals ($s_K$) respectively received from one or more wireless devices, and obtaining, from the second network node:

i. the first set of filtered data ($\hat{s}_0$), the first set of filtered data ($\hat{s}_0$) comprising data on measurements of the one or more first radio signals ($s_K$) as:

a. received by: a.i) the second network node, a.ii) one or more network nodes preceding the second network node in the arrangement, or a.iii) both, and b. filtered with one or more Kalman filters ($\mathcal{K}$), and ii. the first covariance matrix ($P_0$) of the one or more Kalman filters.

4. The computer-implemented method according to claim 3, wherein the one or more Kalman filters and the Kalman filter of the first type are applied with square-root implementation.

5. The computer-implemented method according to claim 3 wherein the one or more Kalman filters and the Kalman filter of the first type are applied with square-root implementation, further comprising:

receiving from the central network node:

i. a third set of data ($r_l$) for transmission to the one or more wireless devices.

6. The computer-implemented method according to claim 5, further comprising at least one of:

sending to the one or more wireless devices, via the first plurality of antenna elements, one or more second radio signals based on the third set of data having a first gain applied, wherein the first gain applied is a transpose of an uplink Kalman filter gain of the Kalman filter of the first type that has been applied in the uplink direction, and sending, to the second network node, in a downlink direction, one or more second signals based on the third set of data having a second gain applied, wherein the second gain applied is a transpose of an uplink Kalman filter gain of the Kalman filter of the first type that has been applied in the uplink direction.

7. The computer-implemented method according to claim 1, wherein the first network node and the second network node are the same network node.

8. The computer-implemented method of claim 1, wherein the communications network comprises a plurality of first network nodes, a plurality of second nodes and a central network node, respectively performing the method.

9. A computer-implemented method, performed by a second network node, for handling data, the second network node operating in a communications network, the method comprising:

applying a Kalman filter of a second type to two respective third sets of filtered data ($\hat{s}(\mathcal{L}_1)$, $\hat{s}(\mathcal{L}_2)$) respectively received from each of two third network nodes operating in the communications network, the applying being performed using respective third covariance matrices ($P(\mathcal{L}_1)$, $P(\mathcal{L}_2)$), wherein the applying of the Kalman filter of the second type outputs a first set of filtered data ($\hat{s}(\mathcal{L}_1 \cup \mathcal{L}_2)$), and a first covariance matrix ($P(\mathcal{L}_1 \cup \mathcal{L}_2)$), and providing, in an uplink direction, the first set of filtered data ($\hat{s}(\mathcal{L}_1 \cup \mathcal{L}_2)$) and the first covariance matrix ($P(\mathcal{L}_1 \cup \mathcal{L}_2)$) to one of: a) the second network node for further processing, b) a first network node, and c) a central network node.

10. The computer-implemented method according to claim 9, further comprising:

receiving, respectively, from each of the two third network nodes:

i. the respective third set of filtered data ($\hat{s}(\mathcal{L}_1)$, $\hat{s}(\mathcal{L}_2)$), the respective third set of filtered data ($\hat{s}(\mathcal{L}_1)$, $\hat{s}(\mathcal{L}_2)$) comprising data on measurements of one or more first radio signals, respectively received from one or more wireless devices, as:

a. received by: a.i) the respective third network nodes, a.ii) one or more network nodes respectively preceding the respective third network node in an arrangement of network nodes towards a central network node, or a.iii) both, and b. filtered with one or more respective Kalman filters, and ii. the respective third covariance matrices of the one or more respective Kalman filters.

11. The computer-implemented method according to claim 10, wherein the second network node provides the first set of filtered data ($\hat{s}(\mathcal{L}_1 \cup \mathcal{L}_2)$), and the first covariance matrix ($P(\mathcal{L}_1 \cup \mathcal{L}_2)$) to the second network node for further processing, and wherein the method further comprises:

receiving from a fourth network node operating in the communications network:

i. a fourth set of filtered data ($\hat{s}(\mathcal{L}_3)$), the fourth set of filtered data ($\hat{s}(\mathcal{L}_3)$) comprising data on measurements of the one or more first radio signals as:

a) received by: a.i) the fourth network node, a.ii) one or more network nodes preceding the fourth network node in the arrangement of network nodes towards the central network node, or a.iii) both, and b) filtered with one or more further Kalman filters, and ii. a fourth covariance matrix ($P(\mathcal{L}_3)$) of the one or more further Kalman filters, applying an additional Kalman filter of the second type to the fourth set of filtered data ($\hat{s}(\mathcal{L}_3)$) and the first set of filtered data ($\hat{s}(\mathcal{L}_1 \cup \mathcal{L}_2)$), using the fourth covariance matrix ($P(\mathcal{L}_3)$) and the first covariance matrix ($P(\mathcal{L}_1 \cup \mathcal{L}_2)$), wherein the applying of the additional Kalman filter of the second type outputs an additional first set of filtered data ($\hat{s}(\mathcal{L}_1 \cup \mathcal{L}_2 \cup \mathcal{L}_3)$), and an additional first covariance matrix ($P(\mathcal{L}_1 \cup \mathcal{L}_2 \cup \mathcal{L}_3)$), and providing, in the uplink direction, the additional first set of filtered data ($\hat{s}(\mathcal{L}_1 \cup \mathcal{L}_2 \cup \mathcal{L}_3)$) and the additional first covariance matrix ($P(\mathcal{L}_1 \cup \mathcal{L}_2 \cup \mathcal{L}_3)$) to one of: a) the second network node for further processing, b) the first network node, and c) the central network node.

12. The computer-implemented method according to claim 11, wherein the second network node includes the first network node and the method further comprising:

obtaining, via a first plurality of antenna elements managed by the first network node, a first set of measurements ($y_l$) of the one or more first radio signals ($s_K$), and applying a Kalman filter of a first type to the first set of measurements ($y_l$), and one of:

a. the first set of filtered data ($\hat{s}(\mathcal{L}_1 \cup \mathcal{L}_2)$), using the first covariance matrix, and b. the additional first set of filtered data, using the additional first covariance matrix ($P(\mathcal{L}_1 \cup \mathcal{L}_2 \cup \mathcal{L}_3)$), wherein the applying of the Kalman filter of the first type outputs a second set of filtered data ($\hat{s}$), and a second covariance matrix (P), and sending, in the uplink direction, the second set of filtered data ($\hat{s}$) and the second covariance matrix (P) to one of: another network node subsequently adjacent to the first network node towards the central network node, and the central network node.

13. The computer-implemented method according to claim 10, wherein the second network node is adjacent to the first network node in the arrangement, and wherein the arrangement is a Distributed Multiple Input Multiple Output, D-MIMO, arrangement.

14. The computer-implemented method according to claim 10, wherein any Kalman filter applied is applied with square-root implementation.

15. The computer-implemented method according to claim 9, wherein the second network node includes the first network node.

16. A computer-implemented method, performed by a central network node, for handling data, the central network node operating in a communications network, the method comprising:

receiving from a first network node operating in the communications network, a second set of filtered data ($\hat{s}$) and a second covariance matrix (P), the second set of filtered data ($\vec{s}$) and the second covariance matrix (P) having been obtained by having applied a Kalman filter of a first type to a first aggregation of a first set of measurements ($y_l$) collected via a first plurality of antenna elements managed by the first network node and a first set of filtered data ($\hat{s}_0$) received from a second network node, and detecting one or more first radio signals ($s_K$) based on the second set of filtered data ($\hat{s}$) and the second covariance matrix (P).

17. The computer-implemented method according to claim 16, wherein:

the second set of filtered data ($\hat{s}$) and the second covariance matrix (P) have been obtained by having applied the Kalman filter of a first type to:

i. the first set of measurements ($y_l$), the first set of measurements ($y_l$) being of one or more first radio signals ($s_K$) respectively received from one or more wireless devices, and ii. the first set of filtered data ($\hat{s}_0$), wherein the second network node precedes the first network node in an arrangement of network nodes towards the central network node, wherein the first set of filtered data comprises data on measurements of the one or more first radio signals ($s_K$) as:

a. received by: a.i) the second network node, a.ii) one or more network nodes preceding the second network node in the arrangement of network nodes towards the central network node, or a.iii) both, and b. filtered with one or more Kalman filters, and iii. a first covariance matrix ($P_0$) of the one or more Kalman filters, obtained, from the second network node.

18. The computer-implemented method according to claim 16, further comprising:

determining the Kalman filter of the first type applied based on the detected one or more first radio signals ($s_K$) and the second covariance matrix (P), and sending in a downlink direction, to the first network node, a third set of data (r) for transmission to the one or more wireless devices.

19. The computer-implemented method according to claim 18, wherein the sending is to a plurality of first network nodes comprising the first network node, and wherein:

a. the determining further comprises determining a respective Kalman filter of the first type applied by each of the first network nodes in the plurality of first network nodes in an uplink direction, based on detected one or more respective first radio signals and a respective second covariance matrix, and b. the sending further comprises sending in the downlink direction, to the plurality of first network nodes, the third set of data (r) for transmission to the one or more wireless devices, the third set of data (r) being sent in a respective split signal.

20. A first network node, for handling data, the first network node being configured to operate in a communications network, the first network node comprising processing circuitry and a memory that contains instructions executable by the processing circuitry whereby the first network node is configured to:

apply a Kalman filter of a first type to a first aggregation of a first set of measurements ($y_l$) configured to be collected via a first plurality of antenna elements configured to be managed by the first network node, and a first set of filtered data ($\hat{s}_0$) configured to be received from a second network node, using a first covariance matrix ($P_0$), wherein the applying of the Kalman filter ($\mathcal{K}$) of the first type is configured to output a second set of filtered data ($\hat{s}$), and a second covariance matrix (P), and send, in an uplink direction, the second set of filtered data ($\hat{s}$) and the second covariance matrix (P) to one of: another network node subsequently adjacent to the first network node towards a central network node, and the central network node.

* * * * *